(12) United States Patent
Yamahara et al.

(10) Patent No.: US 7,193,669 B2
(45) Date of Patent: Mar. 20, 2007

(54) LIQUID CRYSTAL DISPLAY DEVICE WITH IMPROVED FIELD ANGLES

(75) Inventors: Motohiro Yamahara, Osaka (JP); Iichiro Inoue, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 173 days.

(21) Appl. No.: 10/395,637

(22) Filed: Mar. 24, 2003

(65) Prior Publication Data

US 2004/0008308 A1    Jan. 15, 2004

Related U.S. Application Data

(63) Continuation of application No. 09/267,994, filed on Mar. 12, 1999, now Pat. No. 6,606,143.

(30) Foreign Application Priority Data

| Mar. 13, 1998 | (JP) | ............................... 10-063683 |
| Mar. 13, 1998 | (JP) | ............................... 10-063684 |
| Mar. 24, 1998 | (JP) | ............................... 10-076350 |
| Mar. 24, 1998 | (JP) | ............................... 10-076351 |

(51) Int. Cl.
*G02F 1/1335* (2006.01)
*C09K 19/02* (2006.01)

(52) U.S. Cl. ..................... 349/117; 349/118; 349/181

(58) Field of Classification Search ............ 349/117, 349/118, 181
See application file for complete search history.

(56) References Cited

U.S. PATENT DOCUMENTS

| 5,506,706 A | 4/1996 | Yamahara et al. ............ 359/73 |
| 5,638,200 A * | 6/1997 | Xu .............................. 349/117 |

(Continued)

FOREIGN PATENT DOCUMENTS

| JP | 5-59365 | 6/1993 |
| JP | 6-75116 | 3/1994 |

OTHER PUBLICATIONS

An Office Action that is dated Nov. 28, 2003 and that was issued in connection with counterpart Japanese Patent Application No. 2002-341559.

(Continued)

*Primary Examiner*—James A. Dudek
(74) *Attorney, Agent, or Firm*—David G. Conlin; David A. Tucker; Edwards Angell Palmer & Dodge LLP

(57) ABSTRACT

A liquid crystal display device includes a display element with a pair of substrates, a liquid crystal layer between the substrates, and an alignment film on a surface of at least one substrate facing the layer; a pair of polarizers on both surfaces of the liquid crystal element to sandwich the liquid crystal element; and at least one optical phase element between at least one of the polarizers and the liquid crystal element, wherein an optical refractive ellipsoid of the optical phase element is tilted clockwise or counterclockwise from the normal of a surface of the optical phase element, wherein at least one of rates of variation of an ordinary refractive index and an extraordinary refractive index of a liquid crystal material of the liquid crystal layer with respect to a wavelength is set in a range where viewing angle dependent coloring does not occur on a screen.

3 Claims, 21 Drawing Sheets

U.S. PATENT DOCUMENTS 5,844,649 A * 12/1998 Yamahara et al. .......... 349/118
5,895,106 A    4/1999 VanderPloeg et al. ...... 349/120
6,141,075 A   10/2000 Ohmuro .................... 349/130

OTHER PUBLICATIONS

An Office Action that is dated Nov. 28, 2003 and that was issued in connection with counterpart Japanese Patent Application No. 2002-341563.

* cited by examiner

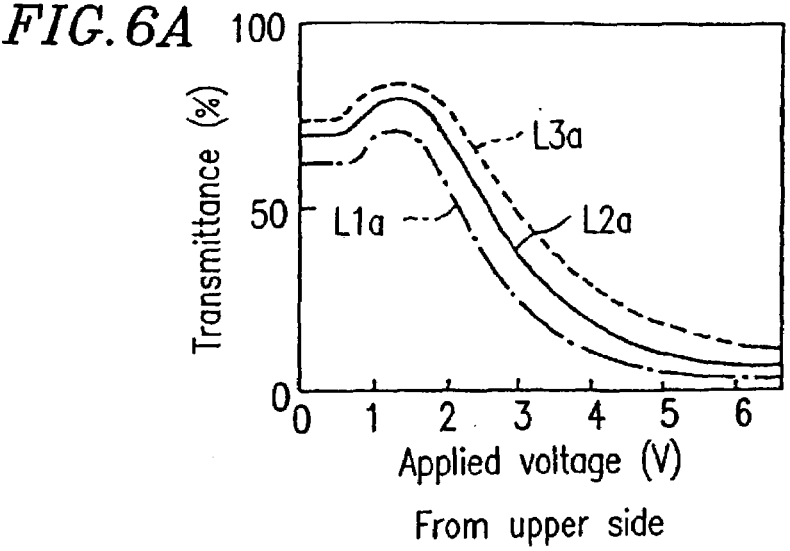
FIG.6A From upper side
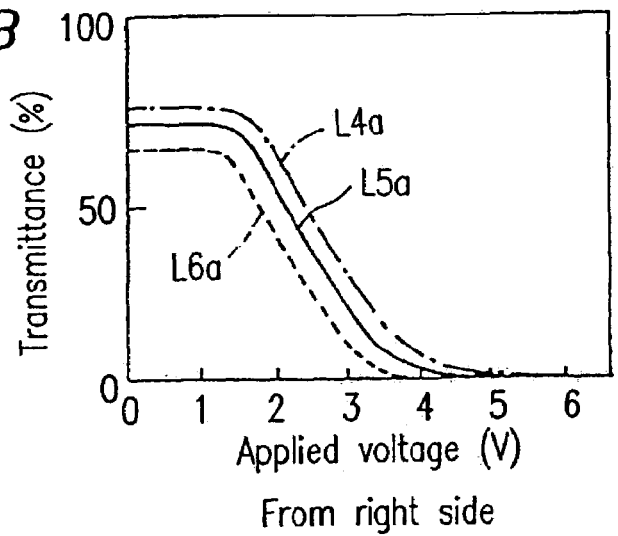
FIG.6B From right side
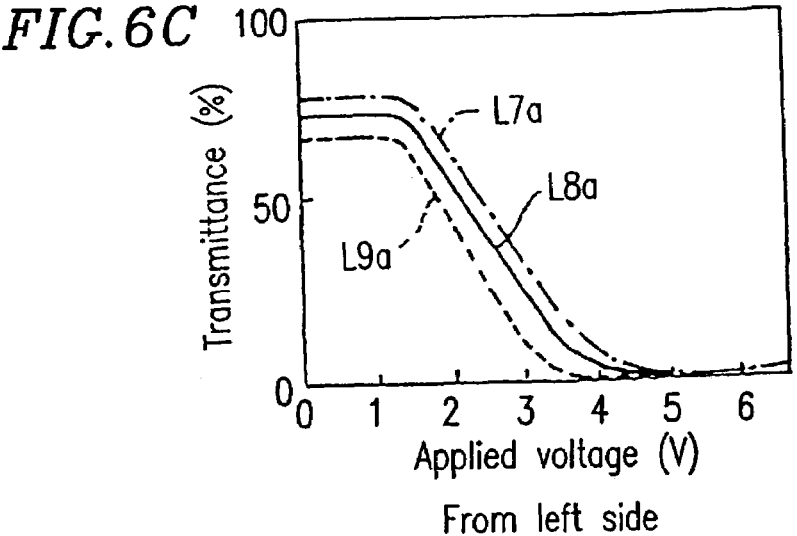
FIG.6C From left side

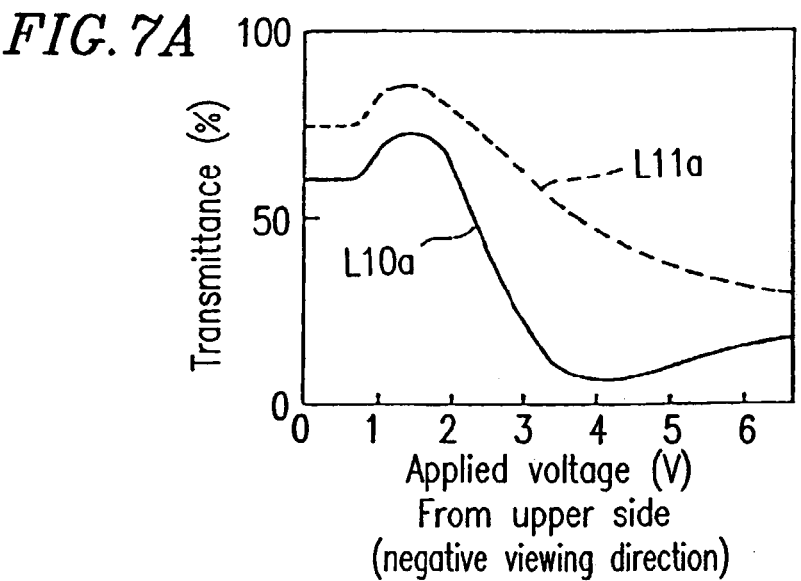
FIG. 7A — From upper side (negative viewing direction)
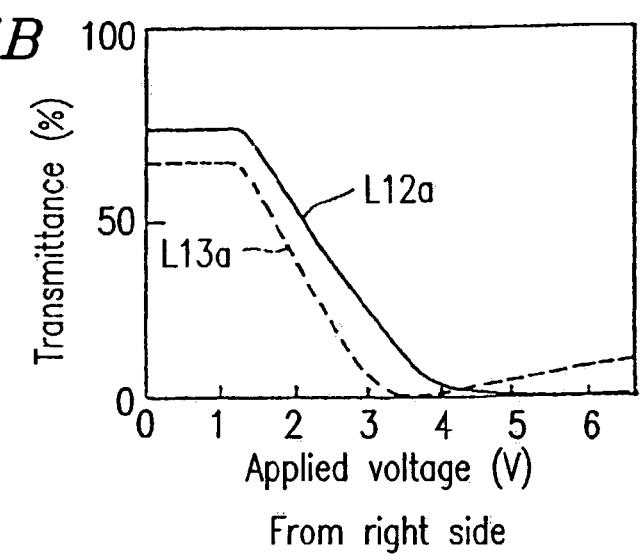
FIG. 7B — From right side
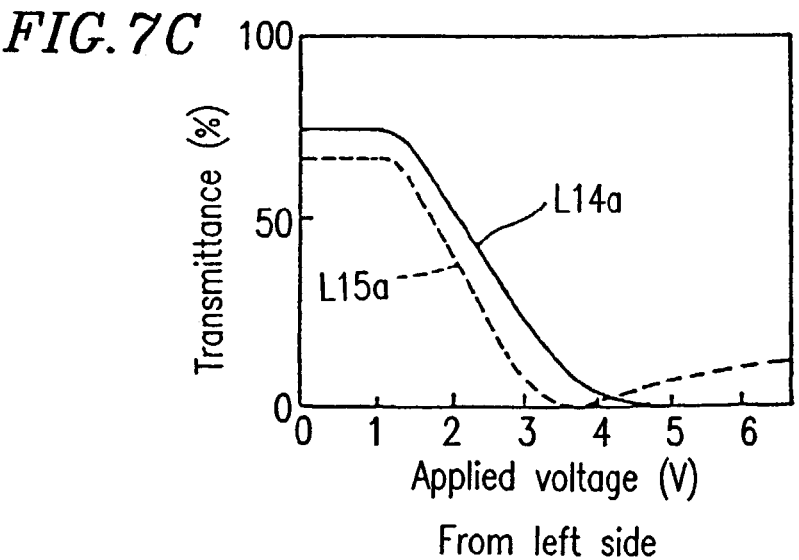
FIG. 7C — From left side From upper side From right side From left side

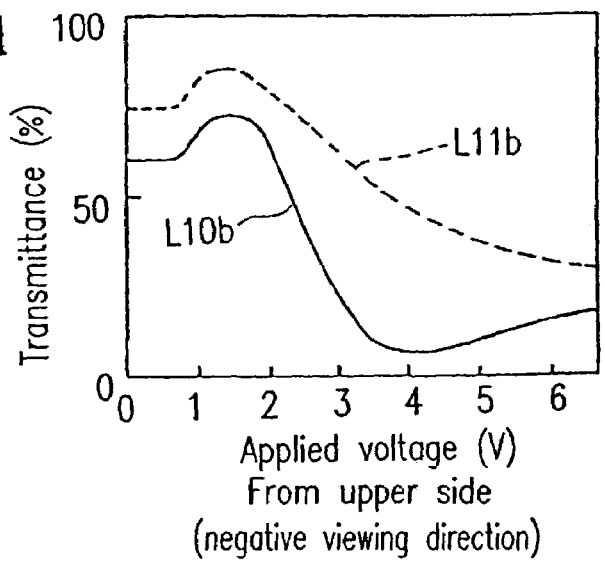
FIG. 9A From upper side (negative viewing direction)
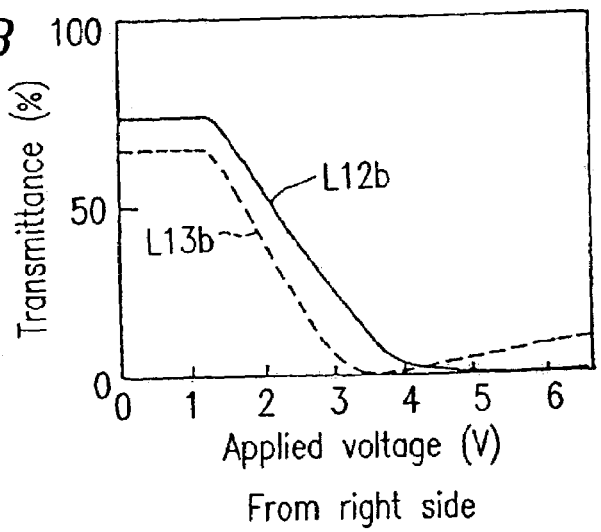
FIG. 9B From right side
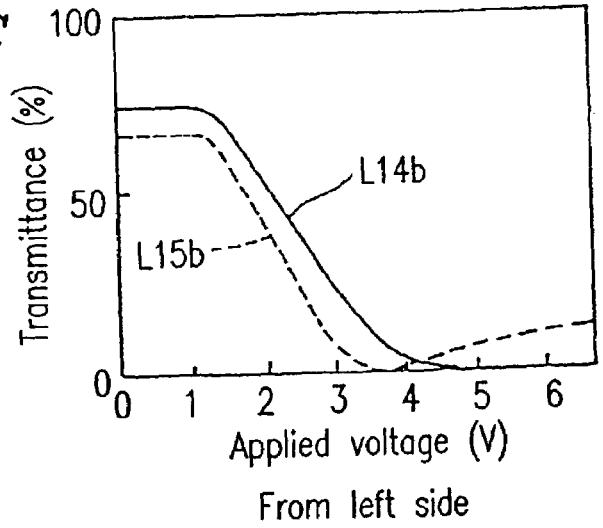
FIG. 9C From left side From upper side From right side From left side From upper side From right side From left side From upper side From right side From left side From upper side From right side From left side

LIQUID CRYSTAL DISPLAY DEVICE WITH IMPROVED FIELD ANGLES

CROSS REFERENCE TO RELATED APPLICATIONS

This application is a continuation of, and claims priority to U.S. Application Ser. No. 09/267,994, which was filed Mar. 12, 1999 now U.S. Pat. No. 6,606,143. The entirety of the Ser. No. 09/267,994 application is incorporated by reference herein.

BACKGROUND OF THE INVENTION

1. Field of the Invention

The present invention relates to a liquid crystal display device in which the angle of field of the display screen has been improved by combining a liquid crystal display element with a phase element having optical anisotropy.

2. Description of the Related Art

Conventionally, liquid crystal display devices (hereinafter, referred to as LCD devices) using a nematic liquid crystal material have been broadly used as numeral segmented type display devices for watches, clocks, portable calculators, and the like. In recent years, such LCD devices have found applications in broader fields, as display devices for wordprocessors, notebook type personal computers, and the like, as well as liquid crystal monitors for car navigation systems, and the like, for example.

An LCD device of this type includes a pair of light transparent substrates arranged to face each other with a liquid crystal layer interposed therebetween. Electrodes and interconnections for activating and inactivating pixels are formed on the substrates. For example, in an active matrix LCD device, pixel electrodes are arranged in a matrix on one of the substrates for applying a voltage to the liquid crystal layer. Active elements such as field effect transistors are provided on the same substrate together with interconnections as switching means for selectively applying the voltage to the respective pixel electrodes. In a color LCD device, a color filter layer composed of color filters of red, green, and blue, for example, is disposed on one of the substrates.

In such LCD devices, different display modes are appropriately selected depending on the twist angle of a nematic liquid crystal material used. Among such display modes, an active driving type twisted nematic liquid crystal display mode (hereinafter, referred to as a TN mode) and a multiplex driving type super-twisted nematic liquid crystal display mode (hereinafter, referred to as an STN mode) are well known.

In the TN mode, nematic liquid crystal molecules are oriented in a state twisted 90° between the pair of substrates, so that light is guided along the twisted direction. In the STN mode, the twist angle of nematic liquid crystal molecules is made greater than 90°, so that the light transmittance of the liquid crystal layer exhibits a sharp change when a voltage near a threshold voltage is applied.

Since the STN mode utilizes the birefringence effect of a liquid crystal material, the background of the display screen is likely to be uniquely colored due to color interference. In order to effect monochrome display in the STN mode without an occurrence of such coloring, using an optical compensation plate is conventionally considered effective. Two display modes using such an optical compensation plate are known; a double super-twisted nematic phase compensation mode (hereinafter, referred to as a DSTN mode) and a film type phase compensation mode (hereinafter, referred to as a film-added mode).

In the DSTN mode, the LCD device includes two liquid crystal cells, i.e., a liquid crystal cell for display and a liquid crystal cell in which liquid crystal molecules are twisted at an angle reverse to that in the liquid crystal cell for display. In the film-added mode, a film having optical anisotropy is provided. The film-added mode is considered advantageous since it is light in weight and low in cost.

By employing any of the above phase compensation modes, the LCD devices of the STN mode have been improved in the monochrome display characteristics. Accordingly, a color STN LCD device provided with a color filter layer has been realized as a color display.

The TN mode is roughly classified into a normally-black mode and a normally-white mode.

In the normally-black mode, a pair of polarizing plates are disposed, sandwiching a liquid crystal display element (hereinafter, referred to as an LCD element) therebetween, so that the polarizing directions thereof are parallel to each other. In this mode, black is displayed when no voltage is applied to the liquid crystal layer. In the normally-white mode, a pair of polarizing plates are disposed, sandwiching an LCD element therebetween, so that the polarizing directions thereof are orthogonal to each other. In this mode, white is displayed when no voltage is applied to the liquid crystal layer. The normally-white mode is advantageous when display contrast, color reproducibility, viewing angle dependence of display, and the like are taken into consideration.

The TN mode LCD device has viewing angle dependence in which the contrast of display images is changed or inverted depending on the direction in which and the angle at which an observer views the display screen. This occurs because liquid crystal molecules have refractive index anisotropy $\Delta n$ and they are oriented in a tilted state with respect to the upper and lower substrates. As a result, a viewing angle characteristic of a wide angle of field is not obtained. This problem will be described below in detail.

FIG. 21 schematically illustrates a cross-sectional structure of an LCD element 31 of the TN mode. With an application of a voltage to a liquid crystal layer for gray scale display, liquid crystal molecules 32 are in a state of slight rise.

In the LCD element 31, a linear polarized light beam 35 passing through the element in a direction normal to the surfaces of a pair of substrates 33 and 34 and linear polarized light beams 36 and 37 passing through the element in directions tilted from the normal are incident on the respective liquid crystal molecules 32 at different angles from each other. Since the liquid crystal molecules 32 have refractive index anisotropy $\Delta n$ as described above, ordinary light and extraordinary light are generated when each of the linear polarized light beams 35, 36, and 37 passes through the liquid crystal molecules 32. As a result, the linear polarized light beam is changed to an elliptic polarized light beam due to the phase difference between the ordinary light and the extraordinary light. This is a cause of the occurrence of viewing angle dependence.

Moreover, in an actual liquid crystal layer, the tilt angle of the liquid crystal molecules 32 located in the middle of the liquid crystal layer between the substrates 33 and 34 is different from that of the liquid crystal molecules 32 located in the vicinity of the substrates 33 and 34. Also, the liquid crystal molecules 32 are twisted 90° around the normal of the substrate surface as an axis. These are also causes of the occurrence of the viewing angle dependence.

Thus, the linear polarizes light beams 35, 36, and 37 passing through the liquid crystal layer are caused to have various birefringence effects depending on the directions and angles thereof. This results in the generation of complicated viewing angle dependence.

For example, when the viewing angle is gradually tilted from the direction normal to the screen in the positive viewing direction (toward the lower side of the screen), a phenomenon in which the display screen is colored (hereinafter, referred to as a coloring phenomenon) and a phenomenon where black and white are inverted (hereinafter referred to as an inversion phenomenon) occur at and after a certain viewing angle. On the other hand, when the viewing angle is gradually tilted from the direction normal to the screen in the negative viewing direction (toward the upper side of the screen), the contrast is abruptly reduced.

The above LCD device has another problem that as the display screen is larger the acceptable viewing angle becomes smaller. For example, when an observer views a large liquid crystal display screen from the front at a short distance, the observer may sometimes recognize that the color displayed on the upper portion of the screen is different from the color displayed on the lower portion thereof. This is because, as a display screen becomes larger, the apparent angle for viewing the entire screen becomes greater, causing the same phenomenon observed when the display screen is viewed in a tilted direction.

A method for overcoming the viewing angle dependence of the TN mode is proposed, where a phase plate (or a phase film) as an optical element (phase element) having optical anisotropy is provided between the LCD element and a polarizing plate.

In this method, an elliptic polarized light beam to which a linear polarized light beam have been changed after passing through liquid crystal molecules having refractive anisotropy is allowed to pass through an optical phase plate having refractive index anisotropy disposed on at least one surface of a liquid crystal layer. This compensates for a change in the phase difference between ordinary light and extraordinary light generated depending on the viewing angle, and thus changes the elliptic polarized light beam back to the linear polarized light beam. In this way, the viewing angle dependence is reduced.

Japanese Laid-Open Publication No. 5-313159, for example, proposes a method using an optical phase plate, in which the direction of one principal refractive index of an index ellipsoid of the optical phase plate is made parallel to the normal of the surface of the optical phase plate. Using this optical phase plate, however, only a limited improvement is obtained in the inversion phenomenon which occurs in the positive viewing direction.

In order to overcome the above problem, Japanese Laid-Open Publication No. 6-75116 proposes a method using an optical phase plate, in which the direction of a principal refractive index of an index ellipsoid is tilted from the normal of the surface of the optical phase plate. In this method, two types of optical phase plates are proposed as follows.

In one type of optical phase plate, the direction of the smallest principal refractive index among the three principal refractive indices of the index ellipsoid of the optical phase plate is made parallel to the surface of the optical phase plate. The direction of one of the remaining two principal refractive indices is tilted by an angle θ from the surface of the optical phase plate, while the direction of the other principal refractive index is tilted by the angle θ from the normal of the surface of the optical phase plate, wherein θ is $20° \leq \theta \leq 70°$.

In the other type of optical phase plate, the three principal refractive indices na, nb, and nc of the index ellipsoid of the optical phase plate have the relationship of na=nc>nb. The direction of the principal refractive index nb is tilted clockwise or counterclockwise from the normal of the surface of the optical phase plate with respect to the direction of the principal refractive index na or nc which is parallel to the surface of the optical phase plate as an axis. At the same time, the direction of the principal refractive index nc or na is tilted clockwise or counterclockwise from the direction parallel to the surface of the optical phase plate. In this way, the index ellipsoid of this optical phase plate is tilted.

In the former type, the respective optical phase plates may be uniaxial or biaxial. In the latter type, a single optical phase plate may be used. Alternatively, two optical phase plates may be used in combination so that the tilted directions of the respective principal refractive indices nb form 90° therebetween.

By disposing at least one such optical phase plate between the LCD element and the polarizing plate, the change in contrast of a display image generated depending on the viewing angle, the coloring phenomenon, and the inversion phenomenon can be reduced to some extent.

Japanese Laid-Open Publication No. 8-101381 proposes a method for improving the viewing angle characteristic for display color in an LCD device using the latter type of optical phase plate in the following manner: The wavelength dispersion of the refractive index anisotropy of the optical phase plate is made smaller than the wavelength dispersion of the refractive index anisotropy of the liquid crystal layer. Japanese Laid-Open Publication No. 5-215912 discloses a method for improving the viewing angle characteristic in an LCD device using a conventional optical phase plate of which the index ellipsoid is not tilted in the same manner, i.e., in the manner that the wavelength dispersion of the refractive index anisotropy is made smaller than that of the liquid crystal layer.

The wavelength dispersion of an optical phase plate can be adjusted by changing the material for the optical phase plate or by adjusting the thickness of the optical phase plate.

In order to overcome the viewing angle dependence of LCD devices of the TN and STN modes described above, Japanese Laid-Open Publication No. 57-1867835, for example, discloses an orientation dividing method, in which the portion of a liquid crystal layer corresponding to each pixel region is divided into a plurality of domains so that a plurality of viewing angle characteristics are obtained in each pixel region. Japanese Laid-Open Publication Nos. 7-234407 and 7-248497 disclose a method in which a plurality of twist orientations of liquid crystal molecules are provided in each pixel region.

However, when each pixel region is divided into two to form two liquid crystal molecule orientation domains having different orientation states within one pixel region, a problem arises in which completely different viewing angle characteristics are exhibited between the upward and downward directions (12 o'clock–6 o'clock directions) and the right and left directions (3 o'clock–9 o'clock directions). For example, in the upward and downward directions, when the viewing angle is dropped, the light transmittance during black display increases resulting in insufficient contrast. In the right and left directions, while the contrast is good, an inversion phenomenon occurs.

In the case where a plurality of twist orientations are provided in each pixel region or each pixel region is divided into a plurality of domains having different orientations, it is difficult to improve the viewing angle characteristic in the direction of 45° from an absorption axis or a transmission axis of a polarizing plate.

In order to overcome the above problem, Japanese Laid-Open Publication Nos. 6-118406 and 6-194645 disclose techniques which combine the above-described pixel region dividing method and the optical phase plate.

More specifically, Japanese Laid-Open Publication No. 6-118406 discloses an LCD device whose contrast is improved by inserting a film (an optical phase plate) having optical anisotropy between an LCD element and a polarizing plate.

Japanese Laid-Open Publication No. 6-194645 discloses a compensation plate (optical phase plate) which is set so that a refractive index is substantially zero in the plane parallel to the surface thereof and that a refractive index in a direction normal to the surface thereof is smaller than the refractive index in the plane. Such a compensation plate has a negative refractive index anisotropy, which can compensate for a positive refractive index anisotropy generated in the LCD element when a voltage is applied. Thus, the viewing angle dependence can be reduced.

Under the present circumstances, however, where LCD devices having a wider angle of field and higher display quality are desired, the combination of the pixel region dividing method and a negative uniaxial optical phase plate as described above are not sufficient for the following reason. In the above techniques, the ratio of the areas of two liquid crystal molecule orientation domains in one pixel region (hereinafter, such a ratio is referred to as the division ratio) is 1:1 (i.e., the areas are the same). Accordingly, although the viewing angle characteristic in the right and left directions can be improved by using a uniaxial optical phase plate, the viewing angle characteristic in the upward and downward directions is not improved by only using a negative uniaxial optical phase plate because using such an optical phase plate is simply equal to having two liquid crystal molecule orientation domains in which liquid crystal molecules are respectively oriented in the 12 o'clock direction and the 6 o'clock direction in a conventional TN mode LCD device.

Japanese Laid-Open Publication No. 10-3081 discloses a technique of combining a pixel region dividing method in which each pixel region is divided at an unequal ratio (any ratio excluding 1:1) with an optical phase plate of which the index ellipsoid is tilted as described above. In an LCD device disclosed in this publication, an LCD element and an optical phase plate are arranged so that the tilt direction of the index ellipsoid of the optical phase plate is opposite to the pretilt direction of liquid crystal molecules which are located in the vicinity of an alignment film in a larger liquid crystal molecule orientation domain in each pixel region. By this arrangement, the angle of field in the upward and downward directions, as well as in the right and left directions, can be widened.

However, the above prior art methods still have at least the following problems. Under the present circumstances where LCD devices having a wider angle of field and higher display quality are desired, further improvement on the viewing angle dependency is required. Using only an optical phase plate, as disclosed in the above mentioned Japanese Laid-Open Publication No. 6-75116, is not sufficient.

In the methods disclosed in Japanese Laid-Open Publication Nos. 8-101381 and 5-215912, as mentioned above, it is not practical to use an optical phase plate made of a material having appropriate wavelength dispersion since this restricts the range of materials usable for the optical phase plate. In the case of adjusting the thickness of the optical phase plate, when the optical phase plate is thickened, the phase difference changes due to a change in the optical path length and a change in the index ellipsoid generated when the viewing angle is dropped. This frustrates the attempt of widening the angle of field and thus is not desirable in practice. Moreover, these methods do not reduce the coloring phenomenon of the display screen when the viewing angle is dropped downward. Therefore, these methods still have problems yet to be overcome.

As for the technique of combining the pixel region dividing method in which each pixel region is divided at an unequal ratio with the optical phase plate of which the index ellipsoid is tilted as described above, this technique alone is not considered sufficient to meet the requirements of a wide angle of field, high display quality, and high color reproducibility.

In order to reduce the coloring phenomenon in the negative viewing direction, the decrease in the contrast ratio, and the inversion phenomenon in the right and left directions in an LCD device using an optical phase plate of which the index ellipsoid is tilted (hereinafter, such an optical phase plate is referred to as a tilted phase plate), the following improvements are disclosed.

Japanese Laid-Open Publication No. 10-123503 discloses a method in which the retardation d·Δn of a liquid crystal layer, i.e., the product of the refractive index anisotropy Δn of a liquid crystal material and the cell thickness d, is set in the range between 300 nm and 550 nm, inclusive.

Japanese Laid-Open Publication No. 10-186532 discloses a method in which a liquid crystal material having a small wavelength dispersion of the refractive index anisotropy Δn is used for an LCD device using a tilted phase plate to reduce yellowish coloring in the right and left directions.

Japanese Laid-Open Publication No. 10-282485 discloses a method for adjusting the pretilt angle of liquid crystal molecules and the voltage for white display, as well as adjusting the conditions of the wavelength dispersion nF of a tilted phase plate and the wavelength dispersion nL of a liquid crystal material in an LCD using the tilted phase plate in order to further widen the angle of field and reduce yellowish coloring in the right and left directions.

In order to improve yellowish coloring in the right and left directions in an LCD device using a tilted phase plate in which each pixel region is divided at an unequal ratio, the following improvements are disclosed.

Japanese Laid-Open Publication No. 10-246885 discloses a method in which a liquid crystal material having a small wavelength dispersion of the refractive index anisotropy Δn is used.

Japanese Laid-Open Publication No. 9-233099 discloses a method for adjusting the conditions of the wavelength dispersion nF of a tilted phase plate and the wavelength dispersion nL of a liquid crystal material in an LCD using the tilted phase plate in which each pixel is divided at an unequal ratio in order to reduce yellowish coloring in the right and left directions.

Japanese Laid-Open Publication No. 9-235181 discloses a method for adjusting the pretilt angle of liquid crystal molecules and the voltage for white display in an LCD using a tilted phase plate in order to further improve the display quality in the negative viewing direction.

Despite the above improvements the following problem still arises, in the case of disposing an optical phase plate (optical anisotropy film) of which the index ellipsoid is tilted as described above between a polarizing plate and an LCD element, if the wavelength dependence of the ordinary light refractive index and the extraordinary light refractive index of a liquid crystal material does not combine well with the refractive index of the optical phase plate coloring becomes significant when the viewing angle is dropped or during gray scale display; thus markedly deteriorating the state of display images.

An object of the present invention is to provide an LCD device capable of further reducing the change in contrast, the coloring phenomenon, the inversion phenomenon, and the like caused depending on the viewing angle; and in particular, an LCD device capable of effectively reducing the coloring phenomenon on a liquid crystal screen caused depending on the viewing angle.

Another object of the present invention is to provide an LCD device in which a portion of a liquid crystal layer corresponding to one pixel region is divided into a plurality of liquid crystal molecule orientation domains having different orientation states at an unequal ratio, capable of widening the angle of field in the right and left directions as well as in the upward and downward directions and preventing coloring from occurring when the viewing angle is dropped or during gray scale display, thereby realizing high-quality image display with a wide angle of field.

SUMMARY OF THE INVENTION

The liquid crystal display device of this invention includes: a liquid crystal display element including a pair of substrates, a liquid crystal layer interposed between the pair of substrates, and an alignment film formed on a surface of at least one of the pair of substrates facing the liquid crystal layer; a pair of polarizers disposed on both surfaces of the liquid crystal element to sandwich the liquid crystal element; and at least one optical phase element disposed between at least one of the pair of polarizers and the liquid crystal element, wherein three principal refractive indices na, nb, and nc of an index ellipsoid of the optical phase element have the relationship of na=nc>nb, a direction of the principal refractive index nb is tilted clockwise or counterclockwise from the normal of a surface of the optical phase element with respect to a direction of one of the principal refractive indices na and nc which is substantially parallel to the surface of the optical phase element as an axis, and a direction of the other principal refractive index nc or na is tilted clockwise or counterclockwise from a direction substantially parallel to the surface of the optical phase element, and at least one of rates of variation of an ordinary refractive index no and an extraordinary refractive index ne of a liquid crystal material of the liquid crystal layer with respect to a wavelength is set in a range in which viewing angle dependent coloring does not occur on a screen.

Alternatively, the liquid crystal display device of this invention includes: a liquid crystal display element including a pair of substrates, a liquid crystal layer interposed between the pair of substrates, and an alignment film formed on a surface of at least one of the pair of substrates facing the liquid crystal layer; a pair of polarizers disposed on both surfaces of the liquid crystal element to sandwich the liquid crystal element; and at least one optical phase element disposed between at least one of the pair of polarizers and the liquid crystal element, wherein three principal refractive indices na, nb, and na of an index ellipsoid of the optical phase element have the relationship of na=nc>nb, a direction of the principal refractive index nb is tilted clockwise or counterclockwise from the normal of a surface of the optical phase element with respect to a direction of one of the principal refractive indices na and nc which is substantially parallel to the surface of the optical phase element as an axis, and a direction of the other principal refractive index nc or na is tilted clockwise or counterclockwise from a direction substantially parallel to the surface of the optical phase element, and conditions of the combination of a length of a mean alkyl chain of a liquid crystal material of the liquid crystal layer, a rate of variation of an ordinary refractive index no of the liquid crystal material with respect to a wavelength, and a rate of variation of an extraordinary refractive index ne of the liquid crystal material with respect to a wavelength are set in a range in which viewing angle dependent coloring does not occur on a screen.

In one embodiment of the invention, the liquid crystal display device further includes a plurality of pixel regions for displaying, wherein at least one of the plurality of pixel regions is divided into a first liquid crystal molecule orientation domain and a second liquid crystal molecule orientation domain which have different orientation states of liquid crystal molecules included in the liquid crystal layer, and the area of the first liquid crystal molecule orientation domain is larger than the area of the second liquid crystal molecule orientation domain.

In still another embodiment of the invention, the rate of variation among extraordinary light refractive indices ne(450), ne(550), and ne(650) for light with wavelengths of 450 nm, 550 nm, and 650 nm, respectively, and the rate of variation among ordinary light refractive indices no(450), no(550), and no(650) for light with wavelengths of 450 nm, 550 nm, and 650 nm, respectively, have the relationship of:

$$((no(450) - no(550))/(no(550) - no(650)))/$$
$$((ne(450) - ne(550))/(ne(550) - ne(650))) \geq 1.00.$$

In still another embodiment of the invention, the rate of variation among the ordinary light refractive indices no(450), no(550), and no(650) for light with wavelengths of 450 nm, 550 nm, and 650 nm, respectively, is set in a range of:

$$1.65 \leq (no(450)-no(550))/(no(550)-no(650)) \leq 2.40.$$

In still another embodiment of the invention, the rate of variation among the ordinary light refractive indices no(450), no(550), and no(650) for light with wavelengths of 450 nm, 550 nm, and 650 nm, respectively, is set in a range of:

$$1.85 \leq (no(450)-no(550))/(no(550)-no(650)) \leq 2.20.$$

In still another embodiment of the invention, the rate of variation among the extraordinary light refractive indices ne(450), ne(550), and ne(650) for light with wavelengths of 450 nm, 550 nm, and 650 nm, respectively, is set in a range of:

$$1.70 \leq (ne(450)-ne(550))/(ne(550)-ne(650)) \leq \mathbf{2.30}.$$

In still another embodiment of the invention, the rate of variation among the extraordinary light refractive indices ne(450), ne(550), and ne(650) for light with wavelengths of 450 nm, 550 nm, and 650 nm, respectively, is set in a range of:

$$1.85 \leq (ne(450)-ne(550))/(ne(550)-ne(650)) \leq 2.10.$$

In still another embodiment of the invention, the rate of variation among extraordinary light refractive indices ne(450), ne(550), and ne(650) for light with wavelengths of 450 nm, 550 nm, and 650 nm, respectively, and the rate of variation among ordinary light refractive indices no(450), no(550), and no(650) for light with wavelengths of 450 nm, 550 nm, and 650 nm, respectively, have the relationship of:

$$((no(450) - no(550))/(no(550) - no(650)))/$$
$$((ne(450) - ne(550))/(ne(550) - ne(650))) < 1.00.$$

In still another embodiment of the invention, the rate of variation among the ordinary light refractive indices no(450), no(550), and no(650) for light with wavelengths of 450 nm, 550 nm, and 650 nm, respectively, is set in a range of:

$$1.00 \leq (no(450)-no(550))/(no(550)-no(650)) \leq 1.65.$$

In still another embodiment of the invention, the rate of variation among the ordinary light refractive indices no(450), no(550), and no(650) for light with wavelengths of 450 nm, 550 nm, and 650 nm, respectively, is set in a range of:

$$1.15 \leq (no(450)-no(550))/(no(550)-no(650)) \leq 1.45.$$

In still another embodiment of the invention, the rate of variation among the extraordinary light refractive indices ne(450), ne(550), and ne(650) for light with wavelengths of 450 nm, 550 nm, and 650 nm, respectively, is set in a range of:

$$1.20 \leq (ne(450)-ne(550))/(ne(550)-ne(650)) \leq 1.70.$$

In still another embodiment of the invention, the rate of variation among the extraordinary light refractive indices ne(450), ne(550), and ne(650) for light with wavelengths of 450 nm, 550 nm, and 650 nm, respectively, is set in a range of:

$$1.35 \leq (ne(450)-ne(550))/(ne(550)-ne(650)) \leq 1.60.$$

In still another embodiment of the invention, the length m of the mean alkyl chain ($C_mH_{2m+1}$—) of the liquid crystal material is set in a range of m<3.40, and the rate of variation among extraordinary light refractive indices ne(450), ne(550), and ne(650) of the liquid crystal material for light with wavelengths of 450 nm, 550 nm, and 650 nm, respectively, and the rate of variation among ordinary light refractive indices no(450), no(550), and no(650) for light with wavelengths of 450 nm, 550 nm, and 650 nm, respectively, are set in a range of:

$$1.00 \leq ((no(450) - no(550))/(no(550) - no(650)))/$$
$$((ne(450) - ne(550))/(ne(550) - ne(650))) \leq -0.422m + 2.55.$$

In still another embodiment of the invention, the rate of variation among the extraordinary light refractive indices ne(450), ne(550), and ne(650) of the liquid crystal material for light with wavelengths of 450 nm, 550 nm, and 650 nm, respectively, and the rate of variation among the ordinary light with wavelengths of 450 nm, 550 nm, and 650 nm, respectively, are set in a range of:

$$1.00 \leq ((no(450) - no(550))/(no(550) - no(650)))/$$
$$((ne(450) - ne(550))/(ne(550) - ne(650))) \leq -0.343m + 2.26.$$

In still another embodiment of the invention, the length m of the mean alkyl chain ($C_mH_{2m+1}$—) of the liquid crystal material is set in a range of $3.40 \leq m \leq 3.90$, and the rate of variation among extraordinary light refractive indices ne(450), ne(550), and ne(650) of the liquid crystal material for light with wavelengths of 450 nm, 550 nm, and 650 nm, respectively, and the rate of variation among ordinary light refractive indices no(450), no(550), and nb(650) for light with wavelengths of 450 nm, 550 nm, and 650 nm, respectively, are set in a range of:

$$0.80 \leq ((no(450) - no(550))/(no(550) - no(650)))/$$
$$((ne(450) - ne(550))/(ne(550) - ne(650))) \leq 1.20.$$

In still another embodiment of the invention, the rate of variation among the extraordinary light refractive indices ne(450), ne(550), and ne(650) of the liquid crystal material for light with wavelengths of 450 nm, 550 nm, and 650 nm, respectively, and the rate of variation among the ordinary light refractive indices no(450), no(550), and no(650) for light with wavelengths of 450 nm, 550 nm, and 650 nm, respectively, are set in a range of:

$$0.85 \leq ((no(450) - no(550))/(no(550) - no(650)))/$$
$$((ne(450) - ne(550))/(ne(550) - ne(650))) \leq 1.15.$$

In still another embodiment of the invention, the length m of the mean alkyl chain ($C_mH_{2m+1}$—) of the liquid crystal material is set in a range of m>3.90, and the rate of variation among extraordinary light refractive indices ne(450), ne(550), and ne(650) of the liquid crystal material for light with wavelengths of 450 nm, 550 nm, and 650 nm, respectively, and the rate of variation among ordinary light refractive indices no(450), no(550), and no(650) for light with wavelengths of 450 nm, 550 nm, and 650 nm, respectively, are set in a range of:

$$-0.422m + 2.55 \leq ((no(450) - no(550))/(no(550) - no(650)))/$$
$$((ne(450) - ne(550))/(ne(550) - ne(650))) \leq 1.00.$$

In still another embodiment of the invention, the rate of variation among the extraordinary light refractive indices ne(450), ne(550), and ne(650) of the liquid crystal material for light with wavelengths of 450 nm, 550 nm, and 650 nm, respectively, and the rate of variation among the ordinary light refractive indices no(450), no(550), and no(650) for light with wavelengths of 450 nm, 550 nm, and 650 nm, respectively, are set in a range of:

$$-0.343m + 2.26 \leq ((no(450) - no(550))/(no(550) - no(650)))/$$
$$((ne(450) - ne(550))/(ne(550) - ne(650))) \leq 1.00.$$

In still another embodiment of the invention, a value of refractive index anisotropy Δn(550) of the liquid crystal material for light with a wavelength of 550 nm is set in a range of:

$$0.060 < \Delta n(550) < 0.120.$$

In still another embodiment of the invention, the value of the refractive index anisotropy Δn(550) of the liquid crystal material for light with a wavelength of 550 nm is set in a range of:

$$0.70 < \Delta n(550) < 0.095.$$

In still another embodiment of the invention, a tilt angle of the index ellipsoid of the optical phase element is set in a range between 15° and 75° inclusive.

In still another embodiment of the invention, the product of the difference between the principal refractive indices na and nb of the optical phase element and the thickness d of the optical phase element, i.e., (na−nb)×d is set in a range between 80 nm and 250 nm inclusive.

In still another embodiment of the invention, the liquid crystal display element and the optical phase element are arranged so that an alignment direction of the alignment film is opposite to a tilt direction of the principal refractive indices nb and nc of the optical phase element in the first liquid crystal molecule orientation domain.

In still another embodiment of the invention, the liquid crystal display element and the optical phase element are arranged so that the alignment direction of the alignment film is the same as the tilt direction of the principal refractive indices nb and nc of the optical phase element in the second liquid crystal molecule orientation domain.

In still another embodiment of the invention, an area ratio of the first liquid crystal molecule orientation domain to the second liquid crystal molecule orientation domain in the at least one pixel region is set in a range between 6:4 and 19:1 inclusive.

In still another embodiment of the invention, liquid crystal molecules in the liquid crystal layer are twisted about 90° between the pair of substrates.

Thus, the invention described herein makes possible the advantages of (1) providing an LCD device capable of further reducing the change in contrast, the coloring phenomenon, the inversion phenomenon, and the like caused depending on the viewing angle; and in particular, an LCD device capable of effectively reducing the coloring phenomenon on a liquid crystal screen caused depending on the viewing angle, and (2) providing an LCD device in which a portion of a liquid crystal layer corresponding to one pixel region is divided into a plurality of liquid crystal molecule orientation domains having different orientation states at an unequal ratio, capable of widening the angle of field in the right and left directions as well as in the upward and downward directions and preventing coloring from occurring when the viewing angle is dropped or during gray scale display, thereby realizing high-quality image display with a wide angle of field.

These and other advantages of the present invention will become apparent to those skilled in the art upon reading and understanding the following detailed description with reference to the accompanying figures.

BRIEF DESCRIPTION OF THE DRAWINGS

FIGS. 6A to 6C are graphs showing the transmittance vs. applied voltage characteristics of LCD devices of Example 5 according to the present invention;

FIGS. 7A to 7C are graphs showing the transmittance vs. applied voltage characteristics of LCD devices of comparative examples;

FIGS. 9A to 9C are graphs showing the transmittance vs. applied voltage characteristics of LCD devices of comparative examples;

DESCRIPTION OF THE PREFERRED EMBODIMENTS

Figure 1:
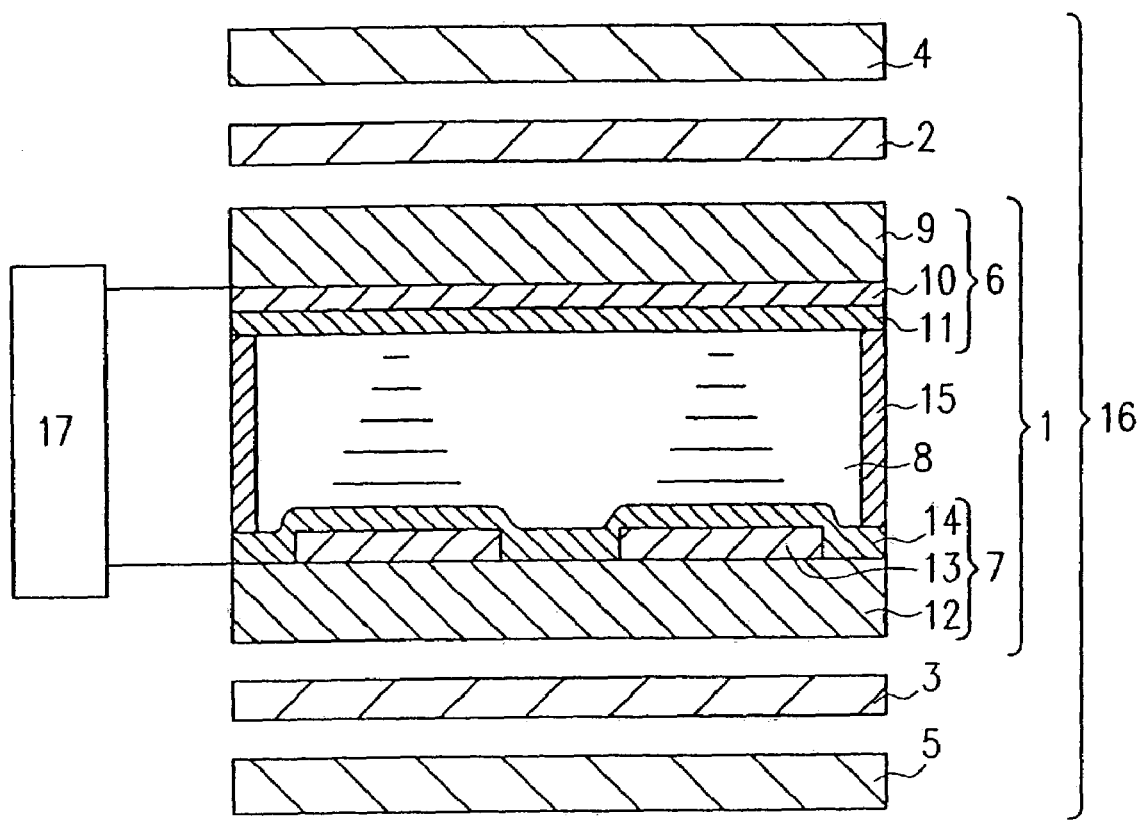
FIG. 1 is a sectional view of an LCD device of an embodiment according to the present invention.

Hereinafter, the progress and function of the present invention will be described.

In the present invention, three principal refractive indices na, nb, and nc of an index ellipsoid of a phase element have the relationship of na=nc>nb. The direction of the principal refractive index nb is tilted clockwise or counterclockwise from the normal of the surface of the phase element with respect to the direction of one of the principal refractive indices na and nc which is substantially parallel to the surface of the phase element as an axis. At the same time, the direction of the other principal refractive index nc or na is tilted clockwise or counterclockwise from the direction substantially parallel to the surface of the phase element. In this way, the index ellipsoid of the phase element is tilted. When a linear polarized light beam passes through a liquid crystal layer having birefringence, generating ordinary light and extraordinary light, it is changed to an elliptic polarized light beam due to the phase difference between the ordinary light and the extraordinary light. By providing the phase element, the phase difference between the ordinary light and the extraordinary light is compensated.

However, with the above compensation function of the phase element alone, the goal of further reducing the visual dependence is not satisfied.

According to the present invention, when the wavelength dependence of the ordinary light refractive index no and the extraordinary light refractive index ne of a liquid crystal material included in an LCD element does not combine well with the wavelength dependence of the refractive index of the phase element, coloring becomes significant when the viewing angle is dropped or during gray scale display, markedly deteriorating the state of display images. In particular, it has been found that (1) the rate of variation of the ordinary light refractive index no of the liquid crystal material with respect to the wavelength and the rate of variation of the extraordinary light refractive index ne of the liquid crystal material with respect to the wavelength affect the coloring on the liquid crystal display screen, and (2) the conditions of the combination of the mean alkyl chain length of the liquid crystal material, the rate of variation of the ordinary light refractive index no of the liquid crystal material with respect to the wavelength, and the rate of variation of the extraordinary light refractive index ne of the liquid crystal material with respect to the wavelength affect the coloring on the liquid crystal display screen. The present invention is based on the above findings.

In the LCD device according to the present invention, at least one of the rates of variation of the ordinary light refractive index no and the extraordinary light refractive index ne of the liquid crystal material with respect to the wavelength is set in the range in which viewing angle dependent screen coloring does not occur. This further ensures the prevention of the occurrence of screen coloring. Also, the change in contrast and the inversion phenomenon can be further reduced, compared with the case of using only the compensation function of the phase element, as will be described later in embodiments of the present invention.

In the LCD device according to the present invention, the conditions of the combination of the mean alkyl chain length of the liquid crystal material, and the rates of variation of the ordinary light refractive index no and the extraordinary light refractive index ne of the liquid crystal material with respect to the wavelength are set in a range in which viewing angle dependent screen coloring does not occur. This further ensures the prevention of the occurrence of screen coloring. Also, the change in contrast and the inversion phenomenon can be further reduced, compared with the case of using only the compensation function of the phase element, as will be described later in embodiments of the present invention.

As described above, by combining an LCD element in which a portion of a liquid crystal layer corresponding to one pixel region is divided into a plurality of liquid crystal molecule orientation domains having different orientation states and different areas with a negative uniaxial optical phase element of which the index ellipsoid is tilted, the angle of field can be widened in the upward and downward directions (12 o'clock–6 o'clock directions) as well as in the right and left directions (3 o'clock–9 o'clock directions).

In the LCD device with the above configuration, when the LCD element and the optical phase element are arranged so that the direction in which liquid crystal molecules rise upon the application of a voltage in the largest liquid crystal molecule orientation domain in one pixel region is opposite to the tilt direction of the index ellipsoid of the optical phase element, the refractive index anisotropy of the liquid crystal molecules which rise upon the application of a voltage in the largest liquid crystal molecule orientation domain in the pixel region is compensated by the negative uniaxial optical phase element. This improves the contrast and reduces scale inversion, but causes a problem of destroying black scale. In order to overcome this problem, the LCD element and the optical phase plate are also arranged so that the direction in which liquid crystal molecules rise upon the application of a voltage in the smallest liquid crystal molecule orientation domain in one pixel region is the same as the tilt direction of the index ellipsoid of the optical phase element. With this arrangement, since the smallest liquid crystal molecule orientation domain has a viewing angle characteristic opposite to that of the largest liquid crystal molecule orientation domain, the destruction of black scale in the largest liquid crystal molecule orientation domain is reduced, and thus the angle of field in the upward and downward directions can be widened.

In the LCD device with the above configuration, however, if the wavelength dependence of the ordinary light refractive index no of the liquid crystal material and the wavelength dependence of the extraordinary light refractive index ne of the liquid crystal material do not combine well with the wavelength dependence of the refractive index of the optical phase element, coloring on the display screen becomes significant when the viewing angle is dropped or during gray scale display, markedly deteriorating the quality of display images.

In order to overcome the above problem, a design guideline for the material for the liquid crystal layer has been established for realizing a high quality LCD device having a wide angle of field in which the angle of field in the upward and downward directions as well as the right and left directions is widened and coloring does not occur when the viewing angle is dropped or during gray scale display.

In the LCD device according to the present invention, a portion of the liquid crystal layer corresponding to at least one pixel region is divided into a first liquid crystal molecule orientation domain and a second liquid crystal molecule orientation domain so that the area of the first liquid crystal molecule orientation domain is larger than the area of the second liquid crystal molecule orientation domain. Also, at least one of the rates of variation of the ordinary light refractive index no and the extraordinary light refractive index ne of the liquid crystal material with respect to the wavelength is set in the range in which viewing angle dependent screen coloring does not occur. Alternatively, the portion of the liquid crystal layer corresponding to at least one pixel region is divided into a first liquid crystal molecule orientation domain and a second liquid crystal molecule orientation domain so that the area of the first liquid crystal molecule orientation domain is larger than the area of the second liquid crystal molecule orientation domain. Also, the conditions of the combination of the mean alkyl chain length of the liquid crystal material, and the rates of variation of the ordinary light refractive index no and the extraordinary light refractive index ne of the liquid crystal material with respect to the wavelength are set in a range in which viewing angle dependent screen coloring does not occur. This further prevents screen coloring from occurring, and also further reduces the change in contrast and the inversion phenomenon, compared with the case of using only the compensation function of the phase element, as will be described later in embodiments of the present invention.

As a result of further research, it has been found that, in some liquid crystal material for the liquid crystal layer of the LCD element, the range of the rate of variation of the refractive index with respect to the wavelength in which viewing angle dependent screen coloring does not occur is different depending on specific cases.

Based on the above findings, in the LCD device according to the present invention, at least one of the rates of variation of the ordinary light refractive index no and the extraordinary light refractive index ne of the liquid crystal material, with respect to the wavelength, is set to be in a range in which viewing angle dependent screen coloring does not occur, in the following two cases:

The extraordinary light refractive indices $ne(450)$, $ne(550)$, and $ne(650)$ for light with wavelengths of 450 nm, 550 nm, and 650 nm, respectively, and the ordinary light refractive indices $no(450)$, $no(550)$, and $(650)$ for light with wavelengths of 450 nm, 550 nm, and 650 nm, respectively, have the relationship of:

$$((no(450) - no(550))/(no(550) - no(650)))/$$
$$((ne(450) - ne(550))/(ne(550) - ne(650))) \geq 1.00, \text{ and}$$

$$((no(450) - no(550))/(no(550) - no(650)))/$$
$$((ne(450) - ne(550))/(ne(550) - ne(650))) < 1.00.$$

The rates of variation of the ordinary light refractive index no and the extraordinary light refractive index ne of the liquid crystal material with respect to the wavelength are specifically set in the following range.

(1) When the rate of variation among the extraordinary light refractive indices $ne(450)$, $ne(550)$, and $ne(650)$ for light with wavelengths of 450 nm, 550 nm, and 650 nm, respectively, and the rate of variation among the ordinary light refractive indices $no(450)$, $no(550)$, and $(650)$ for light with wavelengths of 450 nm, 550 nm, and 650 nm, respectively, have the relationship of:

$$((no(450) - no(550))/(no(550) - no(650)))/$$
$$((ne(450) - ne(550))/(ne(550) - ne(650))) \geq 1.00,$$

the rate of variation among the ordinary light refractive indices $no(450)$, $no(550)$, and $no(650)$ for light with wavelengths of 450 nm, 550 nm, and 650 nm, respectively, is set in the range of:

$$1.65 \leq (no(450) - no(550))/(no(550) - no(650)) \leq 2.40.$$

Alternatively, the rate of variation among the extraordinary light refractive indices $ne(450)$, $ne(550)$, and $ne(650)$ for light with wavelengths of 450 nm, 550 nm, and 650 nm, respectively, is set in the range of:

$$1.70 \leq (ne(450) - ne(550))/(ne(550) - ne(650)) \leq 2.30.$$

By utilizing at least one of the above ranges, the resultant display is sufficiently tolerable for use when viewed in any direction at a viewing angle of 50° required for a normal LCD device, although slight coloring is inevitable, as will be described later in Examples 1 and 2. Otherwise, display images with a wide angle of field and high quality without coloring when the viewing angle is dropped or during gray scale display are obtained, as will be described later in Examples 10 and 11.

More preferably, the rate of variation is set in the following range:

$$1.85 \leq (no(450) - no(550))/(no(550) - no(650)) \leq 2.20,$$
or
$$1.85 \leq (ne(450) - ne(550))/(ne(550) - ne(650)) \leq 2.10.$$

By utilizing at least one of the above ranges, the resultant display has no coloring phenomenon at all when viewed in any direction at a wider viewing angle, 70°, as will be described later in Examples 1 and 2. Otherwise, display images with a wide angle of field, high quality, and excellent reproducibility where coloring is further prevented are obtained, as will be described later in Examples 10 and 11.

(2) When the rate of variation among the extraordinary light refractive indices $ne(450)$, $ne(550)$, and $ne(650)$ for light with wavelengths of 450 nm, 550 nm, and 650 nm, respectively, and the rate of variation among the ordinary light refractive indices $no(450)$, $no(550)$, and $(650)$ for light with wavelengths of 450 nm, 550 nm, and 650 nm, respectively, have the relationship of:

$$((no(450) - no(550))/(no(550) - no(650)))/$$
$$((ne(450) - ne(550))/(ne(550) - ne(650))) < 1.00,$$

the rate of variation among the ordinary light refractive indices $no(450)$, $no(550)$, and $no(650)$ for light with wavelengths of 450 nm, 550 nm, and 650 nm, respectively, is set in the range of:

$$1.00 \leq (no(450) - no(550))/(no(550) - no(650)) \leq 1.65.$$

Alternatively, the rate of variation among the extraordinary light refractive indices $ne(450)$, $ne(550)$, and $ne(650)$ for light with wavelengths of 450 nm, 550 nm, and 650 nm is set in the range of:

$$1.20 \leq (ne(450) - ne(550))/(ne(550) - ne(650)) \leq 1.70.$$

By utilizing at least one of the above ranges, the resultant display is sufficiently tolerable when viewed in any direction at a viewing angle of 50° required for a normal LCD device, although slight coloring is inevitable, as will be described later in Examples 3 and 4. Otherwise, display images with a wide angle of field and high quality without coloring when the viewing angle is dropped or during gray scale display are obtained, as, will be described later in Examples 12 and 13.

More preferably, the rate of variation is set in the following range:

$$1.15 \leq (no(450) - no(550))/(no(550) - no(650)) \leq 1.45,$$
or
$$1.35 \leq (ne(450) - ne(550))/(ne(550) - ne(650)) \leq 1.60.$$

By utilizing at least one of the above ranges, the resultant display has no coloring phenomenon at all when viewed in any direction at a wider viewing angle, 70°, as will be described later in Examples 3 and 4. Otherwise, display images with a wide angle of field, high quality, and excellent reproducibility where coloring is further prevented are obtained, as will be described later in Examples 12 and 13.

The conditions of the combination of the mean alkyl chain length of the liquid crystal material and the rates of variation of the ordinary light refractive index no and the extraordinary light refractive index ne of the liquid crystal material with respect to the wavelength are specifically set in the following range.

(1) In the case where the length m of a mean alkyl chain ($C_mH_{2m+1}$—) of the liquid crystal material is m<3.40, the rate of variation among the extraordinary light refractive indices ne(450), ne(550), and ne(650) for light with wavelengths of 450 nm, 550 nm, and 650 nm, respectively, and the rate of variation among the ordinary light refractive indices no(450), no(550), and no(650) for light with wavelengths of 450 nm, 550 nm, and 650 nm, respectively, are set in the following range:

$$1.00 \leq ((no(450) - no(550))/(no(550) - no(650)))/$$
$$((ne(450) - ne(550))/(ne(550) - ne(650))) \leq -0.422m + 2.55.$$

By utilizing the above range, the resultant display is sufficiently tolerable when viewed in any direction at a viewing angle of 50° required for a normal LCD device, although slight coloring is inevitable, as will be described later in Example 6. Otherwise, display images with a wide angle of field and high quality without coloring when the viewing angle is dropped or during gray scale display are obtained, as will be described later in Example 17.

More preferably, the rates of variation are set in the following range:

$$1.00 \leq$$
$$(no(450) - no(550))/(no(550) - no(650))/(ne(450) - ne(550))/$$
$$(ne(550) - ne(650)) \leq -0.343m + 2.26.$$

By utilizing the above range, the resultant display has no coloring phenomenon at all when viewed in any direction at a wider viewing angle, 70°, as will be described later in Example 6. Otherwise, display images with a wide angle of field, high quality, and excellent reproducibility without coloring are obtained, as will be described later in Example 17.

(2) In the case where the length of a mean alkyl chain ($C_mH_{2m+1}$—) of the liquid crystal material is 3.40≦m≦3.90, the rate of variation among the extraordinary light refractive indices ne(450), ne(550), and ne(650) for light with wavelengths of 450 nm, 550 nm, and 650 nm, respectively, and the rate of variation among the ordinary light refractive indices no(450), no(550), and no(650) for light with wavelengths of 450 nm, 550 nm, and 650 nm, respectively, are set in the following range:

$$0.80 \leq ((no(450) - no(550))/(no(550) - no(650)))/$$
$$((ne(450) - ne(550))/(ne(550) - ne(650))) \leq 1.20.$$

By utilizing the above range, the resultant display is sufficiently tolerable when viewed in any direction at a viewing angle of 50° required for a normal LCD device, although slight coloring is inevitable, as will be described later in Example 7. Otherwise, display images with a wide angle of field and high quality without coloring when the viewing angle is dropped or during gray scale display are obtained, as will be described later in Example 18.

More preferably, the rates of variation are set in the following range:

$$0.85 <$$
$$(no(450) - no(550))/(no(550) - no(650))/(ne(450) - ne(550))/$$
$$(ne(550) - ne(650)) < 1.15.$$

By utilizing the above range, the resultant display has no coloring phenomenon at all when viewed in any direction at a wider viewing angle, 70°, as will be described later in Example 7. Otherwise, display images with a wide angle of field, high quality, and excellent reproducibility without coloring are obtained, as will be described later in Example 18.

(3) In the case where the length of a mean alkyl chain ($C_mH_{2m+1}$—) of the liquid crystal material is m>3.90, the rate of variation among the extraordinary light refractive indices ne(450), ne(550), and ne(650) for light with wavelengths of 450 nm, 550 nm, and 650 nm, respectively, and the rate of variation among the ordinary light refractive indices no(450), no(550), and no(650) for light with wavelengths of 450 nm, 550 nm, and 650 nm, respectively, are set in the following range, $$-0.422m + 2.55 \leq ((no(450) - no(550))/(no(550) - no(650)))/$$
$$((ne(450) - ne(550))/(ne(550) - ne(650))) \leq 1.00.$$

By utilizing the above range, the resultant display is sufficiently tolerable when viewed in any direction at a viewing angle of 50° required for a normal LCD device, although slight coloring is inevitable, as will be described later in Example 8. Otherwise, display images with a wide angle of field and high quality without coloring when the viewing angle is dropped or during gray scale display are obtained, as will be described later in Example 16.

More preferably, the rates of variation are set in the following range:

$$-0.343m + 2.26 \leq ((no(450) - no(550))/(no(550) - no(650)))/$$
$$((ne(450) - ne(550))/(ne(550) - ne(650))) \leq 1.00.$$

By utilizing the above range, the resultant display has no coloring phenomenon at all when viewed in any direction at a wider viewing angle, 70°, as will be described later in Example 8. Otherwise, display images with a wide angle of field, high quality, and excellent reproducibility without coloring are obtained, as will be described later in Example 16.

In the LCD device according to the present invention, the refractive index anisotropy Δn of the liquid crystal material for light having a wavelength of 550 nm is preferably set in the range of $$0.060 < \Delta n(550) < 0.120.$$

If the refractive index anisotropy Δn(550) of the liquid crystal material for visible light having a wavelength of 550 nm is less than 0.060 or more than 0.120, it has been confirmed that an inversion phenomenon and a reduction in the contrast ratio occur depending on the viewing angle direction. Such an inversion phenomenon will be described later in Examples 5, 9, 14, and 19. The phase difference depending on the viewing angle can be eliminated by setting the refractive index anisotropy Δn(550) of the liquid crystal material for light having a wavelength of 550 nm in the range between 0.060 and 0.120, inclusive. Accordingly, the change in contrast and the inversion phenomenon in the right and left directions, as well as the coloring phenomenon occurring on the liquid crystal display screen depending on the viewing angle, can be further reduced.

Furthermore, by setting the refractive index anisotropy Δn(550) of the liquid crystal material for light having a wavelength of 550 nm in the range of:

$$0.070 \leq \Delta n(550) \leq 0.095,$$

the phase difference of the LCD element depending on the viewing angle can be eliminated more effectively without fail, as will be described later in Examples 5, 9, 14, and 19. Accordingly, it is ensured that the coloring phenomenon, the change in contrast, the inversion phenomenon in the right and left directions, which occur on the liquid crystal display screen depending on the viewing angle, can be improved.

In the LCD device according to the present invention, the tilt angle of the index ellipsoid of the optical phase element is preferably set in the range between 15° and 75° inclusive. By utilizing this range, it is ensured that the change in the phase difference between the ordinary light and the extraordinary light caused depending on the viewing angle described above can be compensated by the optical phase element, as will be described later in Examples 5, 9, 14, and 19.

In the LCD device according to the present invention, the product of the difference between the principal refractive indices na and nb of the optical phase element and the thickness d of the optical phase element, i.e., (na−nb)×d, is preferably set in the range between 80 nm and 250 nm, inclusive. By utilizing this range, it is ensured that the change in the phase difference between the ordinary light and the extraordinary light caused depending on the viewing angle, described above, can be compensated by the optical phase element, as will be described later in Examples 5, 9, 14, and 19.

The LCD device according to the present invention is preferably arranged so that the alignment direction of an alignment film for the largest liquid crystal molecule orientation domain among a plurality of liquid crystal molecule orientation domains having different liquid crystal orientation states in one pixel region is opposite to the tilt direction of the principal refractive indices nb and nc of the optical phase element. By this arrangement, the direction in which liquid crystal molecules rise upon the application of a voltage in the largest liquid crystal molecule orientation domain is opposite to the tilt direction of the index ellipsoid of the optical phase plate. Accordingly, it is ensured that the optical anisotropy generated when the liquid crystal molecules rise can be compensated by the optical phase element.

Moreover, the LCD device according to the present invention is preferably arranged so that the alignment direction of an alignment film for the smallest liquid crystal molecule orientation domain in one pixel region is the same as the tilt direction of the principal refractive indices nb and nc of the optical phase element. The smallest liquid crystal molecule orientation domain has the viewing angle characteristic opposite to that of the largest liquid crystal molecule orientation domain. With the addition of this viewing angle characteristic, therefore, destruction of black scale in the largest liquid crystal molecule orientation domain is reduced, and thus the angle of field in the upward and downward directions can be widened.

When the portion of the liquid crystal layer corresponding to one pixel region is divided into two liquid crystal molecule orientation domains, the division ratio of a first liquid crystal molecule orientation domain to a second liquid crystal molecule orientation domain is preferably in the range between 6:4 and 19:1, inclusive. This setting improves the contrast in the upward and downward directions, reduces black inversion, reduces the destruction of black scale, and thereby realizes a wider angle of field in the upward and downward directions, as will be described later in Examples 15 and 20.

The present invention is applicable to a TN mode LCD device in which liquid crystal molecules in a liquid crystal layer are twisted 90° between a pair of substrates. By applying the present invention, an LCD device with a wide angle of field, high display quality, and excellent reproducibility can be obtained.

Before the description of embodiments of the present invention, the term "pixel region" as used herein is defined as follows.

The LCD device according to the present invention includes a plurality of pixel regions for effecting display. One pixel region represents a component of the LCD device constituting a pixel which is a minimum unit of display. Typically, in an active matrix LCD device including a plurality of active elements (e.g., TFTs) arranged in a matrix and a plurality of pixel electrodes switched on or off by the respective active elements, each pixel region includes each pixel electrode, a portion of a counter electrode opposing the pixel electrode, and a liquid crystal molecule orientation domain interposed therebetween. In a single matrix LCD device including stripe-shaped electrodes (scanning electrodes and signal electrodes) extending on a pair of substrates to cross each other via a liquid crystal layer therebetween, each pixel region includes a crossing portion in which two stripe-shaped electrodes overlap and a liquid crystal molecule orientation domain interposed therebetween.

In this specification, a viewing angle or direction which is downward with respect to the Left-Right line (FIG. 2) is referred to as "positive", and a viewing angle or direction which is upward with respect to the Left-Right line is referred to as "negative".

Further in this specification, orientation directions of the liquid crystal molecules are indicated using a hypothetical clock face. In detail, where the liquid crystal panel is located in the usual direction for viewers, the top part of the liquid crystal panel is referred to as "12 o'clock", and the bottom part is referred to as "6 o'clock".

Hereinbelow, embodiments of the present invention will be descried with reference to the accompanying drawings. In the drawings, components having similar functions are denoted by the same reference numerals.

(Embodiment 1)

FIG. 1 is a sectional view of an LCD device of an embodiment according to the present invention. The LCD device of this embodiment includes a liquid crystal cell 16 including an LCD element 1, a pair of optical phase plates 2 and 3, and a pair of polarizing plates 4 and 5, and a driving circuit 17.

The LCD element 1 includes a pair of electrode substrates 6 and 7 and a liquid crystal layer 8 interposed therebetween. The electrode substrate 6 includes a base glass substrate (transparent substrate) 9, transparent electrodes 10 made of ITO (indium tin oxide) formed on the surface of the glass substrate 9 facing the liquid crystal layer 8, and an alignment film 11 formed on the transparent electrodes 10. The electrode substrate 7 includes a base glass substrate (transparent substrate) 12, transparent electrodes 13 made of ITO (indium tin oxide) formed on the surface of the glass substrate 12 facing the liquid crystal layer 8, and an alignment film 14 formed on the transparent electrodes 13. A single alignment film may be formed on either one of the substrates.

The transparent electrodes 10 and 13 are connected to the driving circuit 17. In FIG. 1, only two pixel regions are shown for simplification. It will be easily understood that the stripe-shaped transparent electrodes 10 and 13, having a predetermined width, are formed on the glass substrates 9 and 12, respectively, over a display portion of the LCD element 1 so that the transparent electrodes 10 on the glass substrate 9 and the transparent electrodes 13 on the glass substrate 12 cross each other (perpendicular to each other, in this case) as is viewed at a position normal to the substrate surface.

Figure 2:
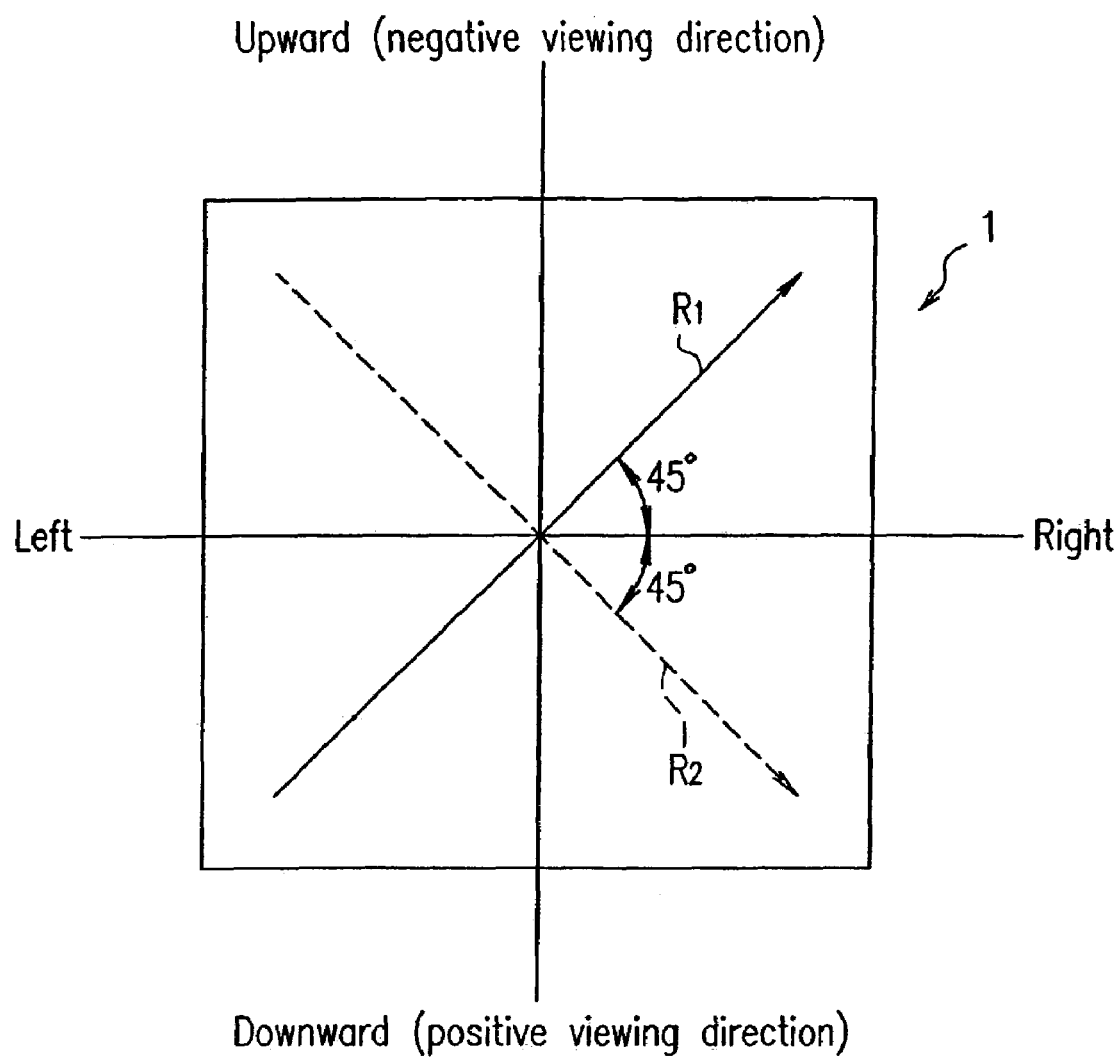
FIG. 2 is a view illustrating rubbing directions of an alignment film and viewing angle directions in the LCD device of FIG. 1.

The alignment films 11 and 14 are rubbed in advance so that liquid crystal molecules in the liquid crystal layer 8 are twisted 90° between the alignment films. That is, as shown in FIG. 2, the alignment films 11 and 14 are rubbed so that rubbing directions $R_1$ and $R_2$ of the alignment films 11 and 14, respectively, are perpendicular to each other.

The electrode substrates 6 and 7 are bonded together with a seal resin 15, and a liquid crystal material is sealed in a space enclosed by the electrode substrates 6 and 7 and the seal resin 15 to form the liquid crystal layer 8. As will be described below in detail, in the liquid crystal layer 8, the rates of variation of the ordinary light refractive index no and the extraordinary light refractive index ne of the liquid crystal material with respect to the wavelength are preset to be in a predetermined range so that optimal characteristics can be obtained in combination with the optical phase difference compensating function of the optical phase plates 2 and 3.

The optical phase plates 2 and 3 are disposed between the LCD element 1 and the polarizing plates 4 and 5, respectively, located on both surfaces of the LCD element 1. Each of the optical phase plates 2 and 3 includes a support made of a transparent organic polymer and a discotic liquid crystal material crosslinked to the support in a tilted or hybrid orientation, so that an index ellipsoid thereof is tilted as will be described later.

The support of the optical phase plates 2 and 3 is preferably made of triacetyl cellulose (TAC) which is generally used for a polarizing plate. Using this material, a reliable optical phase plate is obtained. Other materials suitable for the support include transparent and colorless organic polymer films with excellent environment resistance and chemical resistance, such as polycarbonate (PC) and polyethylene terephthalate (PET) films.

Figure 3:
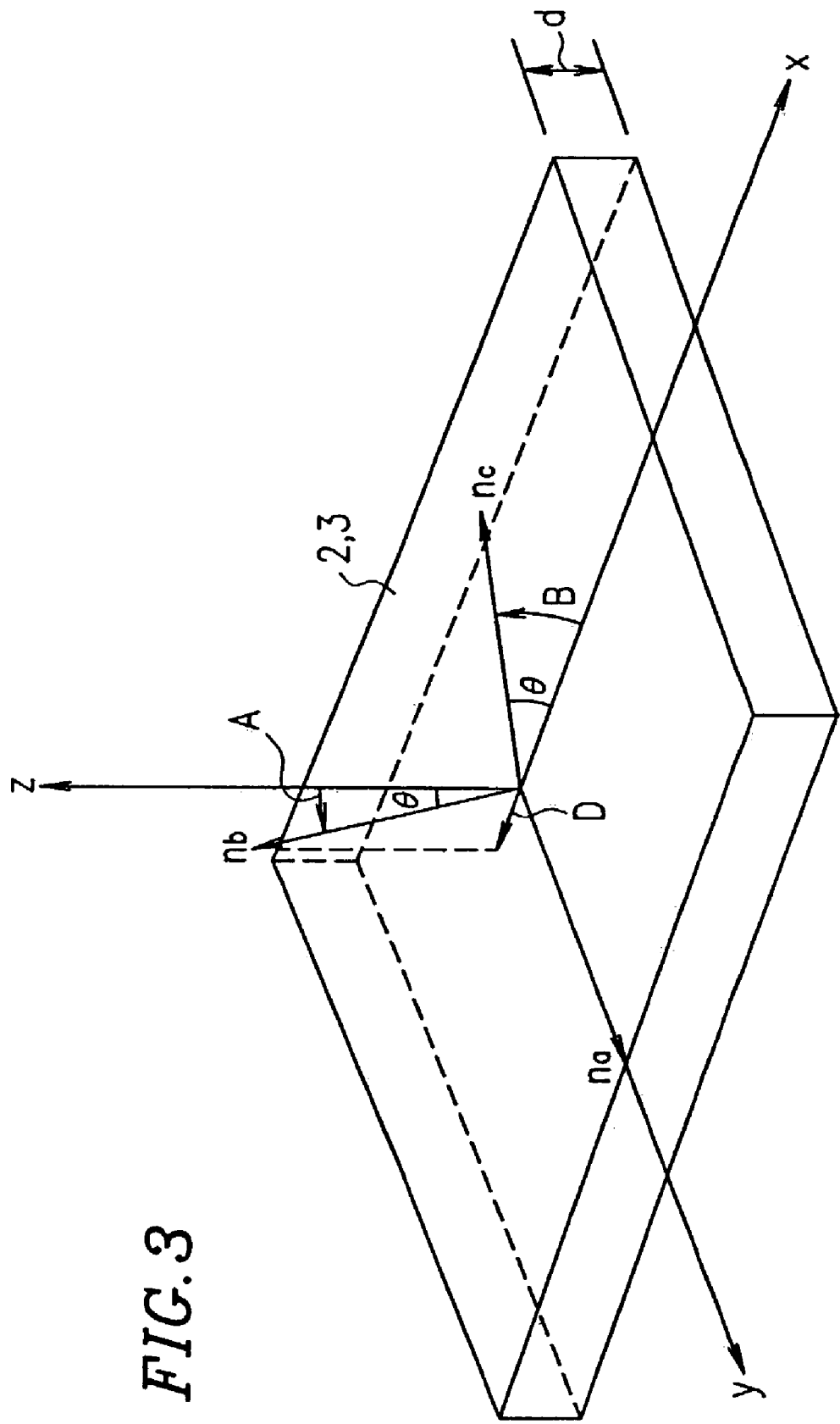
FIG. 3 is a perspective view illustrating the directions of principal refractive indices of an optical phase plate in the LCD device of FIG. 1.

As shown in FIG. 3, each of the optical phase plates 2 and 3 has principal refractive indices na, nb, and nc representing three different directions. The three principal refractive indices na, nb, and nc have the relationship of na=nc>nb. In this case, since the optical phase plate 2, 3 is uniaxial, having a single optical axis, the refractive index anisotropy is negative.

The direction of the principal refractive index na is identical to the y-axis in the rectangular coordinate system xyz, which is parallel to the surface of the optical phase plates 2 and 3 (parallel to the screen). The direction of the principal refractive index nb is tilted by an angle of θ in the direction of an arrow A from the z-axis which is normal to the surface of the optical phase plates 2 and 3 (perpendicular to the screen) with respect to the direction of the principal refractive index na as an axis. The direction of the principal refractive index no is tilted by the angle of θ in the direction of an arrow B from the x-axis which is parallel to the surface of the optical phase plates 2 and 3 (parallel to the screen) with respect to the direction of the principal refractive index na as an axis. The tilt angle θ of the index ellipsoid is preferably in the range of 15°≦θ≦75°. By utilizing this range, the optical phase plates 2 and 3 are ensured to perform the optical phase difference compensating function irrespective of whether the tilt direction of the index ellipsoid is clockwise or counterclockwise. In FIG. 3, the reference numeral D denotes the direction obtained by projecting, on the surface of the optical phase plates 2 and 3, the direction of the principal refractive index nb which is the direction providing anisotropy to the optical phase plates 2 and 3.

A first retardation value of the optical phase plates 2 and 3 is expressed by the product of the difference (refractive index anisotropy Δn) between the principal refractive indices na and nc and the thickness d of the optical phase plate ((nc−na)×d). Since na=nc, the first retardation value is substantially 0 nm. A second retardation value of the optical phase plates 2 and 3 are expressed by the product of the difference (refractive index anisotropy Δn) between the principal refractive indices na and nb and the thickness d of the optical phase plate ((na−nb)×d). The second retardation value is preferably set in the range between 80 nm and 250 nm inclusive. Setting the value in this range ensures that the optical phase plates 2 and 3 provide the optical phase plate compensating function.

In an optical anisotropic material such as a liquid crystal material and an optical phase plate (film), the anisotropy of the principal refractive indices na, nb, and nc in the three-dimensional directions is represented by the index ellipsoid. The value of the refractive index anisotropy Δn of the index ellipsoid varies depending on the direction in which the refractive index anisotropic material is observed.

Figure 4:
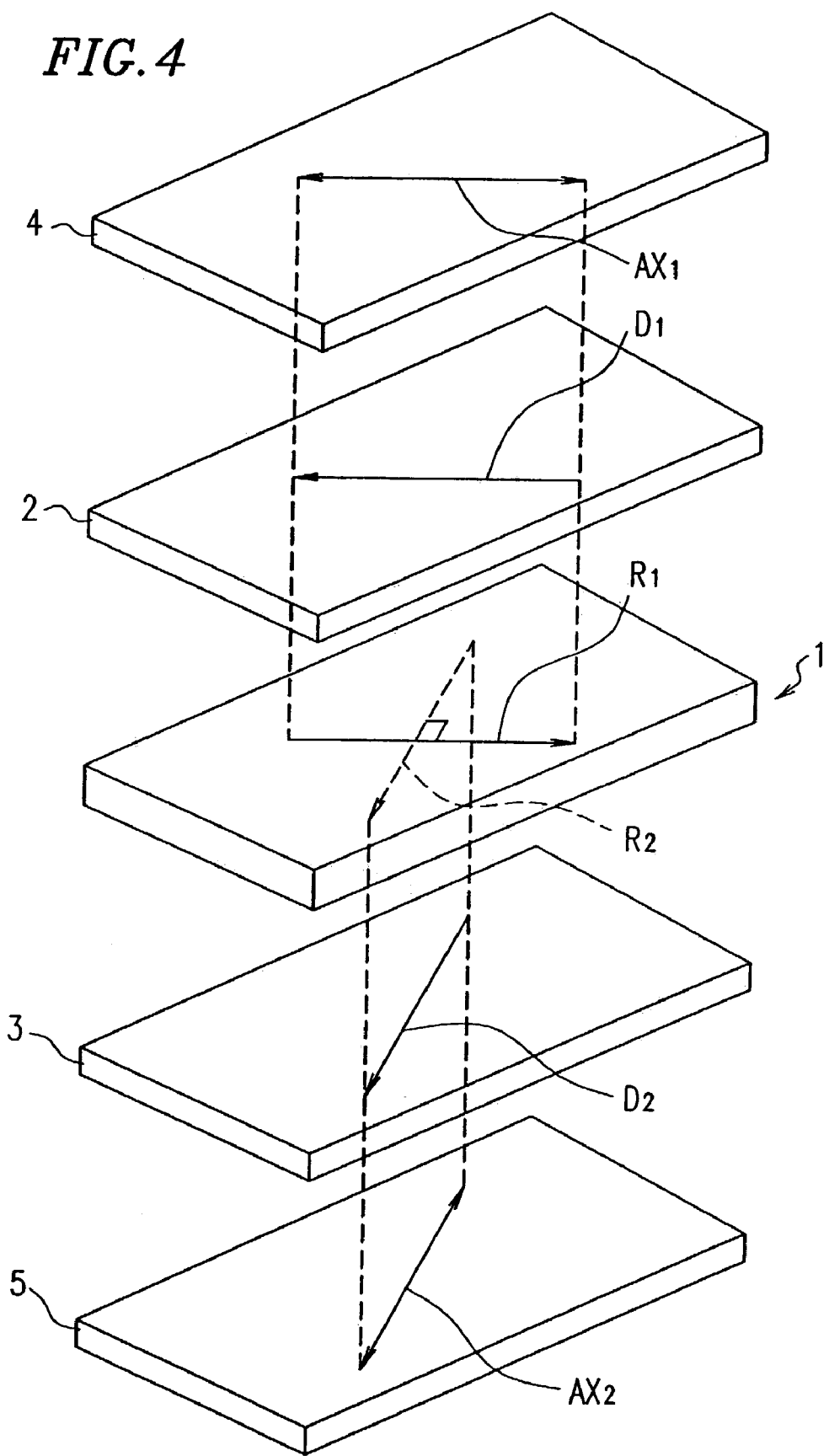
FIG. 4 is a perspective view illustrating optical arrangement of an LCD element, polarizing plates, and the optical phase plates in the LCD device of FIG. 1.

In the LCD device of this embodiment, the LCD element 1, the optical phase plates 2 and 3, and the polarizing plates 4 and 5 are arranged as shown in FIG. 4.

The polarizing plate 4 is arranged so that an absorption axis $AX_1$ thereof is parallel to the rubbing direction $R_1$ (FIG. 2) of the alignment film 11 described above, while the polarizing plate 5 is arranged so that an absorption axis $AX_2$ thereof is parallel to the rubbing direction $R_2$ (FIG. 2) of the alignment film 14. Since the rubbing directions $R_1$ and $R_2$ are orthogonal to each other, the absorption axis $AX_1$ and $AX_2$ are also orthogonal to each other.

The optical phase plate 2 is arranged so that a direction $D_1$ (corresponding to the direction D described with reference to FIG. 3) is parallel to the rubbing direction $R_1$, while the optical phase plate 3 is arranged so that a direction $D_2$ (corresponding to the direction D described with reference to FIG. 3) is parallel to the rubbing direction $R_2$.

With the above arrangement of the LCD element 1, the optical phase plates 2 and 3, and the polarizing plates 4 and 5, the resultant LCD device provides a so-called normally-white mode in which light is transmitted when no ON voltage is applied to the liquid crystal layer 8 to effect white display.

Only one of the optical phase plates 2 and 3 may be disposed on either one surface of the LCD element 1. Alternatively, both the optical phase plates 2 and 3 may be disposed on either one surface of the LCD element 1 in the manner of one on top on the other. It is also possible to use three or more optical phase plates.

Hereinbelow, the liquid crystal layer 8 will be described. As described above, in order to obtain optimal characteristics in combination with the optical phase difference compensating function of the optical phase plates 2 and 3, the rates of variation of the ordinary light refractive index no and the extraordinary light refractive index ne of the liquid crystal material with respect to the wavelength are preset to be in a predetermined range in which viewing angle dependent coloring does not occur on the display screen.

More specifically, the rates of variation of the ordinary light refractive index no and the extraordinary light refractive index ne of the liquid crystal material with respect to the wavelength are set so as to satisfy at least one of setting ranges (a) and (b) in each of the following conditions (1) and (2).

(1) When the rate of variation among the extraordinary light refractive indices ne(450), ne(550), and ne(650) for light with wavelengths of 450 nm, 550 nm, and 650 nm, respectively, and the rate of variation among the ordinary light refractive indices no(450), no(550), and no(650) for light with wavelengths of 450 nm, 550 nm, and 650 nm, respectively, have the relationship of:

$$((no(450) - no(550))/(no(550) - no(650)))/$$
$$((ne(450) - ne(550))/(ne(550) - ne(650))) \geq 1.00,$$

(a) The rate of variation among the ordinary light refractive indices no(450), no(550), and no(650) for light with wavelengths of 450 nm, 550 nm, and 650 nm, respectively, is set in the range of:

$$1.65 \leq (no(450) - no(550))/(no(550) - no(650)) \leq 2.40.$$

More preferably, the rate of variation is set in the following range:

$$1.85 \leq (no(450) - no(550))/(no(550) - no(650)) \leq 2.20.$$

(b) The rate of variation among the extraordinary light refractive indices ne(450), ne(550), and ne(650) for light with wavelengths of 450 nm, 550 nm, and 650 nm, respectively, is set in the range of:

$$1.70 \leq (ne(450) - ne(550))/(ne(550) - ne(650)) \leq 2.30.$$

More preferably, the rate of variation is set in the following range:

$$1.85 \leq (ne(450) - ne(550))/(ne(550) - ne(650)) \leq 2.10.$$

(2) When the rate of variation among the extraordinary light refractive indices ne(450), ne(550), and ne(650) for light with wavelengths of 450 nm, 550 nm, and 650 nm, respectively, and the rate of variation among the ordinary light refractive indices no(450), no(550), and no(650) for light with wavelengths of 450 nm, 550 nm, and 650 nm, respectively, have the relationship of:

$$((no(450) - no(550))/(no(550) - no(650)))/$$
$$((ne(450) - ne(550))/(ne(550) - ne(650))) < 1.00,$$

(a) The rate of variation among the ordinary light refractive indices no(450), no(550), and no(650) for light with wavelengths of 450 nm, 550 nm, and 650 nm, respectively, is set in the range of:

$$1.00 \leq (no(450) - no(550))/(no(550) - no(650)) \leq 1.65.$$

More preferably, the rate of variation is set in the following range:

$$1.15 \leq (no(450) - no(550))/(no(550) - no(650)) \leq 1.45.$$

(b) The rate of variation among the extraordinary light refractive indices ne(450), ne(550), and ne(650) for light with wavelengths of 450 nm, 550 nm, and 650 nm, respectively, is set in the range of:

$$1.20 \leq (ne(450) - ne(550))/(ne(550) - ne(650)) \leq 1.70.$$

More preferably, the rate of variation is set in the following range:

$$1.35 \leq (ne(450) - ne(550))/(ne(550) - ne(650)) \leq 1.60.$$

By utilizing the above ranges, in the LCD device of this embodiment, a change in the optical phase difference between the ordinary light and the extraordinary light which occurs in the LCD element 1 depending on the viewing angle can be compensated by the optical phase plates 2 and 3. Moreover, viewing angle dependent coloring occurring on the liquid crystal display screen can be especially effectively compensated by the liquid crystal material in the liquid crystal layer 8. As a result, since viewing angle dependent coloring on the display screen is effectively reduced and, at the same time, the contrast change and the inversion phenomenon are reduced, high-quality images can be obtained.

Hereinbelow, the LCD device of this embodiment will be described by way of specific examples.

EXAMPLE 1

In Example 1, in the LCD device shown in FIG. 1, a liquid crystal material for the liquid crystal layer 8 was set so that: the extraordinary light refractive indices ne(450), ne(550), and ne(650) of the liquid crystal material for light with wavelengths of 450 nm, 550 nm, and 650 nm, respectively, and the ordinary light refractive indices no(450), no(550), and no(650) for light with wavelengths of 450 nm, 550 nm, and 650 nm, respectively, are in the range of:

$$((no(450) - no(550))/(no(550) - no(650)))/$$
$$((ne(450) - ne(550))/(ne(550) - ne(650))) \geq 1.00; \text{ and}$$

the rate of variation among the ordinary light refractive indices no(450), no(550), and no(650) for light with wavelengths of 450 nm, 550 nm, and 650 nm is in the range of:

$$1.65 \leq (no(450) - no(550))/(no(550) - no(650)) \leq 2.40.$$

Such a liquid crystal material was prepared by blending materials represented by structural formula (1) below:

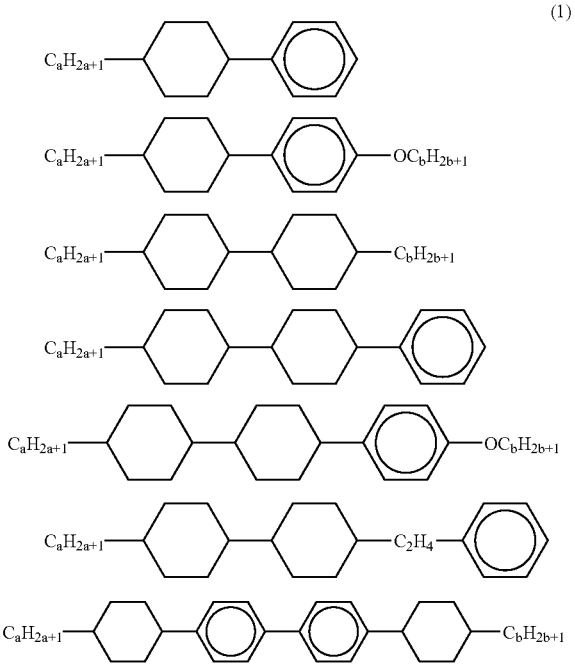

The cell thickness of the liquid crystal cell 16 (the thickness of the liquid crystal layer 8) was set at about 5 μm. Five samples of such LCD devices as shown in Table 1 below (samples #11a to #15a) were produced.

In these samples, the optical phase plates 2 and 3 were formed in the following manner. A discotic liquid crystal material was applied to a transparent support (made of triacetyl cellulose (TAC), for example). The discotic liquid crystal material was crosslinked in a tilted orientation so that the first retardation value (nc−na)×d is 0 while the second retardation value (na−nb)×d is 100 nm, and that the tilt angle θ of a tilted index ellipsoid is 20° where the direction of the principal refractive index nb shown in FIG. 3 is tilted by about 20° in the direction of the arrow A from the z-axis direction in the xyz coordinate system and the direction of the principal refractive index no is tilted by about 20° in the direction of the arrow B from the x-axis.

For comparison, two comparative samples of LCD devices as shown in Table 1 below (comparative samples #100a and #101a) were produced in the same manner as that used in the above samples of this example except that liquid crystal materials having a rate of variation ((no(450)−no(550)/(no(550)−no(650))) of 1.55 and 2.50 were used for the liquid crystal layer 8 of the LCD device shown in FIG. 1.

Table 1 shows the results of visual inspections performed under white light for samples #11a to #15a and comparative samples #100a and #101a. In Table 1, as well as Tables 2 to 4 for Examples 2 to 4, to be described later, the mark ○ represents "no coloring", Δ represents "tolerable coloring", and X represents "intolerable coloring".

TABLE 1

| Viewing angle (θ) | Sample | | | | | | |
|---|---|---|---|---|---|---|---|
| | #100a | #11a | #12a | #13a | #14a | #15a | #101a |
| | ((no(450) − no(550))/(no(550) − no(650))) | | | | | | |
| | 1.55 | 1.65 | 1.85 | 2.05 | 2.20 | 2.40 | 2.50 |
| 50° | X | ○ | ○ | ○ | ○ | ○ | X |
| 60° | X | Δ | ○ | ○ | ○ | Δ | X |
| 70° | X | X | ○ | ○ | ○ | X | X |

It is found from Table 1 that in samples #12a to #14a no coloring was observed in any direction at a viewing angle of 70°, providing good image quality. This indicates that especially excellent characteristics are provided in the range of the rate of variation of:

$$1.85 \leq (no(450)-no(550))/(no(550)-no(650)) \leq 2.20.$$

It is also found from Table 1 that in samples #11a and #15a no coloring was observed at a viewing angle of 50°, providing good image quality. At a viewing angle of 60°, although slight coloring was observed when viewed in the right and left directions, it was in such a level that was tolerable for use.

As for comparative samples #100a and #101a, yellow to orange coloring intolerable for use was observed even at a viewing angle of 50° when viewed in the right and left directions.

The same results were obtained for samples of LCD devices produced in the same manner as that in samples #11a to #15a and comparative samples #100a and #101a, except that the optical phase plates 2 and 3 were made of a discotic liquid crystal material applied to a transparent support and crosslinked in a hybrid orientation.

EXAMPLE 2

In Example 2, in the LCD device shown in FIG. 1, the liquid crystal material for the liquid crystal layer 8 was set so that: the extraordinary light refractive indices ne(450), ne(550), and ne(650) of the liquid crystal material for light with wavelengths of 450 nm, 550 nm, and 650 nm, respectively, and the ordinary light refractive indices no(450), no(550), and no(650) for light with wavelengthS of 450 nm, 550 nm, and 650 nm, respectively, are in the range of:

$$((no(450) - no(550))/(no(550) - no(650)))/$$
$$((ne(450) - ne(550))/(ne(550) - ne(650))) \geq 1.00; \text{ and}$$

the rate of variation among the extraordinary light refractive indices ne(450), ne(550), and ne(650) for light with wavelengths of 450 nm, 550 nm, and 650 nm is in the range of:

$$1.70 \leq (ne(450)-ne(550))/(ne(550)-ne(650)) \leq 2.30.$$

Such a liquid crystal material was prepared by blending the materials shown in Example 1.

The cell thickness of the liquid crystal cell 16 was set at 5 μm. Five samples of such LCD devices as shown in Table 2 below (samples #21a to #25a) were produced.

The optical phase plates 2 and 3 were formed in the following manner. A discotic liquid crystal material was applied to a transparent support (made of triacetyl cellulose (TAC), for example). The discotic liquid crystal material was crosslinked in a tilted orientation so that the first retardation value (nc−na)×d is 0 nm while the second retardation value (na−nb)×d is 100 nm, and that the tilt angle θ of a tilted index ellipsoid is 20° where the direction of the principal refractive index nb shown in FIG. 3 is tilted by about 20° in the direction of the arrow A from the z-axis direction in the xyz coordinate system and the direction of the principal refractive index nc is tilted by about 20° in the direction of the arrow B from the x-axis.

For comparison, two comparative samples of LCD devices as shown in Table 2 below (comparative samples #200a and #201a) were produced in the same manner as that in the above samples of this example, except that liquid crystal materials having a rate of variation ((ne(450)−ne(550)/(ne(550)−ne(650)) of 1.60 and 2.40 were used for the liquid crystal layer 8 of the LCD device shown in FIG. 1.

Table 2 shows the results of visual inspections performed under white light for samples #21a to #25a and comparative samples #200a and #201a.

TABLE 2

| Viewing angle | Sample |   |   |   |   |   |   |
|---|---|---|---|---|---|---|---|
|  | #200a | #21a | #22a | #23a | #24a | #25a | #201a |
|  | (ne(450) − ne(550))/(ne(550) − ne(650)) | | | | | | |
| (θ) | 1.60 | 1.70 | 1.85 | 1.90 | 2.10 | 2.30 | 2.40 |
| 50° | X | ○ | ○ | ○ | ○ | ○ | X |
| 60° | X | Δ | ○ | ○ | ○ | Δ | X |
| 70° | X | X | ○ | ○ | ○ | X | X |

It is found from Table 2 that in samples #22a to #24a no coloring was observed in any direction at a viewing angle of 70°, providing good image quality. This indicates that especially excellent characteristics are provided in the range of the rate of variation of:

$$1.85 \leq (ne(450)-ne(550))/(ne(550)-ne(650)) \leq 2.10.$$

It is also found from Table 2 that in samples #21a and #25a no coloring was observed at a viewing angle of 50°, providing good image quality. At a viewing angle of 60°, although slight coloring was observed when viewed in the right and left directions, it was in such a level that was tolerable for use.

As for comparative samples #200a and #201a, yellow to orange coloring intolerable for use was observed even at a viewing angle of 50° when viewed in the right and left directions.

The same results were obtained for samples of LCD devices produced in the same manner as that in samples #21a to #25a and comparative samples #200a and #201a, except that the optical phase plates 2 and 3 were made of a discotic liquid crystal material applied to a transparent support and crosslinked in a hybrid orientation.

EXAMPLE 3

In Example 3, in the LCD device shown in FIG. 1, the liquid crystal material for the liquid crystal layer 8 was set so that: the extraordinary light refractive indices ne(450), ne(550), and ne(650) of the liquid crystal material for light with wavelengths of 450 nm, 550 nm, and 650 nm, respectively, and the ordinary light refractive indices no(450), no(550), and no(650) for light with wavelengths of 450 nm, 550 nm, and 650 nm, respectively, are in the range of:

$$((no(450) - no(550))/(no(550) - no(650)))/$$
$$((ne(450) - ne(550))/(ne(550) - ne(650))) < 1.00; \text{ and}$$

the rate of variation among the ordinary light refractive indices no(450), no(550), and no(650) for light with wavelengths of 450 nm, 550 nm, and 650 nm is in the range of $$1.00 \leq (no(450)-no(550))/(no(550)-no(650)) \leq 1.65.$$

Such a liquid crystal material was prepared by blending the materials shown in Example 1.

The cell thickness of the liquid crystal cell 16 was set at 5 μm. Five samples of such LCD devices as shown in Table 3 below (samples #31a to #35a) were produced.

The optical phase plates 2 and 3 were formed in the following manner. A discotic liquid crystal material was applied to a transparent support (made of triacetyl cellulose (TAC), for example). The discotic liquid crystal material was crosslinked in a tilted orientation so that the first retardation value (nc−na)×d is 0 nm while the second retardation value (na−nb)×d is 100 nm, and that the tilt angle θ of a tilted index ellipsoid is 20° where the direction of the principal refractive index nb shown in FIG. 3 is tilted by about 20° in the direction of the arrow A from the z-axis direction in the xyz coordinate system and the direction of the principal refractive index nc is tilted by about 20° in the direction of the arrow B from the x-axis.

For comparison, two comparative samples of LCD devices as shown in Table 3 below (comparative samples #300a and #301a) were produced in the same manner as that in the above samples of this example, except that liquid crystal materials having a rate of variation ((no(450)−no(550)/(no(550)−no(650)) of 0.90 and 1.75 were used for the liquid crystal layer 8 of the LCD device shown in FIG. 1.

Table 3 shows the results of visual inspections performed under white light for samples #31a to #35a and comparative samples #300a and #301a.

TABLE 3

| Viewing angle | Sample |   |   |   |   |   |   |
|---|---|---|---|---|---|---|---|
|  | #300a | #31a | #32a | #33a | #34a | #35a | #301a |
|  | (no(450) − no(550))/(no(550) − no(650)) | | | | | | |
| (θ) | 0.90 | 1.00 | 1.15 | 1.30 | 1.45 | 1.65 | 1.75 |
| 50° | X | ○ | ○ | ○ | ○ | ○ | X |
| 60° | X | Δ | ○ | ○ | ○ | Δ | X |
| 70° | X | X | ○ | ○ | ○ | X | X |

It is found from Table 3 that in samples #32a to #34a no coloring was observed even when the viewing angle was dropped to 70°, providing good image quality. This indicates that especially excellent characteristics are provided in the range of the rate of variation of:

$$1.15 \leq (no(450)-no(550))/(no(550)-no(650)) \leq 1.45.$$

It is also found from Table 3 that in samples #31a and #35a no coloring was observed at a viewing angle of 50°, providing good image quality. At a viewing angle of 60°, although slight coloring was observed when viewed in the right and left directions, it was in such a level that was tolerable for use.

As for comparative samples #300a and #301a, yellow to orange coloring intolerable for use was observed even at a viewing angle of 50° when viewed in the right and left directions.

The same results were obtained for samples of LCD devices produced in the same manner as that in samples #31a to #35a and comparative samples #300a and #301a, except that the optical phase plates 2 and 3 were made of a discotic liquid crystal material applied to a transparent support and crosslinked in a hybrid orientation.

EXAMPLE 4

In Example 4, in the LCD device shown in FIG. 1, the liquid crystal material for the liquid crystal layer 8 was set so that: the extraordinary light refractive indices ne(450), ne(550), and ne(650) of the liquid crystal material for light with wavelengths of 450 nm, 550 nm, and 650 nm, respectively, and the ordinary light refractive indices no(450), no(550), and no(650) for light with wavelengths of 450 nm, 550 nm, and 650 nm, respectively, are in the range of:

$$((no(450)-no(550))/(no(550)-no(650)))/$$
$$((ne(450)-ne(550))/(ne(550)-ne(650))) < 1.00;\text{ and}$$

the rate of variation among the extraordinary light refractive indices ne(450), ne(550), and ne(650) for light with wavelengths of 450 nm, 550 nm, and 650 nm is in the range of:

$$1.20 \leq (ne(450)-ne(550))/(ne(550)-ne(650)) \leq 1.70.$$

Such a liquid crystal material was prepared by blending the materials shown in Example 1.

The cell thickness of the liquid crystal cell 16 was set at 5 μm. Five samples of such LCD devices as shown in Table 4 below (samples #41a to #45a) were produced.

The optical phase plates 2 and 3 were formed in the following manner. A discotic liquid crystal material was applied to a transparent support (made of triacetyl cellulose (TAC), for example). The discotic liquid crystal material was crosslinked in a tilted orientation so that the first retardation value (nc−na)×d is 0 nm while the second retardation value (na−nb)×d is 100 nm, and that the tilt angle θ of a tilted index ellipsoid is 20° where the direction of the principal refractive index nb shown in FIG. 3 is tilted by about 20° in the direction of the arrow A from the z-axis direction in the xyz coordinate system and the direction of the principal refractive index nc is tilted by about 20° in the direction of the arrow B from the x-axis.

For comparison, two comparative samples of LCD devices as shown in Table 4 below (comparative samples #400a and #401a) were produced in the same manner as that in the above samples of this example, except that liquid crystal materials having a rate of variation ((ne(450)−ne(550))/(ne(550)−ne(650))) of 1.10 and 1.80 were used for the liquid crystal layer 8 of the LCD device shown in FIG. 1.

Table 4 shows the results of visual inspections performed under white light for samples #41a to #45a and comparative samples #400a and #401a.

TABLE 4

| Viewing angle (θ) | Sample | | | | | | |
|---|---|---|---|---|---|---|---|
| | #400a | #41a | #42a | #43a | #44a | #45a | #401a |
| | (ne(450) − ne(550))/(ne(550) − ne(650)) | | | | | | |
| | 1.10 | 1.20 | 1.35 | 1.50 | 1.60 | 1.70 | 1.80 |
| 50° | X | ○ | ○ | ○ | ○ | ○ | X |
| 60° | X | Δ | ○ | ○ | ○ | Δ | X |
| 70° | X | X | ○ | ○ | ○ | X | X |

It is found from Table 4 that in samples #42a to #44a no coloring was observed when the viewing angle was dropped to 70°, providing good image quality. This indicates that especially excellent characteristics are provided in the range of the rate of variation of:

$$1.35 \leq (ne(450)-ne(550))/(ne(550)-ne(650)) \leq 1.60.$$

It is also found from Table 4 that in samples #41a and #45a no coloring was observed at a viewing angle of 50°, providing good image quality. At a viewing angle of 60°, although slight coloring was observed when viewed in the right and left directions, it was in such a level that was tolerable for use.

As for comparative samples #400a and #401a, yellow to orange coloring intolerable for use was observed even at a viewing angle of 50° when viewed in the right and left directions.

The same results were obtained for samples of LCD devices produced in the same manner as that in samples #41a to #45a and comparative samples #400a and #401a, except that the optical phase plates 2 and 3 were made of a discotic liquid crystal material applied to a transparent support and crosslinked in a hybrid orientation.

EXAMPLE 5

In Example 5, three samples (samples #51a to #53a) of the LCD device shown in FIG. 1 were produced using liquid crystal materials of which the values of the refractive index anisotropy Δn(550) for light with a wavelength of 550 nm were set at 0.070, 0.080, and 0.095, respectively. The cell thickness of the liquid crystal cell 16 of these samples was 5 μm. The rates of variation of the ordinary light refractive index no and the extraordinary light refractive index ne of each sample are shown in Table 5 below.

TABLE 5

| | Sample | | | | |
|---|---|---|---|---|---|
| | #51a | #52a | #53a | #501a | #502a |
| Rate of variation of $n_o$ | 1.15 | 2.05 | 2.20 | 1.85 | 2.05 |
| Rate of variation of $n_e$ | 1.35 | 1.90 | 2.10 | 1.85 | 1.90 |

As the optical phase plates 2 and 3, those including a discotic liquid crystal material in a tilted orientation as in Example 1 were used.

For comparison, two comparative samples of LCD devices as shown in Table 5 above (comparative samples #501a and #502a) were produced in the same manner as that used in the above samples of this example except that liquid crystal materials of which the values of the refractive index anisotropy Δn for light with a wavelength of 550 nm were set at 0.060 and 0.120, respectively.

Figure 5:
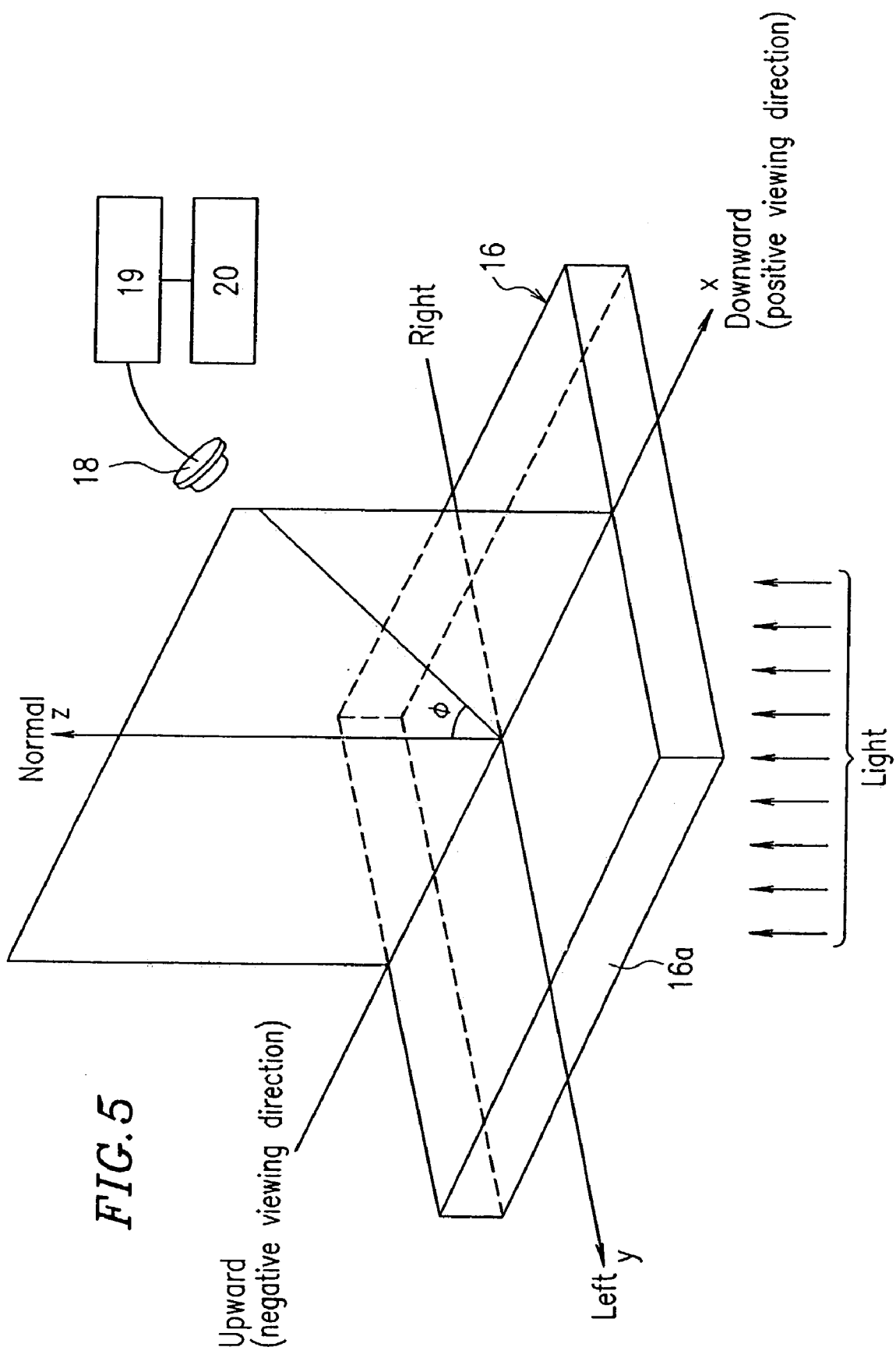
FIG. 5 is a perspective view illustrating a measurement system for measuring the viewing angle dependence of an LCD device.

The LCD devices of samples #51a to #53a and comparative samples #501a and #502a were measured for the viewing angle dependence using a measurement system as shown in FIG. 5 which includes a light-receiving element 18, an amplifier 19, and a recording device 20.

Referring to FIG. 5, the liquid crystal cell 16 of the LCD device to be measured is placed in the measurement system so that a surface 16a of the liquid crystal cell 16 is in the reference plane x-y of the rectangular coordinate system xyz.

The light-receiving element 18 can receive light at a constant solid light-receiving angle and is positioned at a predetermined distance from the origin of the coordinate system in a direction of an angle $\phi$ (viewing angle) from the z-axis which is normal to the surface 16a of the liquid crystal cell 16.

In the measurement, the surface opposite to the surface 16a of the liquid crystal cell 16 placed in the measurement system is irradiated with monochrome light with a wavelength of 550 nm. Part of the monochrome light which has passed through the liquid crystal cell 16 is incident on the light-receiving element 18. The output of the light-receiving element 18 is amplified to a predetermined level by the amplifier 19, and then recorded by the recording device 20 including a waveform memory, a recorder, and the like.

The LCD devices of samples #51a to #53a and comparative samples #501a and #502a were placed in the above measurement system, to measure the relationship between the voltage applied to the LCD devices and the output level of the light-receiving element 18 when the light-receiving element 18 was fixed at a constant angle $\phi$.

It was assumed that the x-axis direction is toward the lower side of the screen and the y-axis direction is toward the left side thereof. The measurement was performed by changing the position of the light-receiving element 18 among positions at an angle $\phi$ of 50° in the upward direction, the right direction, and the left direction.

The measurement results of samples #51a to #53a are shown in FIGS. 6A to 6C, while those of comparative samples #501a and #502a are shown in FIGS. 7A to 7C. FIGS. 6A to 6C and 7A to 7C are graphs of the light transmittance of the LCD devices with respect to the voltage applied thereto (transmittance vs. applied voltage characteristics): FIGS. 6A and 7A show the results obtained when measured from the upper side as is viewed from FIG. 5; FIGS. 6B and 7B show the results obtained when measured from the right side as is viewed from FIG. 5: and FIGS. 6C and 7C show the results obtained when measured from the left side as is viewed from FIG. 5.

Referring to FIGS. 6A to 6C, curves L1a, L4a, and L7a (the one-dot dash lines) represent sample #51a which uses a liquid crystal material with $\Delta n(550)$ of 0.070 for the liquid crystal layer 8, curves L2a, L5a, and L8a (the solid lines) represent sample #52a which uses a liquid crystal material with $\Delta n(550)$ of 0.080 for the liquid crystal layer 8, and curves L3a, L6a, and L9a (the dashed lines) represent sample #53a which uses a liquid crystal material with $\Delta n(550)$ of 0.095 for the liquid crystal layer 8. Referring to FIGS. 7A to 7C, curves L10a, L12a, and L14a (the solid lines) represent comparative sample #501a which uses a liquid crystal material with $\Delta n(550)$ of 0.060 for the liquid crystal layer 8, and curves L11a, L13a, and L15a (the dashed lines) represent sample #502a which uses a liquid crystal material with $\Delta n(550)$ of 0.120 for the liquid crystal layer 8.

As for the transmittance vs. applied voltage characteristics measured from the upper side, as shown by curves L1a to L3a in FIG. 6A, it was confirmed that in samples #51a to #53a as the voltage increased the transmittance sufficiently decreased. On the contrary, in comparative sample #502a, as shown by curve L11a in FIG. 7A, as the voltage increased the transmittance did not sufficiently decrease. In comparative sample #501a, as shown by curve L10a in FIG. 7A, as the voltage increased, the transmittance initially decreased and then increased again, causing an inversion phenomenon.

Likewise, as for the transmittance vs. applied voltage characteristics measured from the right side, as shown by curves L4a to L6a in FIG. 6B, it was confirmed that in samples #51a to #53a as the voltage increased the transmittance decreased to nearly zero. In comparative sample #501a, as shown by curve L12a in FIG. 7B, as the voltage increased the transmittance decreased to nearly zero. However, in comparative sample #502a, as shown by curve L13a in FIG. 7B, as the voltage increased, the transmittance initially decreased and then increased again, causing an inversion phenomenon.

Likewise, as for the transmittance vs. applied voltage characteristics measured from the left side, as shown by curves L7a to L9a in FIG. 6C, it was confirmed that in samples #51a to #53a as the voltage increased the transmittance decreased to nearly zero. In comparative sample #501a, as shown by curve L14a in FIG. 7C, as the voltage increased the transmittance decreased to nearly zero. However, in comparative sample #502a, as shown by curve L15a in FIG. 7C, as the voltage increased, the transmittance initially decreased and then increased again, causing an inversion phenomenon.

Visual inspection was performed for samples #51a to #53a and comparative samples #501a and #502a under white light. As a result, for samples #51a to #53a of this example and comparative sample #501a, no coloring was observed in any direction at a viewing angle of 50° or less, providing good image quality.

For comparative sample #502a, however, yellow to orange coloring was observed when viewed from the right and left sides at a viewing angle of 50°.

From the above results, the following are recognized: As shown in FIGS. 6A to 6C, as for the samples of the LCD device of this example (samples #51a to #53a) using, for the liquid crystal layer 8, a liquid crystal material of which the values of the refractive index anisotropy $\Delta n(550)$ for light with a wavelength of 550 nm were set at 0.070, 0.080, and 0.095, when the voltage was increasingly applied, the transmittance sufficiently decreased, preventing an inversion phenomenon from occurring and thus widening the angle of field. Moreover, since no coloring phenomenon was observed, the display quality of the LCD device significantly improved.

On the contrary, as shown in FIGS. 7A to 7C, as for the comparative samples of the LCD devices (comparative samples #501a and #502a) using liquid crystal materials of which the values of the refractive index anisotropy $\Delta n(550)$ for 550 nm light were set at 0.060 and 0.120, the viewing angle dependence was not sufficiently improved.

The same results as those described above were also obtained for samples of LCD devices produced in the same manner as that used in samples #51a to #53a and comparative samples #501a and #502a, except that the optical phase plates 2 and 3 were made of a discotic liquid crystal material applied to a transparent support and crosslinked in a hybrid orientation.

The dependence of the transmittance vs. applied voltage characteristics on the tilt angle $\theta$ was examined by changing the tilt angle $\theta$ of the index ellipsoid of the optical phase plate 2 or 3. As a result, essentially the same results as those described above were obtained, irrespective of the orientation state of the discotic liquid crystal material used for the optical phase plate 2 or 3, if the angle θ is in the range of 15°≦θ75°. If the angle θ is less than 15° or exceeds 75°, it was confirmed that the angle of field is not widened in the negative viewing direction.

The dependence of the transmittance vs. applied voltage characteristics on the second retardation value (na−nb)×d was examined by changing the second retardation value. As a result, essentially the same results as those described above were obtained, irrespective of the orientation state of the discotic liquid crystal material used for the optical phase plates 2 and 3, if the second retardation value is in the range between 80 nm and 250 nm, inclusive. If the second retardation value is less than 80 nm or exceeds 250 nm, it was confirmed that the angle of field is not widened in the lateral (right and left) directions.

Additional three samples of the LCD device shown in FIG. 1 (samples #54a to #56a) were produced based on the results of the visual inspection of comparative samples #501a and #502a in the same manner as that used for samples #51a to #53a except that liquid crystal materials of which the values of the refractive index anisotropy for 550 nm light were set at 0.065, 0.100, and 0.115 were used for the liquid crystal layer 8.

Samples #54a to #56a of the LCD devices were placed in the measurement system shown in FIG. 5. The relationship between the voltage applied to the respective LCD devices and the output level of the light-receiving element 18 obtained when the light-receiving element 18 was fixed at a constant angle φ was measured, and the visual inspection was performed under white light.

The results of the above measurement and inspection are as follows. In samples #55a and #56a of this example in which the values of the refractive index anisotropy Δn(550) were set at 0.100 and 0.115, a slight increase in transmittance was observed as the voltage was increased when measured from the right and left sides at an angle φ of 50°. However, with no inversion phenomenon observed in the visual inspection, such a level of increase in transmittance was tolerable for use. When measured from the upper side, samples #55a and #56a had no problem.

In sample #54a in which the value of the refractive index anisotropy Δn(550) was set at 0.065, as the voltage increased, the transmittance initially decreased and then increased again, causing an inversion phenomenon, when measured from the upper side, as in comparative sample #501a described above. However, the degree of the increase in transmittance was small enough to be tolerable for use, compared with the case of comparative sample #501a (L10a) shown in FIG. 7A. When measured from the right and left sides, sample #54a had no problem.

In the visual inspection, slight yellow to orange coloring was observed in samples #55a and #56a, although it was too slight to raise a problem. For sample #54a, slight blue coloring was observed, although it was too slight to raise a problem.

For sample #54a and comparative sample #501a, a voltage of about 1 V was applied to measure the transmittance in the direction normal to the surface of the liquid crystal cell 16 during white display. As a result, the transmittance decreased to a level intolerable for use in comparative sample #501a. On the contrary, in sample #54a of this example, although a slight reduction in transmittance was observed, it was slight enough to be tolerable for use.

(Embodiment 2)

The LCD device of Embodiment 2 has substantially the same configuration as that of Embodiment 1. In Embodiment 1, the rates of variation of the ordinary light refractive index no and the extraordinary light refractive index ne of the liquid crystal material with respect to the wavelength are set to in the range in which viewing angle dependent coloring does not occur on the display screen. Instead, in Embodiment 2, in order to obtain optimal characteristics in combination with the optical phase difference compensating function of the optical phase plates 2 and 3, the conditions of the combination of the length of an alkyl chain of the liquid crystal material for the liquid crystal layer 8, the rate of variation of the ordinary light refractive index no of the liquid crystal material with respect to the wavelength, and rate of variation of the extraordinary light refractive index ne of the liquid crystal material with respect to the wavelength are set so that viewing angle dependent coloring does not occur on the display screen.

More specifically, the conditions of the combination of the length of a mean alkyl chain of the liquid crystal material, the rate of variation of the ordinary light refractive index no of the liquid crystal material with respect to the wavelength, and the rate of variation of the extraordinary light refractive index ne of the liquid crystal material with respect to the wavelength are set so as to satisfy at least any one of settings (1) to (3) below.

(1) In the case where the length m of a mean alkyl chain ($C_mH_{2m+1}$—) of the liquid crystal material is m<3.40, the rate of variation among the extraordinary light refractive indices ne(450), ne(550), and ne(650) for light with wavelengths of 450 nm, 550 nm, and 650 nm, respectively, and the rate of variation among the ordinary light refractive indices no(450), no(550), and no(650) for light with wavelengths of 450 nm, 550 nm, and 650 nm, respectively, are set in the following range:

$$1.00 \leq ((no(450) - no(550))/(no(550) - no(650)))/$$
$$((ne(450) - ne(550))/(ne(550) - ne(650))) \leq -0.422m + 2.55.$$

More preferably, the rates of variation are set in the following range:

$$1 \leq (no(450) - no(550))/(no(550) - no(650))/(ne(450) - ne(550))/$$
$$(ne(550) - ne(650)) \leq -0.343m + 2.26.$$

(2) In the case where the length m of the mean alkyl chain ($C_mH_{2m+1}$—) of the liquid crystal material is 3.40≦m≦3.90, the rate of variation among the extraordinary light refractive indices ne(450), ne(550), and ne(650) for light with wavelengths of 450 nm, 550 nm, and 650 nm, respectively, and the rate of variation among the ordinary light refractive indices no(450), no(550), and no(650) for light with wavelengths of 450 nm, 550 nm, and 650 nm, respectively, are set in the following range:

$$0.80 \leq ((no(450) - no(550))/(no(550) - no(650)))/$$
$$((ne(450) - ne(550))/(ne(550) - ne(650))) \leq 1.20.$$

More preferably, the rates of variation are set in the following range:

$$0.85 < (no(450) - no(550))/(no(550) - no(650))/(ne(450) - ne(550))/$$
$$(ne(550) - ne(650)) < 1.15.$$

(3) In the case where the length m of a mean alkyl chain ($C_mH_{2m+1}$—) of the liquid crystal material is m>3.90, the rate of variation among the extraordinary light refractive indices ne(450), ne(550), and ne(650) for light with wavelengths of 450 nm, 550 nm, and 650 nm, respectively, and the rate of variation among the ordinary light refractive indices no(450), no(550), and no(650) for light with wavelengths of 450 nm, 550 nm, and 650 nm, respectively, are set in the following range:

$$-0.422m + 2.55 \le ((no(450) - no(550))/(no(550) - no(650)))/$$
$$((ne(450) - ne(550))/(ne(550) - ne(650))) \le 1.00.$$

More preferably, the rates of variation are set in the following range:

$$-0.343m + 2.26 \le ((no(450) - no(550))/(no(550) - no(650)))/$$
$$((ne(450) - ne(550))/(ne(550) - ne(650))) \le 1.00.$$

By utilizing the above ranges, in the LCD device of this embodiment, a change in the optical phase difference between the ordinary light and the extraordinary light which occurs in the LCD element 1 depending on the viewing angle can be compensated by the optical phase plates 2 and 3. Moreover, viewing angle dependent coloring occurring on the liquid crystal display screen can be especially effectively compensated by the liquid crystal material in the liquid crystal layer 8. As a result, since viewing angle dependent coloring on the display screen is effectively reduced and, at the same time, the contrast change and the inversion phenomenon are reduced, high-quality images can be obtained.

Hereinbelow, the LCD device of this embodiment will be described by way of specific examples.

EXAMPLE 6

In Example 6, in the LCD device shown in FIG. 1, a liquid crystal material for the liquid crystal layer 8 was obtained by blending materials represented by structural formula (2) below (2)

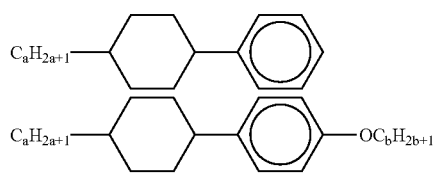

-continued

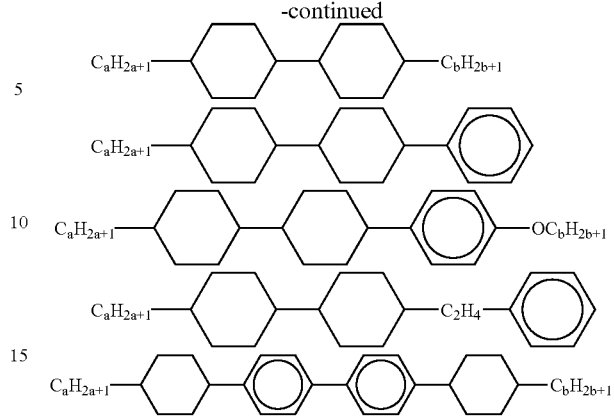

so that the length m of a mean alkyl chain ($C_mH_{2m+1}$—) per mole is m<3.40, and that the rate of variation among the extraordinary light refractive indices ne(450), ne(550), and ne(650) of the liquid crystal material for light with wavelengths of 450 nm, 550 nm, and 650 nm, respectively, and the rate of variation among the ordinary light refractive indices no(450), no(550), and no(650) for light with wavelengths of 450 nm, 550 nm, and 650 nm, respectively, are set in the range of:

$$1.00 \le ((no(450) - no(550))/(no(550) - no(650)))/$$
$$((ne(450) - ne(550))/(ne(550) - ne(650))) \le -0.422m + 2.55.$$

The cell thickness of the liquid crystal cell 16 (the thickness of the liquid crystal layer 8) was set at 5 μm. Five samples of such LCD devices as shown in Table 6 below (samples #11b to #15b) were produced.

The optical phase plates 2 and 3 were formed in the following manner. A discotic liquid crystal material was applied to a transparent support (made of triacetyl cellulose (TAC), for example). The discotic liquid crystal material was crosslinked in a tilted orientation so that the first retardation value (nc−na)×d is 0 nm while the second retardation value (na−nb)×d is 100 nm, and that the tilt angle Θ of a tilted index ellipsoid is 20° where the direction of the principal refractive index nb shown in FIG. 3 is tilted by about 20° in the direction of the arrow A from the z-axis direction in the xyz coordinate system and the direction of the principal refractive index nc is tilted by about 20° in the direction of the arrow B from the x-axis.

For comparison, two comparative samples of LCD devices as shown in Table 6 below (comparative samples #100b and #101b) were produced in the same manner as that used in the above samples of this example except that liquid crystal materials having the setting in the range of:

$$1 > ((no(450)-no(550))/(no(550)-no(650)))/((ne(450)-ne(550))/(ne(550)-ne(650))),$$

or $$((no(450) - no(550))/(no(550) - no(650)))/$$
$$((ne(450) - ne(550))/(ne(550) - ne(650))) > -0.422m + 2.55.$$

were used for the liquid crystal layer 8 of the LCD device shown in FIG. 1.

Table 6 shows the results of visual inspections performed under white light for samples #11b to #15b and comparative samples #100b and #101b. In Table 6, as well as Tables 7 and 8 for Examples 7 and 8, to be described later, $$F(no(\lambda), ne(\lambda)) = (((no(450) - no(550))/(no(550) - no(650)))/$$
$$((ne(450) - ne(550))/(ne(550) - ne(650)))), \text{ and}$$

the mark ○ represents "no coloring", Δ represents "tolerable coloring", and X represents "intolerable coloring".

TABLE 6

| | Sample | | | | | | |
|---|---|---|---|---|---|---|---|
| | #100b | #11b | #12b | #13b | #14b | #15b | #101b |
| Mean alkyl chain length (m) | 3.38 | 3.30 | 3.25 | 3.30 | 3.38 | 3.35 | 3.30 |
| F(no(λ), ne(λ)) | 1.25 | 1.14 | 1.16 | 1.05 | 1.05 | 1.00 | 0.90 |
| Viewing angle (θ) | | | | | | | |
| 50° | X | ○ | ○ | ○ | ○ | ○ | X |
| 60° | X | Δ | Δ | ○ | ○ | ○ | X |
| 70° | X | X | X | ○ | ○ | ○ | X |

It is found from Table 6 that in samples #13b to #15b no coloring was observed in any direction at a viewing angle of 70°, providing good image quality. This indicates that especially excellent characteristics are provided when the setting is in the range of:

$$1 \leq ((no(450) - no(550))/(no(550) - no(650))/(ne(450) - ne(550))/$$
$$(ne(550) - ne(65))) \leq -0.343m + 2.26.$$

It is also found from Table 6 that in samples #11b and #12b no coloring was observed in any direction at a viewing angle of 50°, providing good image quality. At a viewing angle of 60°, although slight coloring was observed when viewed from the right and left sides, it was in such a level that was tolerable for use.

As for comparative samples #100b and #101b, yellow to orange coloring intolerable for use was observed even at a viewing angle of 50° when viewed from the right and left sides.

Substantially the same results were obtained for samples of LCD devices produced in the same manner as that used in samples #11b to #15b and comparative samples #100b and #101b, except that the optical phase plates 2 and 3 were made of a discotic liquid crystal material applied to a transparent support and crosslinked in a hybrid orientation.

EXAMPLE 7

In Example 7, in the LCD device shown in FIG. 1, a liquid crystal material for the liquid crystal layer 8 was set so that: the length m of a mean alkyl chain ($C_mH_{2m+1}$—) per mole is in the range of $3.40 \leq m \leq 3.90$: and the rate of variation among the extraordinary light refractive indices ne(450), ne(550), and ne(650) of the liquid crystal material for light with wavelengths of 450 nm, 550 nm, and 650 nm, respectively, and the rate of variation among the ordinary light refractive indices no(450), no(550), and no(650) for light with wavelengths of 450 nm, 550 nm, and 650 nm, respectively, are in the range of:

$$0.08 \leq ((no(450) - no(550))/(no(550) - no(650)))/$$
$$((ne(450) - ne(550))/(ne(550) - ne(650))) \leq 1.20.$$

Such a liquid crystal material was prepared by blending the materials shown in Example 6.

The cell thickness of the liquid crystal cell 16 was set at 5 μm. Five samples of such LCD devices as shown in Table 7 below (samples #21b to #25b) were produced.

The optical phase plates 2 and 3 were formed in the following manner. A discotic liquid crystal material was applied to a transparent support (made of triacetyl cellulose (TAC), for example). The discotic liquid crystal material was crosslinked in a tilted orientation so that the first retardation value (nc−na)×d is 0 nm while the second retardation value (na−nb)×d is 100 nm, and that the tilt angle θ of a tilted index ellipsoid is 20° where the direction of the principal refractive index nb shown in FIG. 3 is tilted by about 20° in the direction of the arrow A from the z-axis direction in the xyz coordinate system and the direction of the principal refractive index nc is tilted by about 20° in the direction of the arrow B from the x-axis.

For comparison, two comparative samples of LCD devices as shown in Table 7 below (comparative samples #200b and #201b) were produced in the same manner as that used in the above samples of this example except that liquid crystal materials having the setting in the range of:

$$0.80 > ((no(450) - no(550))/(no(550) - no(650)))/$$
$$((ne(450) - ne(550))/(ne(550) - ne(650))),$$
$$((no(450) - no(550))/(no(550) - no(650)))/$$
$$((ne(450) - ne(550))/(ne(550) - ne(650))) > 1.20.$$

or were used for the liquid crystal layer 8 of the LCD device shown in FIG. 1.

Table 7 below shows the results of visual inspections performed under white light for samples #21b to #25b and comparative samples #200b and #201b.

TABLE 7

| | Sample | | | | | | |
|---|---|---|---|---|---|---|---|
| | #200b | #21b | #22b | #23b | #24b | #25b | #201b |
| Mean alkyl chain length (m) | 3.90 | 3.55 | 3.80 | 3.68 | 3.60 | 3.45 | 3.40 |
| F(no(λ), ne(λ)) | 0.75 | 0.85 | 0.90 | 1.00 | 1.15 | 1.15 | 1.25 |
| Viewing angle (θ) | | | | | | | |
| 50° | X | ○ | ○ | ○ | ○ | ○ | X |
| 60° | X | Δ | ○ | ○ | ○ | Δ | X |
| 70° | X | X | ○ | ○ | ○ | X | X |

It is found from Table 7 that in samples #22b to #24b no coloring was observed in any direction at a viewing angle of 70°, providing good image quality. This indicates that especially excellent characteristics are provided when the setting is in the range of:

$$0.85 < (no(450) - no(550))/(no(550) - no(650))/(ne(450) - ne(550))/(ne(550) - ne(650)) < 1.15.$$

It is also found from Table 7 that in samples #21b and #25b no coloring was observed in any direction at a viewing angle of 50°, providing good image quality. At a viewing angle of 60°, although slight coloring was observed when viewed from the right and left sides, it was in such a level that was tolerable for use.

As for comparative samples #200b and #201b, yellow to orange coloring intolerable for use was observed even at a viewing angle of 50° when viewed from the right and left sides.

Substantially the same results were obtained for samples of LCD devices produced in the same manner as that used in samples #21b to #25b and comparative samples #200b and #201b, except that the optical phase plates 2 and 3 were made of a discotic liquid crystal material applied to a transparent support and crosslinked in a hybrid orientation.

EXAMPLE 8

In Example 8, in the LCD device shown in FIG. 1, a liquid crystal material for the liquid crystal layer 8 was set so that: the length m of a mean alkyl chain ($C_mH_{2m+1}$—) per mole is in the range of m>3.90: and the rate of variation among the extraordinary light refractive indices ne(450), ne(550), and ne(650) of the liquid crystal material for light with wavelengths of 450 nm, 550 nm, and 650 nm, respectively, and the rate of variation among the ordinary light refractive indices no(450), no(550), and no(650) for light with wavelengths of 450 nm, 550 nm, and 650 nm, respectively, are in the range of:

$$-0.422m + 2.55 \leq ((no(450) - no(550))/(no(550) - no(650)))/((ne(450) - ne(550))/(ne(550) - ne(650))) \leq 1.00.$$

Such a liquid crystal material was prepared by blending the materials shown in Example 6.

The cell thickness of the liquid crystal cell 16 was set at 5 μm. Five samples of such LCD devices as shown in Table 8 below (samples #31b to #35b) were produced.

The optical phase plates 2 and 3 were formed in the following manner. A discotic liquid crystal material was applied to a transparent support (made of triacetyl cellulose (TAC), for example). The discotic liquid crystal material was crosslinked in a tilted orientation so that the first retardation value (nc−na)×d is 0 nm while the second retardation value (na−nb)×d is 100 nm, and that the tilt angle θ of a tilted index ellipsoid is 20° where the direction of the principal refractive index nb shown in FIG. 3 is tilted by about 20° in the direction of the arrow A from the z-axis direction in the xyz coordinate system and the direction of the principal refractive index nc is tilted by about 20° in the direction of the arrow B from the x-axis.

For comparison, two comparative samples of LCD devices as shown in Table 8 below (comparative samples #300b and #301b) were produced in the same manner as that used in the above samples of this example except that liquid crystal materials having the setting in the range of:

$$-0.422m + 2.55 > ((no(450) - no(550))/(no(550) - no(650)))/((ne(450) - ne(550))/(ne(550) - ne(650))), \text{ or}$$

$$((no(450) - no(550))/(no(550) - no(650)))/((ne(450) - ne(550))/(ne(550) - ne(650))) > 1.$$

were used for the liquid crystal layer 8 of the LCD device shown in FIG. 1.

Table 8 shows the results of visual inspections performed under white light for samples #31b to #35b and comparative samples #300b and #301b.

TABLE 8

| | Sample | | | | | | |
|---|---|---|---|---|---|---|---|
| | #300b | #31b | #32b | #33b | #34b | #35b | #301b |
| Mean alkyl chain | 4.60 | 5.00 | 4.20 | 4.60 | 4.50 | 5.00 | 4.75 |
| F(no(λ), ne(λ)) | 0.50 | 0.44 | 0.80 | 0.70 | 0.89 | 1.00 | 1.10 |
| Viewing angle (θ) | | | | | | | |
| 50° | X | ○ | ○ | ○ | ○ | ○ | X |
| 60° | X | X | Δ | ○ | ○ | ○ | X |
| 70° | X | X | X | ○ | ○ | ○ | X |

It is found from Table 8 that in samples #33b to #35b no coloring was observed in any direction at a viewing angle of 70°, providing good image quality. This indicates that especially excellent characteristics are provided when the setting is in the range of:

$$-0.343m + 2.26 \leq ((no(450) - no(550))/(no(550) - no(650)))/((ne(450) - ne(550))/(ne(550) - ne(650))) \leq 1.$$

In sample #31b, no coloring was observed in any direction at a viewing angle of 50° or less, providing good image quality. At a viewing angle of 60°, a level of coloring intolerable for use was observed when viewed from the right and left sides.

In sample #32b, no coloring was observed in any direction at a viewing angle of 50° or less, providing good image quality. At a viewing angle of 60°, although slight coloring was observed when viewed from the right and left sides, it was in such a level that was tolerable for use.

As for comparative samples #300b and #301b, yellow to orange coloring intolerable for use was observed even at a viewing angle of 50° when viewed from the right and left sides.

Substantially the same results were obtained for samples of LCD devices produced in the same manner as that used in samples #31b to #35b and comparative samples #300b and #301b, except that the optical phase plates 2 and 3 were made of a discotic liquid crystal material applied to a transparent support and crosslinked in a hybrid orientation.

EXAMPLE 9

In Example 9, three samples (samples #41b to #43b) of the LCD device shown in FIG. 1 were produced using liquid crystal materials of which the values of the refractive index anisotropy Δn(550) for light with a wavelength of 550 nm were set at 0.070, 0.080, and 0.095, respectively. The cell thickness of the liquid crystal cell 16 of these samples was 5 μm. The mean alkyl chain length m; and the rates of variation of the ordinary light refractive index no and the extraordinary light refractive index ne (represented by F(no (λ), ne(λ))) of each sample are shown in Table 9 below.

TABLE 9

| | Sample | | | | |
|---|---|---|---|---|---|
| | #41b | #42b | #43b | #401b | #402b |
| Mean alkyl chain length (m) | 3.38 | 3.68 | 4.60 | 4.50 | 4.60 |
| F(no(λ), ne(λ)) | 1.05 | 1.00 | 0.70 | 0.89 | 0.70 |

Such a liquid crystal material was prepared by blending the materials shown in Example 6.

As the optical phase plates 2 and 3, those including a discotic liquid crystal material in a tilted orientation as in Example 6 were used.

For comparison, two comparative samples of LCD devices as shown in Table 9 above (comparative samples #401b and #402b) were produced in the same manner as that used in the above samples of this example, except that liquid crystal materials of which the values of the refractive index anisotropy Δn for light with a wavelength of 550 nm were set at 0.060 and 0.120, respectively.

The LCD devices of samples #41b to #43b and comparative samples #401b and #402b were measured for the viewing angle dependence using the measurement system as shown in FIG. 5 including the light-receiving element 18, the amplifier 19, and the recording device 20.

The LCD devices of samples #41b to #43b and comparative samples #401b and #402b were placed in the above measurement system, to measure the relationship between the voltage applied to the LCD devices and the output level of the light-receiving element 18 when the light-receiving element 18 was fixed at a constant angle φ.

It was assumed that the x-axis direction is toward the lower side of the screen and the y-axis direction is toward the left side thereof. The measurement was performed by changing the position of the light-receiving element 18 among positions at an angle φ of 50° in the upward direction (negative viewing direction), the right direction, and the left direction.

Figure 8A:
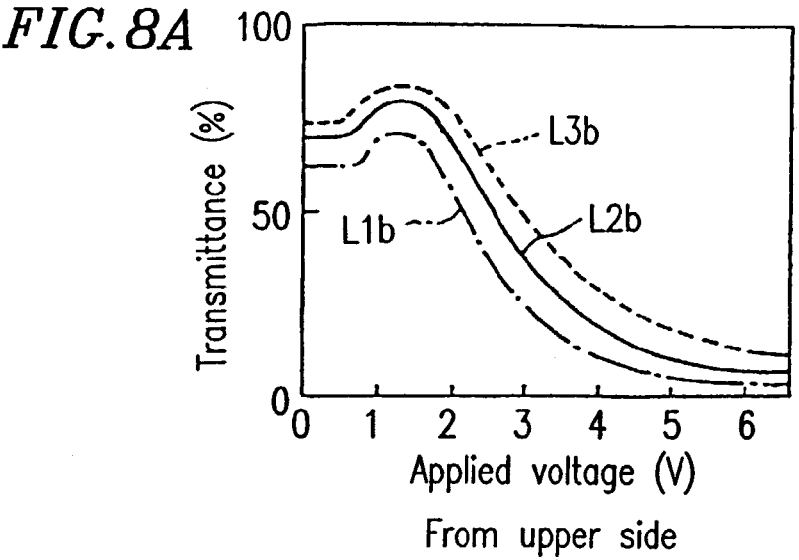
FIGS. 8A to 8C are graphs showing the transmittance vs. applied voltage characteristics of LCD devices of Example 9 according to the present invention.
Figure 8B:
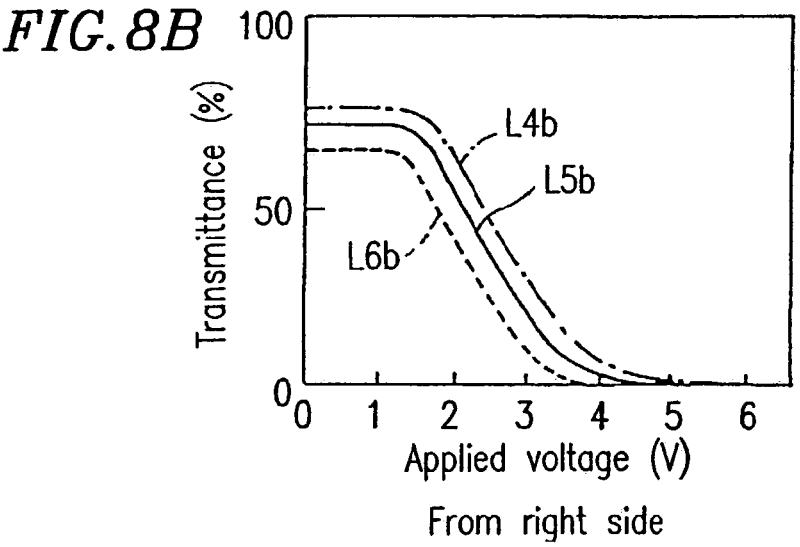
Figure 8C:
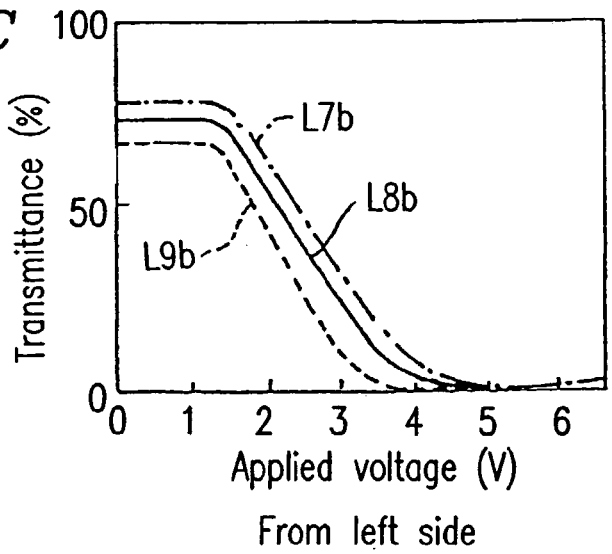

The measurement results of samples #41b to #43b are shown in FIGS. 8A to 8C, while those of comparative samples #401b and #402b are shown in FIGS. 9A to 9C. FIGS. 8A to 8C and 9A to 9C are graphs of the light transmittance of the LCD devices with respect to the voltage applied thereto (transmittance vs. applied voltage characteristics): FIGS. 8A and 9A show the results obtained when measured from the upper side as is viewed from FIG. 5; FIGS. 8B and 9B show the results obtained when measured from the right side as is viewed from FIG. 5: and FIGS. 8C and 9C show the results obtained when measured from the left side as is viewed from FIG. 5.

Referring to FIGS. 8A to 8C, curves L1b, L4b, and L7b (the one-dot dash lines) represent sample #41b which uses a liquid crystal material with Δn(550) of 0.070 for the liquid crystal layer 8, curves L2b, L5b, and L8b (the solid lines) represent sample #42b which uses a liquid crystal material with Δn(550) of 0.080 for the liquid crystal layer 8, and curves L3b, L6b, and L9b (the dashed lines) represent sample #43b which uses a liquid crystal material with Δn(550) of 0.095 for the liquid crystal layer 8. Referring to FIGS. 9A to 9C, curves L10b, L12b, and L14b (the solid lines) represent comparative sample #401b which uses a liquid crystal material with Δn(550) of 0.060 for the liquid crystal layer 8, and curves L11b, L13b, and L15b (the dashed lines) represent sample #402b which uses a liquid crystal material with Δn(550) of 0.120 for the liquid crystal layer 8.

As for the transmittance vs. applied voltage characteristics measured from the upper side, as shown by curves L1b to L3b in FIG. 8A, it was confirmed that in samples #41b to #43b as the voltage increased the transmittance sufficiently decreased. On the contrary, in comparative sample #402b, as shown by curve L11b in FIG. 9A, as the voltage increased the transmittance did not sufficiently decrease. In comparative sample #401b, as shown by curve L10b in FIG. 9A, as the voltage increased, the transmittance initially decreased and then increased again, causing an inversion phenomenon.

Likewise, as for the transmittance vs. applied voltage characteristics measured from the right side, as shown by curves L4b to L6b in FIG. 8B, it was confirmed that in samples #41b to #43b as the voltage increased the transmittance decreased to nearly zero. In comparative sample #401b, as shown by curve L12b in FIG. 9B, as the voltage increased the transmittance decreased to nearly zero. However, in comparative sample #402b, as shown by curve L13b in FIG. 9B, as the voltage increased, the transmittance initially decreased and then increased again, causing an inversion phenomenon.

Likewise, as for the transmittance vs. applied voltage characteristics measured from the left side, as shown by curves L7b to L9b in FIG. 8C, it was confirmed that in samples #41b to #43b as the voltage increased the transmittance decreased to nearly zero. In comparative sample #401b, as shown by curve L14b in FIG. 9C, as the voltage increased the transmittance decreased to nearly zero. However, in comparative sample #402b, as shown by curve L15b in FIG. 9C, as the voltage increased, the transmittance initially decreased and then increased again, causing an inversion phenomenon.

Visual inspection was performed for samples #41b to #43b and comparative samples #401b and #402b under white light. As a result, for samples #41b to #43b of this example and comparative sample #401b, no coloring was observed in any direction at a viewing angle of 50° or less, providing good image quality.

For comparative sample #402b, however, yellow to orange coloring was observed when viewed from the right and left sides at a viewing angle of 50°.

From the above results, the following are recognized: As shown in FIGS. 8A to 8C, for the samples of the LCD device of this example (samples #41b to #43b) using, for the liquid crystal layer 8, a liquid crystal material of which the values of the refractive index anisotropy Δn(550) for light with a wavelength of 550 nm were set at 0.070, 0.080, and 0.095, as the applied voltage was increased, the transmittance sufficiently decreased, preventing an inversion phenomenon from occurring and thus widening the angle of field. Moreover, since no coloring was observed, the display quality of the LCD devices significantly improved.

On the contrary, as shown in FIGS. 9A to 9C, as for the comparative samples of the LCD devices (comparative samples #401b and #402b) using liquid crystal materials of which the values of the refractive index anisotropy Δn(550) for 550 nm light were set at 0.060 and 0.120, the viewing angle dependence was not sufficiently improved.

The same results as those described above were also obtained for samples of LCD devices produced in the same, manner as that used in samples #41b to #43b and comparative samples #401b and #402b, except that the optical phase plates 2 and 3 were made of a discotic liquid crystal material applied to a transparent support and crosslinked in a hybrid orientation.

The dependence of the transmittance vs. applied voltage characteristics on the tilt angle θ was examined by changing the tilt angle θ of the index ellipsoid of the optical phase plate 2 or 3. As a result, essentially the same results as those described above were obtained, irrespective of the orientation state of the discotic liquid crystal material used for the optical phase plate 2 or 3, if the angle θ is in the range of $15° \leq \theta \leq 75°$. If the angle θ is less than 15° or exceeds 75°, it was confirmed that the angle of field in the negative viewing direction is not widened.

The dependence of the transmittance vs. applied voltage characteristics on the second retardation value (na−nb)×d was examined by changing the second retardation value. As a result, essentially the same results as those described above were obtained, irrespective of the orientation state of the discotic liquid crystal material used for the optical phase plates 2 and 3, if the second retardation value is in the range between 80 nm and 250 nm inclusive. If the second retardation value is less than 80 nm or exceeds 250 nm, it was confirmed that the angle of field in the lateral (right and left) directions is not widened.

Additional three samples of the LCD device shown in FIG. 1 (samples #44b to #46b) were produced based on the results of the visual inspection of comparative samples #401b and #402b in the same manner as that used for samples #41b to #43b except that liquid crystal materials of which the values of the refractive index anisotropy for 550 nm light were set at 0.065, 0.100, and 0.115 were used for the liquid crystal layer 8.

Samples #44b to #46b of the LCD devices were placed in the measurement system shown in FIG. 5. The relationship between the voltage applied to the respective LCD devices and the output level of the light-receiving element 18 obtained when the light-receiving element 18 was fixed at a constant angle φ was measured, and the visual inspection under white light was performed.

The results of the above measurement and inspection are as follows. In samples #45b and #46b of this example in which the values of the refractive index anisotropy Δn(550) were set at 0.100 and 0.115, a slight increase in transmittance was observed as the voltage was increased when measured from the right and left sides at an angle φ of 50°. However, with no inversion phenomenon observed in the visual inspection, such a level of increase in the transmittance was tolerable for use. When measured from the upper side, samples #45b and #46b had no problem.

In sample #44b in which the value of the refractive index anisotropy Δn(550) was set at 0.065 for light with a wavelength of 550 nm, as the voltage increased, the transmittance initially decreased and then increased again, causing an inversion phenomenon, when measured from the upper side, as in comparative sample #401b described above. However, the degree of the increase in transmittance was small enough to be tolerable for use, compared with the case of comparative sample #401b (L10b) shown in FIG. 9A. When measured from the right and left sides, the results had no problem.

In the visual inspection, slight yellow to orange coloring was observed in samples #45b and #46b, although it was too slight to raise a problem. For sample #44b, slight blue coloring was observed, although it was too slight to raise a problem.

For sample #44b and comparative sample #401b, a voltage of about 1 V was applied to measure the transmittance in the direction normal to the surface of the liquid crystal cell 16 during white display. As a result, the transmittance decreased to a level intolerable for use in comparative sample #401b. On the contrary, in sample #44b of this example, although a slight reduction in the transmittance was observed, it was slight enough to be tolerable for use.

(Embodiment 3)

Figure 10:
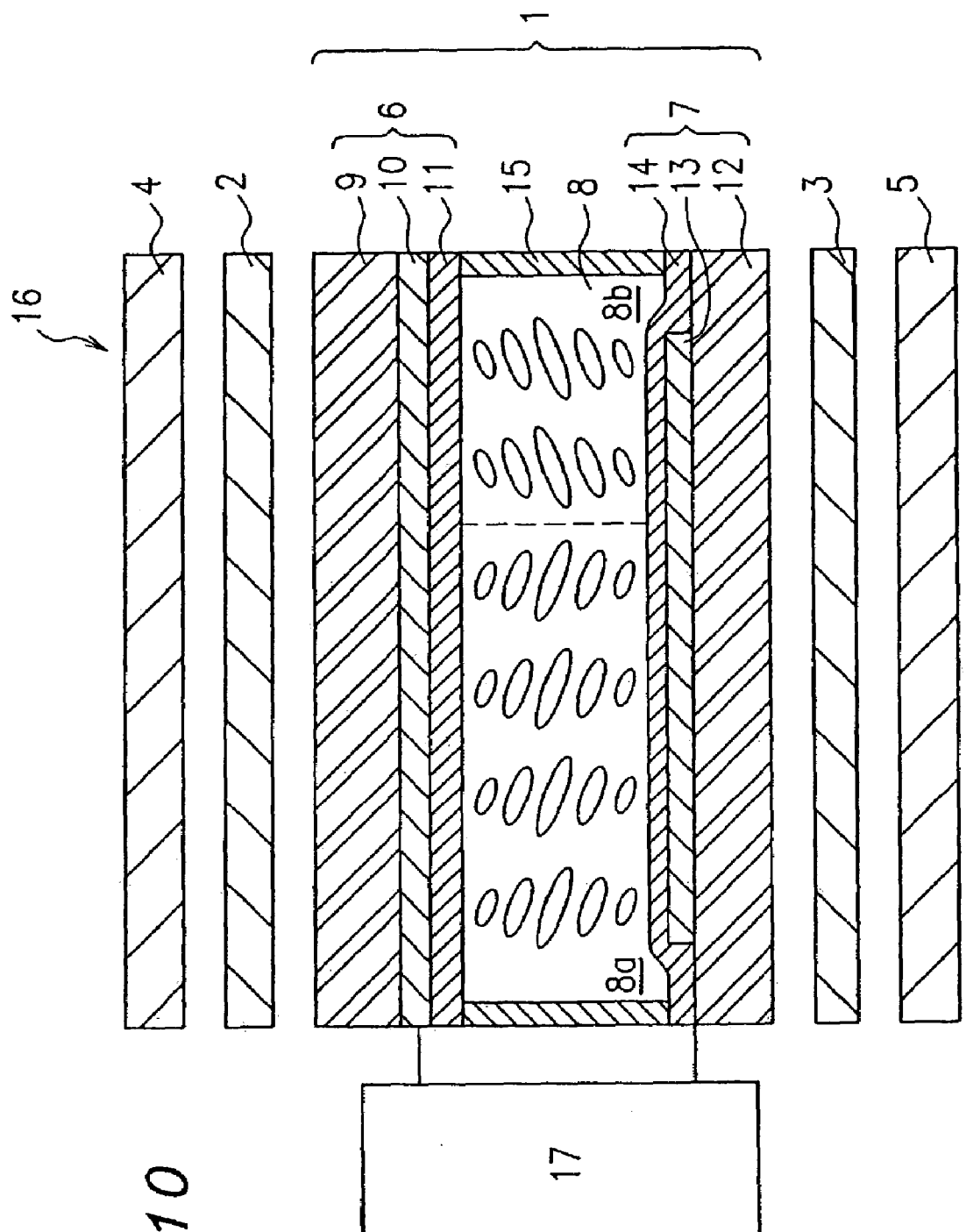
FIG. 10 is a sectional view of an LCD device of an embodiment according to the present invention.

FIG. 10 is a sectional view of an LCD device of an embodiment according to the present invention. The LCD device of this embodiment includes a liquid crystal cell 16 including an LCD element 1, a pair of optical phase plates 2 and 3, and a pair of, polarizing plates (polarizers) 4 and 5 and a driving circuit 17.

The LCD element 1 includes a pair of electrode substrates 6 and 7 and a liquid crystal layer 8 interposed therebetween. The electrode substrate 6 includes a base glass substrate (transparent substrate) 9, transparent electrodes 10 made of ITO (indium tin oxide) formed on the surface of the glass substrate 9 facing the liquid crystal layer 8, and an alignment film 11 formed on the transparent electrodes 10. The electrode substrate 7 includes a base glass substrate (transparent substrate) 12, transparent electrodes 13 made of ITO (indium tin oxide) formed on the surface of the glass substrate 12 facing the liquid crystal layer 8, and an alignment film 14 formed on the transparent electrodes 13. The transparent electrodes 10 and 13 are connected to the driving circuit 17.

Although only one pixel region is shown in FIG. 10 for simplification, it should be understood that stripe-shaped transparent electrodes 10 and 13, having a predetermined width, are formed over substantially the entire surface of a display portion of the LCD device 1 so that the transparent electrodes 10 on the glass substrate 9 and the transparent electrodes 13 on the glass substrate 12 cross each other (perpendicular to each other in this example) as is viewed at a position normal to the substrate surface.

The intersections of the transparent electrodes 10 and 13 correspond respective pixel regions, which are arranged in a matrix over the entire LCD device.

The electrode substrates 6 and 7 are bonded together with a seal resin 15, and a liquid crystal material is sealed in a space enclosed by the electrode substrates 6 and 7 and the seal resin 15 to form the liquid crystal layer 8. A voltage based on display data is applied to the liquid crystal layer 8 from the driving circuit 17 via the transparent electrodes 10 and 13.

Each of the alignment films 11 and 14 formed on the sides of the electrode substrates 6 and 7 facing the liquid crystal layer 8, respectively, has two portions having different alignment features for each pixel region, so that these portions have different pretilt angles for liquid crystal molecules or the pretilt directions of liquid crystal molecules in these portions are opposite to each other with respect to the direction normal to the substrate surface. This enables a portion of the liquid crystal layer 8 corresponding to one pixel region to be divided into a first liquid crystal molecule orientation domain 8a and a second liquid crystal molecule orientation domain 8b having different orientation states of liquid crystal molecules.

Figure 11:
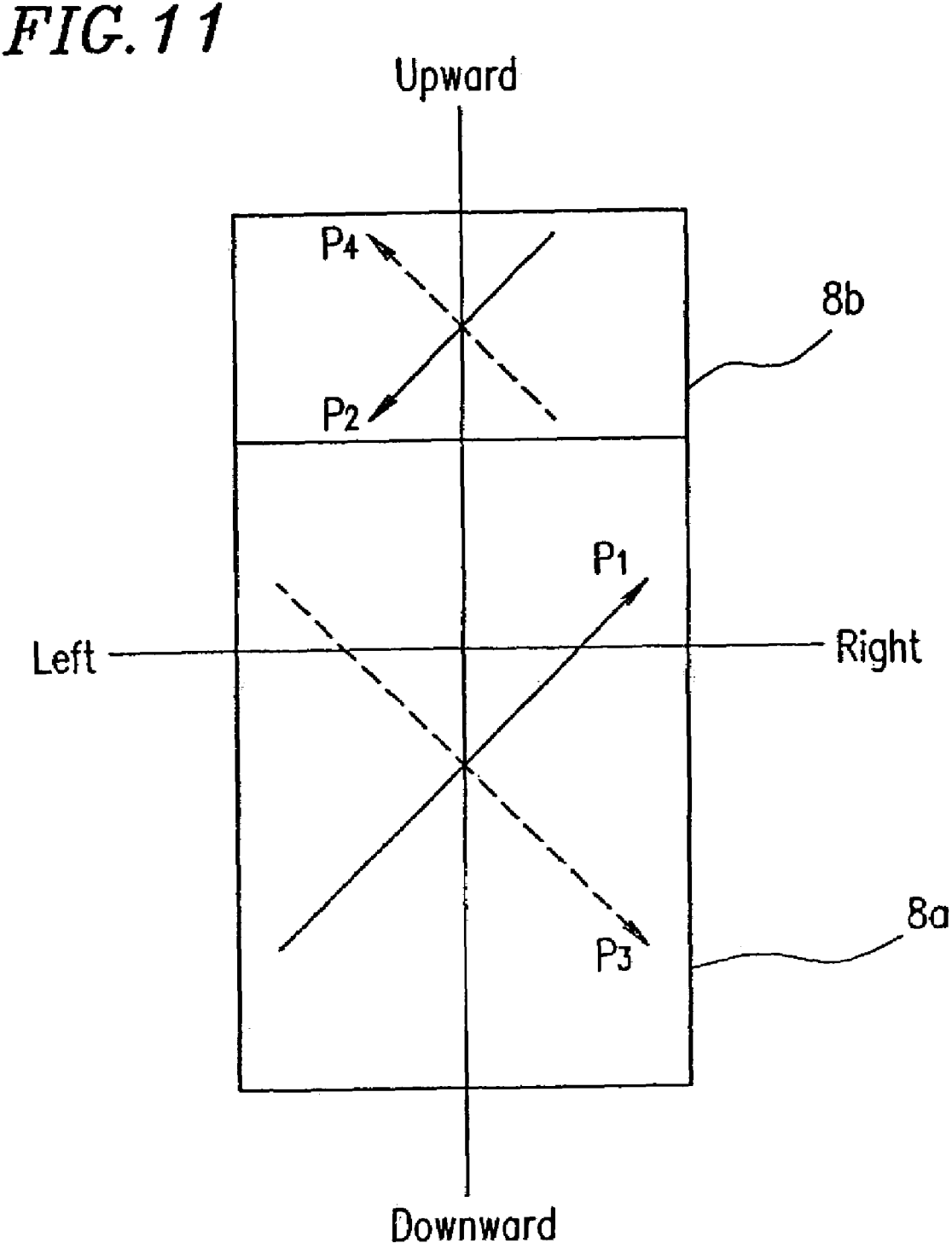
FIG. 11 is a view illustrating rubbing directions of an alignment film and viewing angle directions in the LCD device of FIG. 10.

Furthermore, in this embodiment, in order to improve the viewing angle characteristic obtained when the viewing angle is tilted in the upward and downward directions and right and left directions, in one pixel region, the first liquid crystal molecule orientation domain 8a is made larger than the second liquid crystal region 8b as shown in FIGS. 10 and 11.

FIG. 11 is a schematic view of a liquid crystal panel as is viewed from a position normal to the panel. An arrow $P_1$ represents a rubbing direction in the portion of the alignment film 11 corresponding to the first liquid crystal molecule orientation domain 8a, an arrow $P_2$ represents a rubbing direction in the portion of the alignment film 11 corresponding to the second liquid crystal molecule orientation domain 8b, an arrow $P_3$ represents a rubbing direction in the portion of the alignment film 14 corresponding to the first liquid crystal molecule orientation domain 8a, and an arrow $P_4$ represents a rubbing direction in the portion of the alignment film 14 corresponding to the second liquid crystal molecule orientation domain 8b. As shown in FIG. 11, by rubbing each of the alignment films 11 and 14 so that the rubbing directions are different between the portions of the alignment film corresponding to the liquid crystal molecule orientation domains 8a and 8b having different areas, the portion of the liquid crystal layer corresponding to one pixel region can be divided into the liquid crystal molecule orientation domains 8a and 8b having different orientation states at an unequal division ratio. One alignment film alone may be provided for the LCD device.

The optical phase plates 2 and 3 are disposed between the LCD element 1 and the polarizing plates 4 and 5, respectively, located on both surfaces of the LCD element 1. Each of the optical phase plates 2 and 3 includes a support made of a transparent organic polymer and a discotic liquid crystal material crosslinked to the support in a tilted or hybrid orientation, so that an index ellipsoid thereof is tilted as will be described later.

The support of the optical phase plates 2 and 3 is preferably made of triacetyl cellulose (TAC) which is generally used for a polarizing plate. Using this material, a reliable optical phase plate is obtained. Other materials suitable for the support include transparent and colorless organic polymer films with excellent environment resistance and chemical resistance, such as polycarbonate (PC) and polyethylene terephthalate (PET) films.

As shown in FIG. 3, in relation with Embodiment 1, each of the optical phase plates 2 and 3 has the principal refractive indices na, nb, and nc representing three different directions.

The direction of the principal refractive index na is identical to the y-axis in the rectangular coordinate system xyz, which is parallel to the surface of the optical phase plates 2 and 3 (parallel to the screen). The direction of the principal refractive index nb is tilted by an angle of θ in the direction of an arrow A from the z-axis which is normal to the surface of the optical phase plates 2 and 3 (perpendicular to the screen) with respect to the direction of the principal refractive index na as an axis. The direction of the principal refractive index nc is tilted by the angle θ in the direction of an arrow B from the x-axis which is parallel to the surface of the optical phase plates 2 and 3 (parallel to the screen) with respect to the direction of the principal refractive index na as an axis.

The three principal refractive indices na, nb, and nc have the relationship of na=nc>nb. In this case, since the optical phase plate 2, 3 is uniaxial, having a single optical axis, the refractive index anisotropy is negative.

A first retardation value of the optical phase plates 2 and 3 are expressed by the product of the difference (refractive index anisotropy Δn) between the principal refractive indices na and nc and the thickness d of the optical phase plate ((nc−na)×d). Since na=nc, the first retardation value is substantially 0 nm. A second retardation value of the optical phase plates 2 and 3 are expressed by the product of the difference (refractive index anisotropy Δn) between the principal refractive indices na and nb and the thickness d of the optical phase plate ((na−nb)×d). The second retardation value is preferably set in the range between 80 nm and 250 nm inclusive. Setting the value in this range ensures that the optical phase plates 2 are 3 provide the optical phase plate compensating function.

Figure 12:
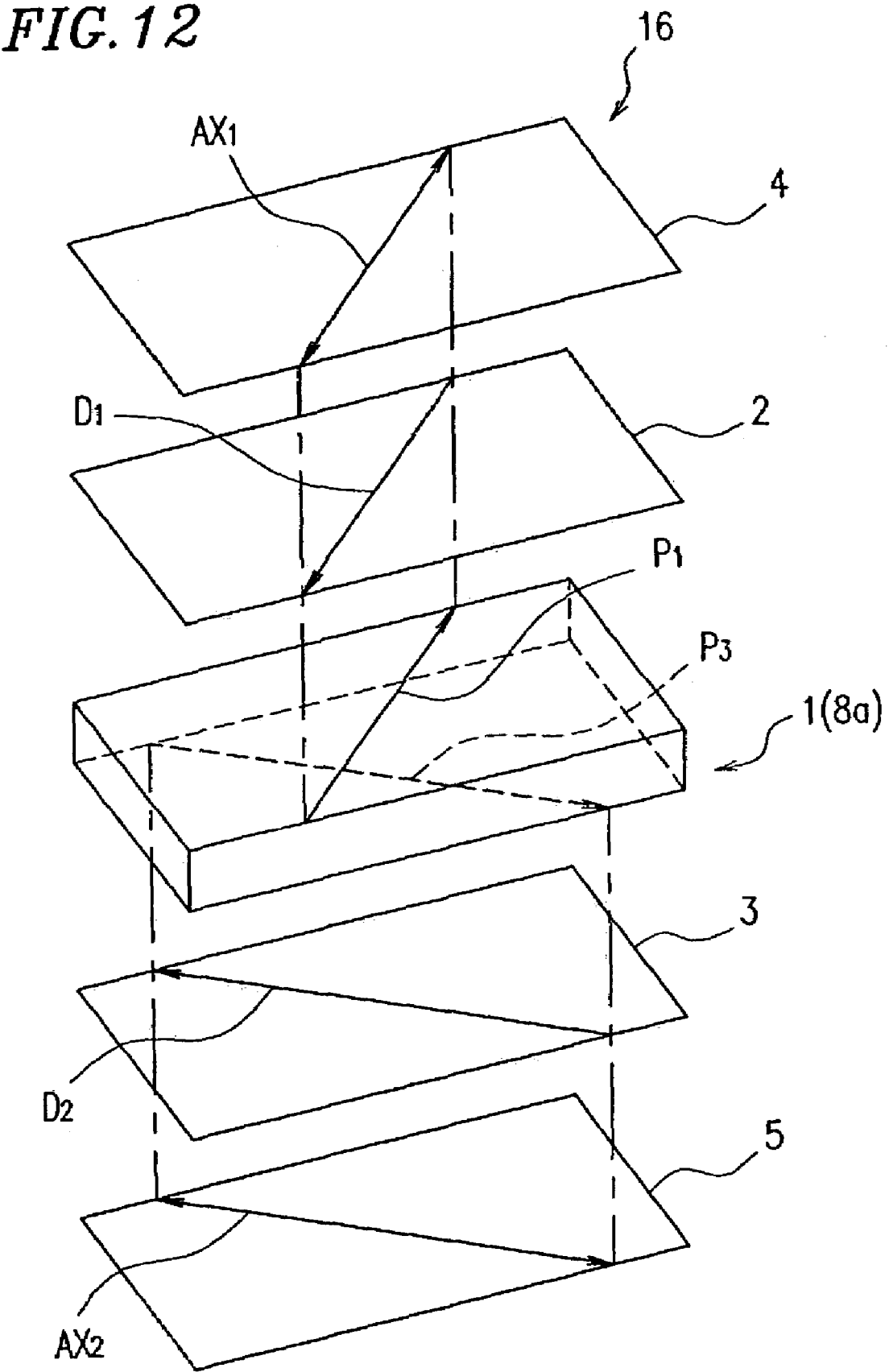
FIG. 12 is a perspective view illustrating optical arrangement of an LCD element, polarizing plates, and the optical phase plates in the LCD device of FIG. 10.

In the LCD device of this embodiment, the LCD element 1, the optical phase plates 2 and 3, and the polarizing plates 4 and 5 are arranged as shown in FIG. 12. In FIG. 12, the liquid crystal molecule orientation domain 8b is omitted for simplification.

The polarizing plate 4 is arranged so that an absorption axis $AX_1$ thereof is parallel to the rubbing direction $P_1$ of the portion of the alignment film 11 corresponding to the liquid crystal molecule orientation domain 8a described above, while the polarizing plate 5 is arranged so that an absorption axis $AX_2$ thereof is parallel to the rubbing direction $P_3$ of the portion of the alignment film 14 corresponding to the liquid crystal molecule orientation domain 8a.

The optical phase plate 2 is arranged so that a direction $D_1$ (corresponding to the direction D described with reference to FIG. 3) is parallel to the rubbing direction $P_1$ of the portion of the alignment film 11 corresponding to the liquid crystal molecule orientation domain 8a, while the optical phase plate 3 is arranged so that a direction $D_2$ (corresponding to the direction D described with reference to FIG. 3) is parallel to the rubbing direction $P_2$ of the portion of the alignment film 14 corresponding to the liquid crystal molecule orientation domain 8a.

As for the liquid crystal layer 8, the rates of variation of the ordinary light refractive index no and the extraordinary light refractive index ne of the liquid crystal material with respect to the wavelength are preset to be in a predetermined range in which viewing angle dependent coloring does not occur on the display screen, in consideration of the matching with the wavelength dependence of the refractive index of the optical phase plates 2 and 3.

More specifically, the rates of variation of the ordinary light refractive-index no and the extraordinary light refractive index ne of the liquid crystal material with respect to the wavelength are set so as to satisfy at least one of setting ranges (a) and (b) in each of the following conditions (1) and (2).

(1) When the rate of variation among the extraordinary light refractive indices ne(450), ne(550), and ne(650) for light with wavelengths of 450 nm, 550 nm, and 650 nm, respectively, and the rate of variation among the ordinary light refractive indices no(450), no(550), and no(650) for light with wavelengths of 450 nm, 550 nm, and 650 nm, respectively, have the relationship of:

$$((no(450) - no(550))/(no(550) - no(650)))/$$
$$((ne(450) - ne(550))/(ne(550) - ne(650))) \geq 1.00,$$

(a) the rate of variation among the ordinary light refractive indices no(450), no(550), and no(650) for light with wavelengths of 450 nm, 550 nm, and 650 nm, respectively, is set in the range of:

$$1.65 \leq (no(450)-no(550))/(no(550)-no(650)) \leq 2.40.$$

More preferably, the rate of variation is set in the following range:

$$1.85 \leq (no(450)-no(550))/(no(550)-no(650)) \leq 2.20.$$

(b) The rate of variation among the extraordinary light refractive indices ne(450), ne(550), and ne(650) for light with wavelengths of 450 nm, 550 nm, and 650 nm, respectively, is set in the range of $$1.70 \leq (ne(450)-ne(550))/(ne(550)-ne(650)) \leq 2.30.$$

More preferably, the rate of variation is set in the following range:

$$1.85 \leq (ne(450)-ne(550))/(ne(550)-ne(650)) \leq 2.10.$$

(2) When the rate of variation among the extraordinary light refractive indices ne(450), ne(550), and ne(650) for light with wavelengths of 450 nm, 550 nm, and 650 nm, respectively, and the rate of variation among the ordinary light refractive indices no(450), no(550), and no(650) for light with wavelengths of 450 nm, 550 nm, and 650 nm, respectively, have the relationship of:

$$((no(450) - no(550))/(no(550) - no(650)))/$$
$$((ne(450) - ne(550))/(ne(550) - ne(650))) < 1.00,$$

(a) The rate of variation among the ordinary light refractive indices no(450), no(550), and no(650) for light with wavelengths of 450 nm, 550 nm, and 650 nm, respectively, is set in the range of:

$$1.00 \leq (no(450)-no(550))/(no(550)-no(650)) \leq 1.65.$$

More preferably, the rate of variation is set in the following range:

$$1.15 \leq (no(450)-no(550))/(no(550)-no(650)) \leq 1.45.$$

(b) The rate of variation among the extraordinary light refractive indices ne(450), ne(550), and ne(650) for light with wavelengths of 450 nm, 550 nm, and 650 nm, respectively, is set in the range of:

$$1.20 \leq (ne(450)-ne(550))/(ne(550)-ne(650)) \leq 1.70.$$

More preferably, the rate of variation is set in the following range:

$$1.35 \leq (ne(450)-ne(550))/(ne(550)-ne(650)) \leq 1.60.$$

By utilizing the above ranges, in the LCD device of this embodiment, high-quality display images with a wide angle of field without coloring when the viewing angle is dropped or during gray scale display are obtained.

Hereinbelow, the LCD device of this embodiment will be described by way of specific examples.

EXAMPLE 10

In Example 10, in the LCD device shown in FIG. 10, a liquid crystal material for the liquid crystal layer 8 was set so that: the extraordinary light refractive indices ne(450), ne(550), and ne(650) of the liquid crystal material for light with wavelengths of 450 nm, 550 nm, and 650 nm, respectively, and the ordinary light refractive indices no(450), no(550), and no(650) for light with wavelengths of 450 nm, 550 nm, and 650 nm, respectively, are in the range of:

$$((no(450) - no(550))/(no(550) - no(650)))/$$
$$((ne(450) - ne(550))/(ne(550) - ne(650))) \geq 1.00; \text{ and}$$

the rate of variation among the extraordinary light refractive indices ne(450), ne(550), and ne(650) for light with wavelengths of 450 nm, 550 nm, and 650 nm, respectively, is in the range of:

$$1.70 \leq (ne(450)-ne(550))/(ne(550)-ne(650)) \leq 2.30. \quad (A)$$

Such a liquid crystal material was prepared by blending the materials represented by structural formula (3) below:

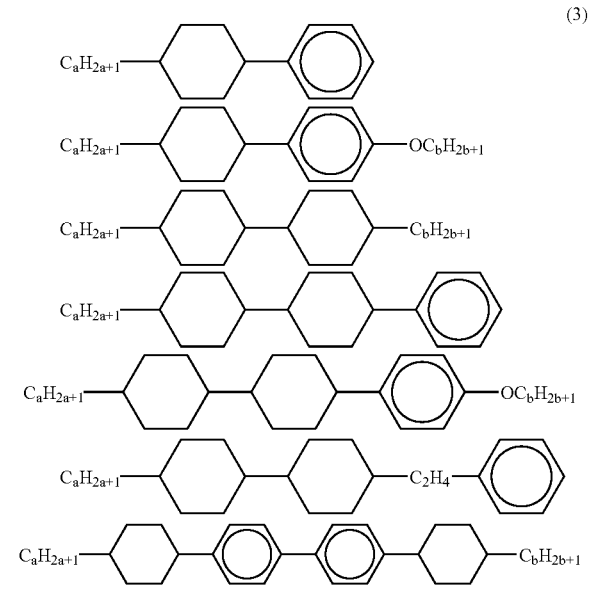

(3)

For the alignment films 11 and 14, Optomer AL, manufactured by Japan Synthetic Rubber Co., Ltd., was used. The division ratio of the first liquid crystal molecule orientation domain 8a to the second liquid crystal molecule orientation domain 8b of the portion of the liquid crystal layer 8 corresponding to one pixel region was set at 17:3. The cell thickness of the liquid crystal cell 16 (the thickness of the liquid crystal layer 8) was set at 5 μm. Five samples of such LCD devices as shown in Table 10 below (samples #11c to #15c) were produced.

In these samples, the optical phase plates 2 and 3 were formed in the following manner. A discotic liquid crystal material was applied to a transparent support (made of triacetyl cellulose (TAC), for example). The discotic liquid crystal material was crosslinked in a tilted orientation so that the first retardation value (nc−na)×d is 0 nm while the second retardation value (na−nb)×d is 100 nm, and that the tilt angle θ of a tilted index ellipsoid is 20° where the direction of the principal refractive index nb shown in FIG. 3 is tilted by about 20° in the direction of the arrow A from the z-axis in the xyz coordinate system and the direction of the principal refractive index nc is tilted by about 20° in the direction of the arrow B from the x-axis.

For comparison, two comparative samples of LCD devices as shown in Table 10 below (comparative samples

201c and #202c) were produced in the same manner as that in the above samples of this example except that liquid crystal materials having a rate of variation ((ne(450)−ne(550))/(ne(550)−ne(650))) of 1.60 and 2.40, which are outside the above range (A), were used for the liquid crystal layer 8 of the LCD device shown in FIG. 10.

Table 10 shows the results of visual inspections of color hue at viewing angles of 50°, 60°, and 70° performed for samples #11c to #15c and comparative samples #201c and #202c. In Table 10, as well as Tables 11 to 13 for Examples 11 to 13, to be described later, the mark ○ represents "no coloring", Δ represents "tolerable coloring", and X represents "intolerable coloring".

TABLE 10

| Viewing angle (θ) | Sample | | | | | | |
|---|---|---|---|---|---|---|---|
| | #201c | #11c | #12c | #13c | #14c | #15c | #202c |
| | (ne(450) − ne(550))/(ne(550) − ne(650)) | | | | | | |
| | 1.60 | 1.70 | 1.85 | 1.90 | 2.10 | 2.30 | 2.40 |
| 50° | X | ○ | ○ | ○ | ○ | ○ | X |
| 60° | X | Δ | ○ | ○ | ○ | Δ | X |
| 70° | X | X | ○ | ○ | ○ | X | X |

It is found from Table 10 that in samples #12c to #14c no coloring was observed even when the viewing angle was dropped to 70°, providing good image quality. This indicates that coloring is further reduced and especially excellent characteristics are provided in the range of the rate of variation of:

$$1.85 \leq (ne(450)-ne(550))/(ne(550)-ne(650)) \leq 2.10.$$

As for samples #11c and #15c, although coloring was observed at viewing angles of 60° and 70°, no coloring was observed at a viewing angle of 50° or less, providing good display characteristics of a level tolerable for use.

As for comparative samples #201c and #202c, however, coloring was eminently observed when the viewing angle is dropped to 50°, providing display characteristics of a level intolerable for use.

EXAMPLE 11

In Example 11, in the LCD device shown in FIG. 10, a liquid crystal material for the liquid crystal layer 8 was set so that: the extraordinary light refractive indices ne(450), ne(550), and ne(650) of the liquid crystal material for light with wavelengths of 450 nm, 550 nm, and 650 nm, respectively, and the ordinary light refractive indices no(450), no(550), and no(650) for light with wavelengths of 450 nm, 550 nm, and 650 nm, respectively, are in the range of:

$$((no(450) - no(550))/(no(550) - no(650)))/((ne(450) - ne(550))/(ne(550) - ne(650))) \geq 1.00; \text{ and}$$

the rate of variation among the ordinary light refractive indices no(450), no(550), and no(650) for light with wavelengths of 450 nm, 550 nm, and 650 nm, respectively, is in the range of:

$$1.65 \leq (no(450)-no(550))/(no(550)-no(650)) \leq 2.40. \quad (B)$$

Such a liquid crystal material was prepared by blending the materials shown in Example 10.

For the alignment films 11 and 14, Optomer AL, manufactured by Japan Synthetic Rubber Co., Ltd., was used. The division ratio of the first liquid crystal molecule orientation domain 8a to the second liquid crystal molecule orientation domain 8b of the portion of the liquid crystal layer 8 corresponding to one pixel region was set at 17:3. The cell thickness of the liquid crystal cell 16 (the thickness of the liquid crystal layer 8) was set at 5 μm. Five samples of such LCD devices as shown in Table 11 below (samples #21c to #25c) were produced.

The optical phase plates 2 and 3 were formed in the following manner. A discotic liquid crystal material was applied to a transparent support (made of triacetyl cellulose (TAC), for example). The discotic liquid crystal material was crosslinked in a tilted orientation so that the first retardation value (nc−na)×d is 0 nm while the second retardation value (na−nb)×d is 100 nm, and that the tilt angle θ of a tilted index ellipsoid is 20° where the direction of the principal refractive index nb shown in FIG. 3 is tilted by about 20° in the direction of the arrow A from the z-axis in the xyz coordinate system and the direction of the principal refractive index nc is tilted by about 20° in the direction of the arrow B from the x-axis.

For comparison, two comparative samples of LCD devices as shown in Table 11 below (comparative samples #301c and #302c) were produced in the same manner as that in the above samples of this example except that liquid crystal materials having a rate of variation ((no(450)−no(550))/(no(550)−no(650))) of 1.55 and 2.50, which are outside the above range (B), were used for the liquid crystal layer 8 of the LCD device shown in FIG. 10.

Table 11 shows the results of visual inspections of color hue at viewing angles of 50°, 60°, and 70° performed for samples #21c to #25c and comparative samples #301c and #302c.

TABLE 11

| Viewing angle (θ) | Sample | | | | | | |
|---|---|---|---|---|---|---|---|
| | #301c | #21c | #22c | #23c | #24c | #25c | #302c |
| | (no(450) − no(550))/(no(550) − no(650)) | | | | | | |
| | 1.55 | 1.65 | 1.85 | 2.05 | 2.20 | 2.40 | 2.50 |
| 50° | X | ○ | ○ | ○ | ○ | ○ | X |
| 60° | X | Δ | ○ | ○ | ○ | Δ | X |
| 70° | X | X | ○ | ○ | ○ | X | X |

It is found from Table 11 that in samples #22c to #24c no coloring was observed even when the viewing angle was dropped to 70°, providing good image quality. This indicates that coloring is further reduced and especially excellent characteristics are provided in the range of the rate of variation of:

$$1.85 \leq (no(450)-no(550))/(no(550)-no(650)) \leq 2.20.$$

As for samples #21c and #25c, although coloring was observed at viewing angles of 60° and 70°, no coloring was observed at a viewing angle of 50° or less, providing good display characteristics of a level tolerable for use.

As for comparative samples #301c and #302c, however, coloring was eminently observed when the viewing angle is dropped to 50°, providing display characteristics of a level intolerable for use.

EXAMPLE 12

In Example 12, in the LCD device shown in FIG. 10, a liquid crystal material for the liquid crystal layer 8 was set so that: the extraordinary light refractive indices ne(450), ne(550), and ne(650) of the liquid crystal material for light with wavelengths of 450 nm, 550 nm, and 650 nm, respectively, and the ordinary light refractive indices no(450), no(550), and no(650) for light with wavelengths of 450 nm, 550 nm, and 650 nm, respectively, are in the range of:

$$((no(450)-no(550))/(no(550)-no(650)))/$$
$$((ne(450)-ne(550))/(ne(550)-ne(650))) < 1.00; \text{ and}$$

the rate of variation among the extraordinary light refractive indices ne(450), ne(550), and ne(650) for light with wavelengths of 450 nm, 550 nm, and 650 nm, respectively, is in the range of:

$$1.20 \leq (ne(450)-ne(550))/(ne(550)-ne(650)) \leq 1.70. \quad (C)$$

Such a liquid crystal material was prepared by blending the materials shown in Example 10.

For the alignment films 11 and 14, Optomer AL, manufactured by Japan Synthetic Rubber Co. Ltd., was used. The division ratio of the first liquid crystal molecule orientation domain 8a to the second liquid crystal molecule orientation domain 8b of the portion of the liquid crystal layer 8 corresponding to one pixel region was set at 17:3. The cell thickness of the liquid crystal cell 16 (the thickness of the liquid crystal layer 8) was set at 5 μm. Five samples of such LCD devices as shown in Table 12 below (samples #31c to #35c) were produced.

The optical phase plates 2 and 3 were formed in the following manner. A discotic liquid crystal material was applied to a transparent support (made of triacetyl cellulose (TAC), for example). The discotic liquid crystal material was crosslinked in a tilted orientation so that the first retardation value (nc−na)×d is 0 nm while the second retardation value (na−nb)×d is 100 nm, and that the tilt angle θ of a tilted index ellipsoid is 20° where the direction of the principal refractive index nb shown in FIG. 3 is tilted by about 20° in the direction of the arrow A from the z-axis in the xyz coordinate system and the direction of the principal refractive index nc is tilted by about 20° in the direction of the arrow B from the x-axis.

For comparison, two comparative samples of LCD devices as shown in Table 12 below (comparative samples #401c and #402c) were produced in the same manner as that in the above samples of this example, except that liquid crystal materials having a rate of variation ((ne(450)−ne(550)/(ne(550)−ne(650)) of 1.10 and 1.80, which are outside the above range (C), were used for the liquid crystal layer 8 of the LCD device shown in FIG. 10.

Table 12 shows the results of visual inspections of color hue at viewing angles of 50°, 60°, and 70° performed for samples #31c to #35c and comparative samples #401c and #402c.

TABLE 12

| Viewing angle (θ) | Sample | | | | | | |
|---|---|---|---|---|---|---|---|
|  | #401c | #31c | #32c | #33c | #34c | #35c | #402c |
|  | (ne(450) − ne(550))/(ne(550) − ne(650)) | | | | | | |
|  | 1.10 | 1.20 | 1.35 | 1.50 | 1.60 | 1.70 | 1.80 |
| 50° | X | ○ | ○ | ○ | ○ | ○ | X |
| 60° | X | Δ | ○ | ○ | ○ | Δ | X |
| 70° | X | X | ○ | ○ | ○ | X | X |

It is found from Table 10 that in samples #32c to #34c no coloring was observed even when the viewing angle was dropped to 70°, providing good image quality. This indicates that coloring is further reduced and especially excellent characteristics are provided in the range of the rate of variation of:

$$1.35 \leq (ne(450)-ne(550))/(ne(550)-ne(650)) \leq 1.60.$$

As for samples #31c and #35c, although coloring was observed at viewing angles of 60° and 70°, no coloring was observed at a viewing angle of 50° or less, providing good display characteristics of a level tolerable for use.

As for comparative samples #401c and #402c, however, coloring was eminently observed when the viewing angle is dropped to 50°, providing display characteristics of a level intolerable for use.

EXAMPLE 13

In Example 13, in the LCD device shown in FIG. 10, a liquid crystal material for the liquid crystal layer 8 was set so that: the extraordinary light refractive indices ne(450), ne(550), and ne(650) of the liquid crystal material for light with wavelengths of 450 nm, 550 nm, and 650 nm, respectively, and the ordinary light refractive indices no(450), no(550), and no(650) for light with wavelengths of 450 nm, 550 nm, and 650 nm, respectively, are in the range of:

$$((no(450)-no(550))/(no(550)-no(650)))/$$
$$((ne(450)-ne(550))/(ne(550)-ne(650))) < 1.00; \text{ and}$$

the rate of variation among the ordinary light refractive indices no(450), no(550), and no(650) for light with wavelengths of 450 nm, 550 nm, and 650 nm, respectively, is in the range of:

$$1.00 \leq (no(450)-no(550))/(no(550)-no(650)) \leq 1.65. \quad (D)$$

Such a liquid crystal material was prepared by blending the materials shown in Example 10.

For the alignment films 11 and 14, Optomer AL, manufactured by Japan Synthetic Rubber Co., Ltd., was used. The division ratio of the first liquid crystal molecule orientation domain 8a to the second liquid crystal molecule orientation domain 8b of the portion of the liquid crystal layer 8 corresponding to one pixel region was set at 17:3. The cell thickness of the liquid crystal cell 16 (the thickness of the liquid crystal layer 8) was set at 5 μm. Five samples of such LCD devices as shown in Table 13 below (samples #41c to #45c) were produced.

The optical phase plates 2 and 3 were formed in the following manner. A discotic liquid crystal material was applied to a transparent support (made of triacetyl cellulose (TAC), for example). The discotic liquid crystal material was crosslinked in a tilted orientation so that the first retardation value (nc−na)×d is 0 nm while the second retardation value (na−nb)×d is 100 nm, and that the tilt angle θ of a tilted index ellipsoid is 20° where the direction of the principal refractive index nb shown in FIG. 3 is tilted by about 20° in the direction of the arrow A from the z-axis in the xyz coordinate system and the direction of the principal refractive index nc is tilted by about 20° in the direction of the arrow B from the x-axis.

For comparison, two comparative samples of LCD devices as shown in Table 13 below (comparative samples #501c and #502c) were produced in the same manner as that in the above samples of this example except that liquid crystal materials having a rate of variation ((no(450)−no(550)/(no(550)−no(650))) of 0.90 and 1.75, which are outside the above range (D), were used for the liquid crystal layer 8 of the LCD device shown in FIG. 10.

Table 13 shows the results of visual inspections of color hue at viewing angles of 50°, 60°, and 70° performed for samples #41c to #45c and comparative samples #501c and #502c.

TABLE 13

| Viewing angle | Sample | | | | | | |
|---|---|---|---|---|---|---|---|
| | #501c | #41c | #42c | #43c | #44c | #45c | #502c |
| (θ) | (no(450) − no(550))/(no(550) − no(650)) | | | | | | |
| | 0.90 | 1.00 | 1.15 | 1.30 | 1.45 | 1.65 | 1.75 |
| 50° | X | ○ | ○ | ○ | ○ | ○ | X |
| 60° | X | Δ | ○ | ○ | ○ | Δ | X |
| 70° | X | X | ○ | ○ | ○ | X | X |

It is found from Table 13 that in samples #42c to #44c no coloring was observed even when the viewing angle was dropped to 70°, providing good image quality. This indicates that coloring is further reduced and especially excellent characteristics are provided in the range of the rate of variation of:

$$1.15 \leq (no(450)-no(550))/(no(550)-no(650)) \leq 1.45.$$

As for samples #41c and #45c, although coloring was observed at viewing angles of 60° and 70°, no coloring was observed at a viewing angle of 50° or less, providing good display characteristics of a level tolerable for use.

As for comparative samples #501c and #502c, however, coloring was eminently observed when the viewing angle is dropped to 50°, providing display characteristics of a level intolerable for use.

EXAMPLE 14

In Example 14, three samples (samples #51c to #53c) of the LCD device shown in FIG. 10 were produced in the following manner. Optomer AL manufactured by Japan Synthetic Rubber Co., Ltd. was used for the alignment films 11 and 14. Liquid crystal materials of which the values of the refractive index anisotropy Δn(550) for light with a wavelength of 550 nm were set at 0.070, 0.080, and 0.095, respectively, were used for the liquid crystal layer 8. The division ratio of liquid crystal molecule orientation domains having different orientation states of each portion of the liquid crystal layer 8 corresponding to one pixel region was set at 17:3. The cell thickness of the liquid crystal cell 16 of these samples was 5 μm. The rates of variation of the ordinary light refractive index no and the extraordinary light refractive index ne of each sample were set as shown in Table 14 below.

TABLE 14

| Sample | | | | |
|---|---|---|---|---|
| #601c | #51c | #52c | #53c | #602c |
| (ne(450) − ne(550))/(ne(550) − ne(650)) | | | | |
| 1.85 | 1.35 | 1.50 | 1.60 | 1.90 |
| (no(450) − no(550))/(no(550) − no(650)) | | | | |
| 1.85 | 1.15 | 1.30 | 1.45 | 2.05 |

As the optical phase plates 2 and 3, those including a discotic liquid crystal material in a tilted orientation as in Example 10 were used.

For comparison, two comparative samples of LCD devices (comparative samples #601c and #602c) were produced in the same manner as that used in the above samples of this example, except that liquid crystal materials of which the values of the refractive index anisotropy Δn for light with a wavelength of 550 nm were set at 0.060 and 0.120, respectively.

The LCD devices of samples #51c to #53c and comparative samples #601c and #602c were measured for the viewing angle dependence using the measurement system as shown in FIG. 5 described above including the light-receiving element 18, the amplifier 19, and the recording device 20.

The LCD devices of samples #51c to #53c and comparative samples #601c and #601c were placed in the above measurement system, to measure the relationship between the voltage applied to the LCD devices and the output level of the light-receiving element 18 when the light-receiving element 18 was fixed at a constant angle φ.

It was assumed that the x-axis direction is toward the lower side of the screen and the y-axis direction is toward the left side thereof. The measurement was performed by changing the position of the light-receiving element 18 among positions at an angle φ of 50° in the upward direction (negative viewing direction), the right direction, and the left direction.

Figure 13A:
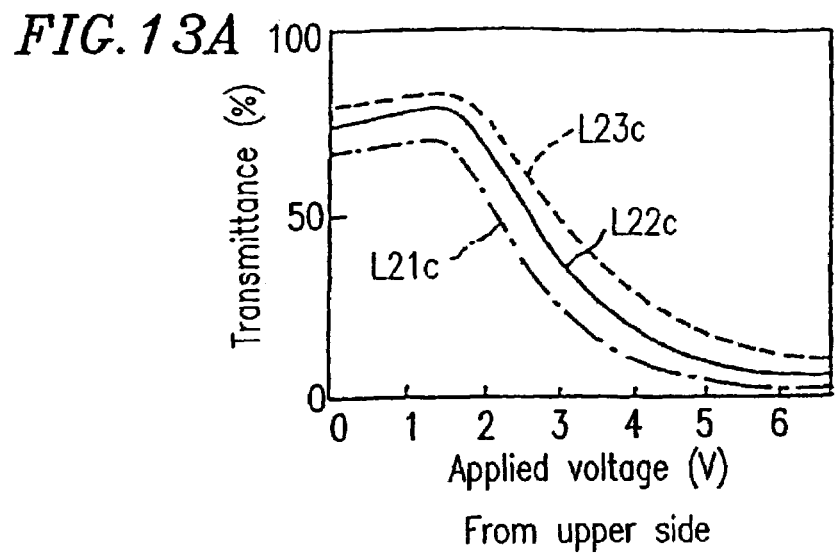
FIGS. 13A to 13C are graphs showing the transmittance vs. applied voltage characteristics of LCD devices of Example 14 according to the present invention.
Figure 13B:
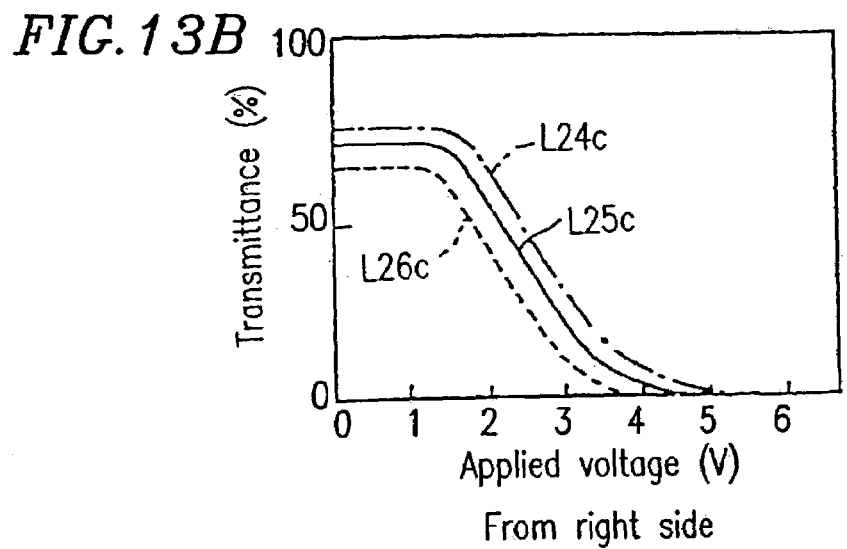
Figure 13C:
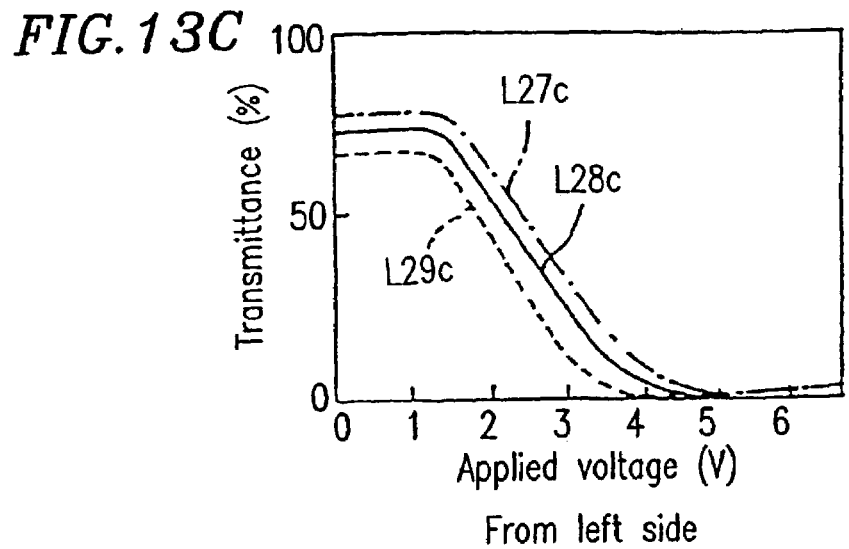
Figure 14A:
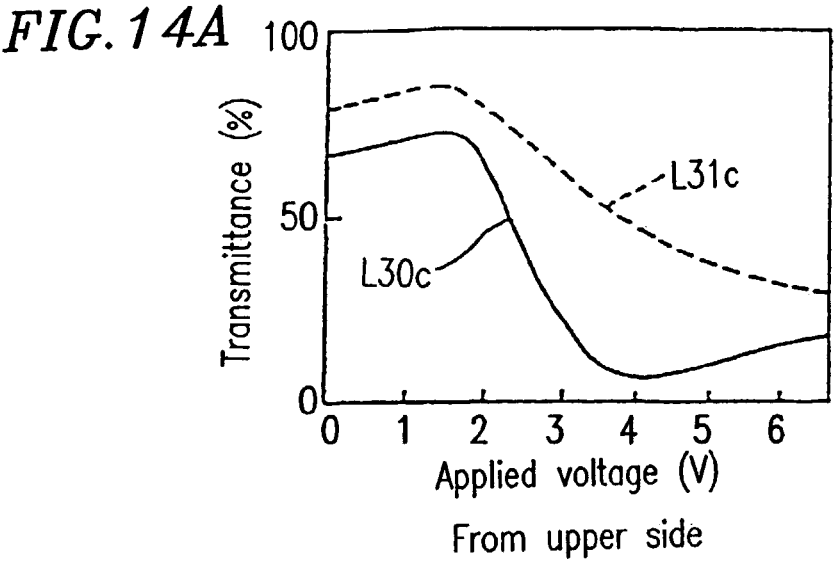
FIGS. 14A to 14C are graphs showing the transmittance vs. applied voltage characteristics of LCD devices of comparative examples.
Figure 14B:
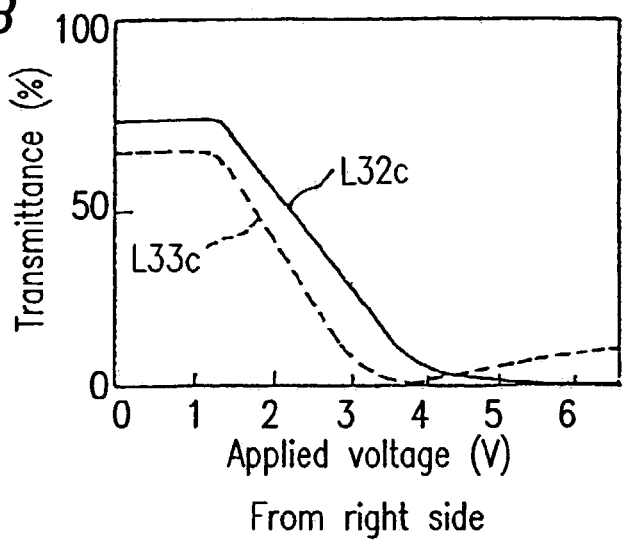
Figure 14C:
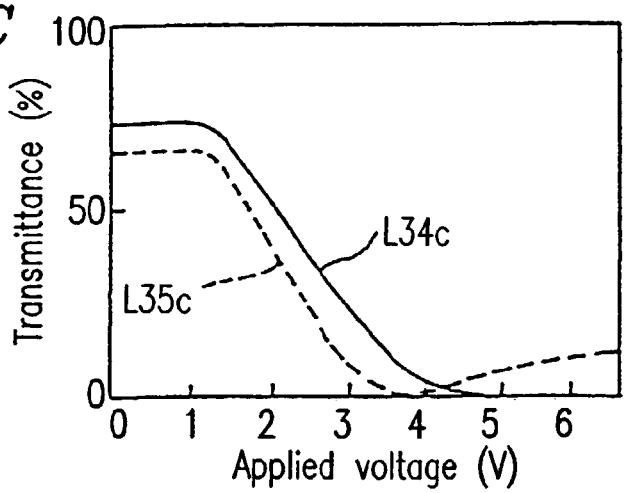

The measurement results of samples #51c to #53c are shown in FIGS. 13A to 13C, while those of comparative samples #601c and #602c are shown in FIGS. 14A to 14C. FIGS. 13A to 13C and 14A to 14C are graphs of the light transmittance of the LCD devices with respect to the voltage applied thereto (transmittance vs. applied voltage characteristics): FIGS. 13A and 14A show the results obtained when measured from the upper side; FIGS. 13B and 14B show the results obtained when measured from the right side; and FIGS. 13C and 14C show the results obtained when measured from the left side.

Referring to FIGS. 13A to 13C, curves L21c, L24c, and L27c (the one-dot dash lines) represent sample #51c which uses a liquid crystal material with Δn(550) of 0.070 for the liquid crystal layer 8, curves L22c, L25c, and L28c (the solid lines) represent sample #52c which uses a liquid crystal material with Δn(550) of 0.080 for the liquid crystal layer 8, and curves L23c, L26c, and L29c (the dashed lines) represent sample #53c which uses a liquid crystal material with Δn(550) of 0.095 for the liquid crystal layer 8.

Referring to FIGS. 14A to 14C, curves L30c, L32c, and L34c (the solid lines) represent comparative sample #601c which uses a liquid crystal material with Δn(550) of 0.060 for the liquid crystal layer 8, and curves L31c, L33c, and L35c (the dashed lines) represent sample #602c which uses a liquid crystal material with Δn(550) of 0.120 for the liquid crystal layer 8.

As for the transmittance vs. applied voltage characteristics measured from the upper side, as shown by curves L21c to L23c in FIG. 13A, it was confirmed that in samples #51c to #53c as the voltage increased the transmittance sufficiently decreased. On the contrary, in comparative sample #602c, as shown by-curve L31c in FIG. 14A, as the voltage increased the transmittance did not sufficiently decrease. In comparative sample #601c, as shown by curve L30c in FIG. 14A, as the voltage increased, the transmittance initially decreased and then increased again, causing an inversion phenomenon.

Likewise, as for the transmittance vs. applied voltage characteristics measured from the right side, as shown by curves L24c to L26c in FIG. 13B, it was confirmed that in samples #51c to #53c as the voltage increased the transmittance decreased to nearly zero. In comparative sample #601c, as shown by curve L32c in FIG. 14B, as the voltage increased the transmittance decreased to nearly zero. However, in comparative sample #602c, as shown by curve L33c in FIG. 14B, as the voltage increased, the transmittance initially decreased and then increased again, causing an inversion phenomenon.

Likewise, as for the transmittance vs. applied voltage characteristics measured from the left side, as shown by curves L27c to L29c in FIG. 13C, it was confirmed that in samples #51c to #53c as the voltage increased the transmittance decreased to nearly zero. In comparative sample #601c, as shown by curve L34c in FIG. 13C, as the voltage increased the transmittance decreased to nearly zero. However, in comparative sample #602c, as shown by curve L35c in FIG. 14C, as the voltage increased, the transmittance initially decreased and then increased again, causing an inversion phenomenon.

From the above results shown in FIGS. 13A to 13C for the samples of the LCD device of this example (samples #51c to #53c) using, for the liquid crystal layer 8, a liquid crystal material of which the values of the refractive index anisotropy Δn(550) for light with a wavelength of 550 nm were set at 0.070, 0.080, and 0.095, it is recognized that an LCD device with a wide angle of field and an excellent viewing angle characteristic without an occurrence of an inversion phenomenon can be realized.

On the contrary, as shown in FIGS. 14A to 14C, as for the comparative samples of the LCD devices (comparative samples #601c and #602c) using liquid crystal materials of which the values of the refractive index anisotropy Δn(550) for 550 nm light were set at 0.060 and 0.120, an inversion phenomenon occurred and the transmittance during the application of a voltage was not sufficiently decreased, not reaching a level tolerable for use.

The dependence of the transmittance vs. applied voltage characteristics on the tilt angle θ was examined by changing the tilt angle θ of the index ellipsoid of the optical phase plate 2 or 3. As a result, it was found that the optical compensation effect of the optical phase plate for the liquid crystal layer is ensured when the tilt angle is in the range of $15° \leq \theta \leq 75°$.

If the tilt angle is less than 15° or exceeds 75°, the angle of field is not widened, thereby failing to obtain a sufficient viewing angle characteristic. Especially, with such a tilt angle, the angle of field tends to be narrowed in the negative viewing direction.

The dependence of the transmittance vs. applied voltage characteristics on the second retardation value (na−nb)×d was examined by changing the second retardation value of the optical phase plates 2 and 3. As a result, it was found that the optical compensation effect of the optical phase plate for the liquid crystal layer is ensured when the second retardation value is in the range between 80 nm and 250 nm inclusive.

If the second retardation value (na−nb)×d is less than 80 nm or exceeds 250 nm, the angle of field is not widened, thereby failing to obtain a sufficient viewing angle characteristic. Especially, with such a second retardation value, the angle of field tends to be narrowed in the right and left directions.

EXAMPLE 15

In Example 15, three samples (samples #1c to #3c) of the LCD device shown in FIG. 10 were produced in the following manner. Optomer AL, manufactured by Japan Synthetic Rubber Co., Ltd., was used for the alignment films 11 and 14. The cell thickness of the liquid crystal cell 16 of these samples was 5 μm. The division ratio of liquid crystal molecule orientation domains of the portion of the liquid crystal layer 8 corresponding to one pixel region (first liquid crystal molecule orientation domain 8a: second liquid crystal molecule orientation domain 8b) was set at 6:4, 17:3, and 19:1 for samples #1c to #3c, respectively. The rates of variation of the ordinary light refractive index no and the extraordinary light refractive index ne of each sample were set as shown in Table 15 below.

TABLE 15

| Sample | | | |
|---|---|---|---|
| #1c | #2c | #3c | #101c |
| (ne(450) − ne(550))/(ne(550) − ne(650)) | | | |
| 1.35 | 1.50 | 1.60 | 1.85 |
| (no(450) − no(550))/(no(550) − no(650)) | | | |
| 1.15 | 1.30 | 1.45 | 1.85 |

As the optical phase plates 2 and 3, those including a discotic liquid crystal material in a tilted orientation as in Example 10 were used.

Using the measurement system shown in FIG. 5 including the light-receiving element 18, the amplifier 19, and the recording device 20, an experiment was performed to examine how the division ratio of the first liquid crystal molecule orientation domain 8a to the second liquid crystal molecule orientation domain 8b in one pixel region affects the viewing angle characteristic.

In the measurement system, the liquid crystal cell 16 of the LCD device to be measured was placed in the measurement system, as in Example 14, so that the surface 16a of the glass substrate 9 of the liquid crystal cell 16 was in the reference plane x-y of the rectangular coordinate system xyz. The light-receiving element 18 capable of receiving light at a constant solid light-receiving angle was positioned at a predetermined distance from the origin of the coordinate system in a direction of an angle φ (viewing angle) from the z-axis which is normal to the surface 16a of the liquid crystal cell 16.

In the measurement, the surface opposite to the surface 16a of the liquid crystal cell 16 placed in the measurement system was irradiated with monochrome light with a wavelength of 550 nm. Part of the monochrome light which had passed through the liquid crystal cell 16 was incident on the light-receiving element 18. The output of the light-receiving element 18 was amplified to a predetermined level by the amplifier 19, and then recorded by the recording device 20 including a waveform memory, a recorder, and the like.

The LCD devices of samples #1c to #3c were placed in the above measurement system, to measure the relationship between the voltage applied to the LCD devices and the output level of the light-receiving element 18 when the light-receiving element 18 was fixed at a constant angle φ.

It was assumed that the x-axis direction is toward the lower side of the screen and the y-axis direction is toward the left side thereof. The measurement was performed by changing the position of the light-receiving element 18 among positions at an angle φ of 30° in the upward direction (negative viewing direction), the downward direction (positive viewing direction), the right direction, and the left direction.

Figure 15A:
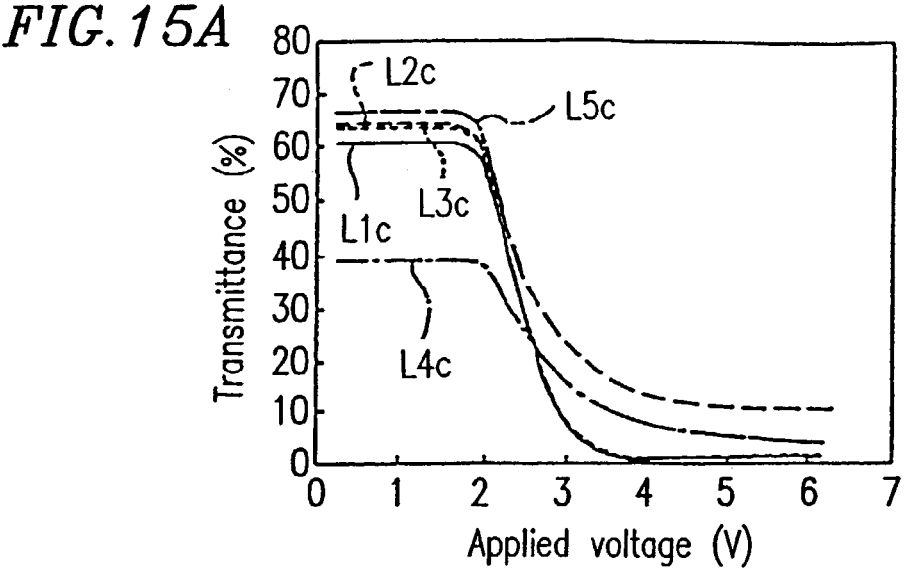
FIGS. 15A to 15C are graphs showing the transmittance vs. applied voltage characteristics of LCD devices of Example 15 according to the present invention.
Figure 15B:
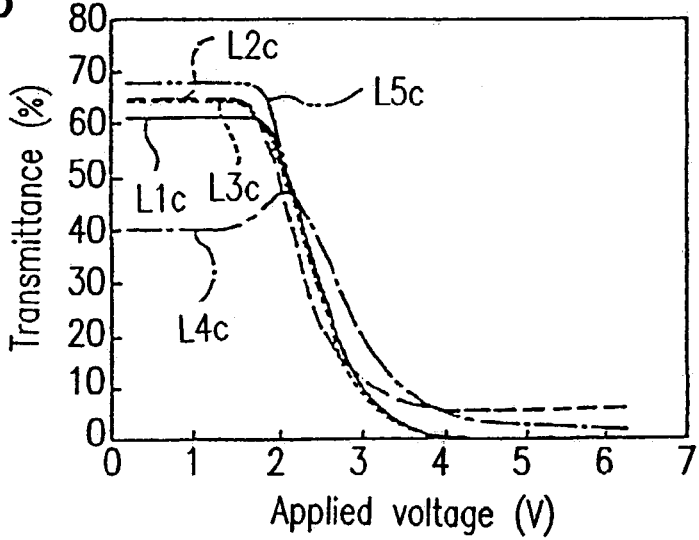
Figure 15C:
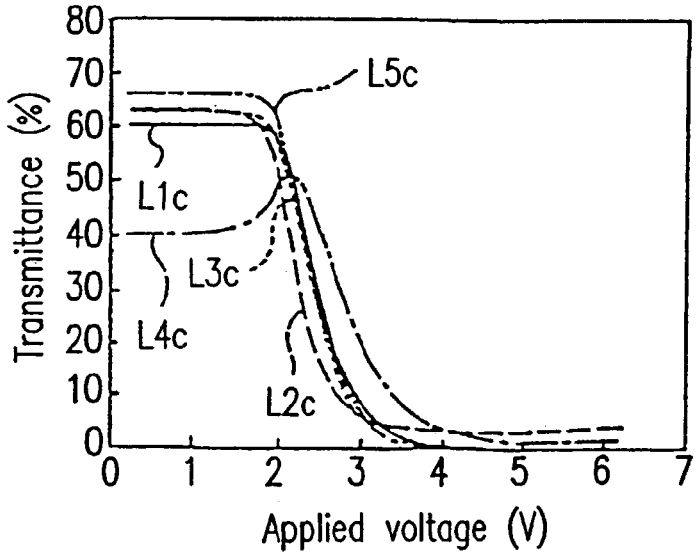

The results of the above measurements are shown in FIGS. 15A to 15C. FIGS. 15A to 15C are graphs of the light transmittance of the LCD devices with respect to the voltage applied thereto (transmittance vs. applied voltage characteristics): FIG. 15A shows the measurement results of sample #1c having the division ratio of the liquid crystal molecule orientation domains in one pixel region of 6:4; FIG. 15B shows the measurement results of sample #2c having the division ratio of 17:3; and FIG. 15C shows the measurement results of sample #3c having the division ratio of 19:1.

In FIGS. 15A to 15C, curve L1c (represented by the solid line) shows the characteristics measured in the z-axis direction, curve L2c (represented by the broken line) shows the characteristics measured from the lower side, curve L3c (represented by the dotted line) shows the characteristics measured from the right side, curve L4c (represented by the one-dot dash line) shows the characteristics measured from the upper side, and curve L5c (represented by the two-dot dash line) shows the characteristics measured from the left side.

As is observed from FIG. 15B, in sample #2c, having the division ratio of 17:3, curves L2c to L5c are close to curve L1c in the transmittance vs. applied voltage characteristics in the gray scale display region. This indicates that in the gray scale display region substantially the same viewing angle characteristic can be obtained in whichever direction, the upward, downward, right, or left direction, the viewing angle is tilted.

In the measurement from the lower side, the transmittance was kept at a low value of about 7% in the ON state, with no inversion phenomenon observed. In the measurement from the upper side, the transmittance was lower than that measured from the lower side in the ON state, indicating that the transmittance was sufficiently decreased.

Substantially the same improvement in the viewing angle characteristic as that described above was recognized in sample #1c shown in FIG. 15A and sample #3c shown in FIG. 15C.

For example, as shown in FIG. 15A, in sample #1c having the division ratio of 6:4, the tendency that curve L2c (measured from the lower side) is close to curve L4c (measured from the upper side) in the gray scale display region in the ON state appears. This tendency becomes larger as the division ratio is larger. Also, as shown in FIG. 15C, in sample #3c having the division ratio of 19:1, the tendency that curve L2c (measured from the lower side) is close to curve L1c (measured in the z-axis direction) in the gray scale display region in the ON state appears. This tendency becomes larger as the division ratio is smaller. This suppresses the phenomenon of destroying black scale of display images when viewed from the lower side (in the positive viewing direction).

As a result of further detailed examination, it has been confirmed that, when the division ratio of the liquid crystal molecule orientation domains in one pixel region is in the range of 7:3 to 9:1, a good viewing angle characteristic balanced between views from the upper and lower sides can be obtained.

For comparison, comparative sample #101c having the division ratio of the first liquid crystal molecule orientation domain 8a to the second liquid crystal molecule orientation domain 8b in the liquid crystal layer 8 of 1:1 was produced, and the viewing angle dependence thereof was measured using the measurement system shown in FIG. 5. The measurement results are shown in FIG. 16.

Figure 16:
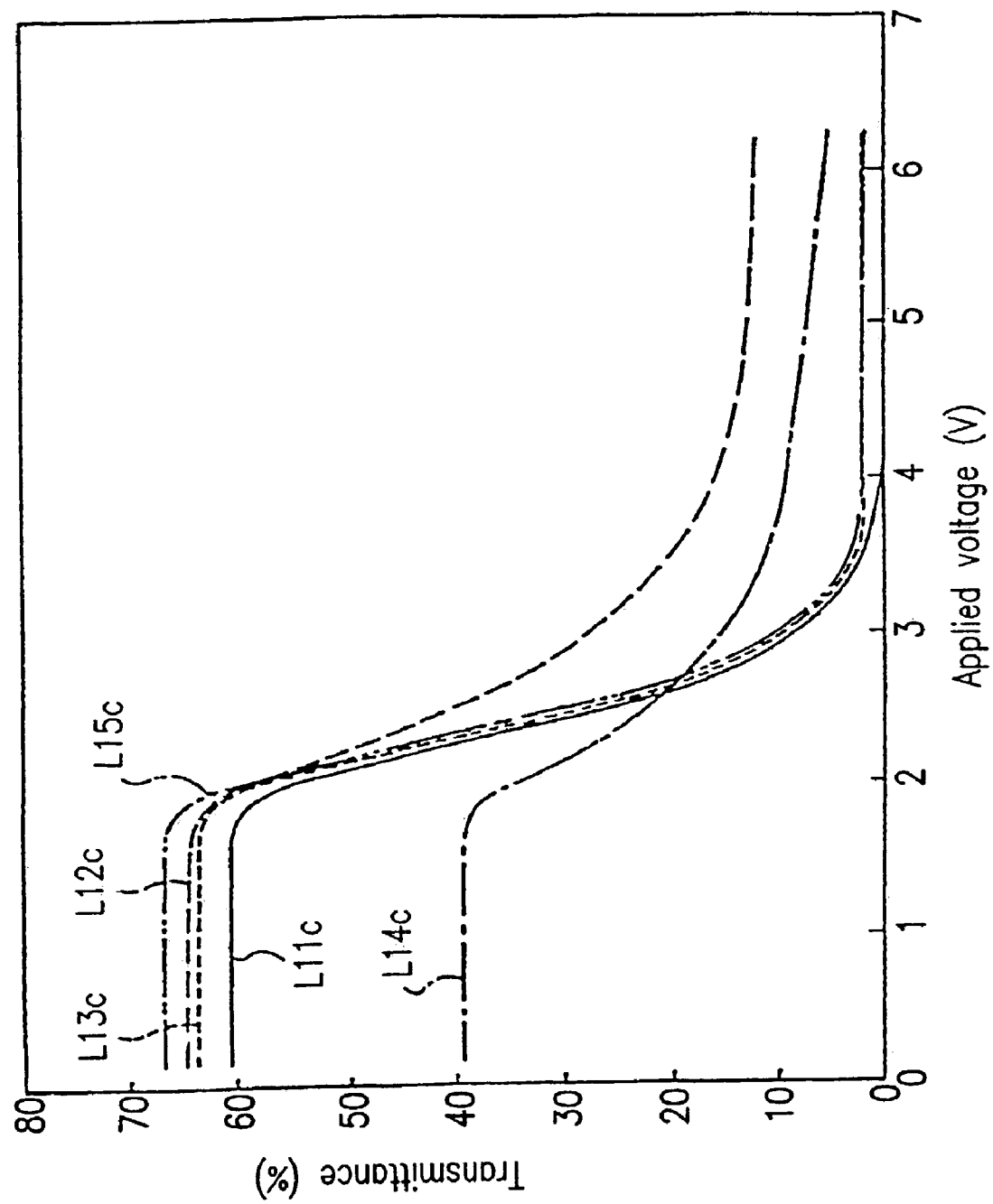
FIG. 16 is a graph showing the transmittance vs. applied voltage characteristics of LCD devices of comparative examples.

In FIG. 16, curve L11c (represented by the solid line) shows the characteristics measured in the z-axis direction, curve L12c (represented by the broken line) shows the characteristics measured from the lower side, curve L13c (represented by the dotted line) shows the characteristics measured from the right side, curve L14c (represented by the one-dot dash line) shows the characteristics measured from the upper side, and curve L15c (represented by the two-dot dash line) shows the characteristics measured from the left side.

As is observed from FIG. 16, the transmittance was sufficiently low in the ON state when measured from the right and left sides, having no problem in the viewing angle characteristic. However, when measured from the upper and lower sides, the transmittance was not sufficiently decreased in the ON state, indicating the existence of the viewing angle dependence in the upward and downward directions.

In this embodiment, two optical phase plates 2 and 3 were disposed on the surfaces of the LCD element 1. The viewing angle characteristics as described above can also be obtained by disposing the optical phase plate on either one surface of the LCD element 1. In the case of a single optical phase plate, however, although the viewing angle characteristic in the upward and downward directions are balanced and improved, the viewing angle characteristic in the right and left directions may sometimes become asymmetrical. In the case of two optical phase plates, not only the viewing angle characteristic in the upward and downward directions are improved as in the case of the single optical phase plate, but also the viewing angle characteristics in the right and left directions become symmetrical and improved. In the case of two optical phase plates, both optical phase plates may be disposed on either one surface of the LCD element 1 in a manner of one on top on the other. It is also possible to use three or more optical phase plates.

(Embodiment 4)

The LCD device of Embodiment 4 has substantially the same configuration as that in Embodiment 3. In Embodiment 3, the rates of variation of the ordinary light refractive index no and the extraordinary light refractive index ne of the liquid crystal material with respect to the wavelength are set in a range in which viewing angle dependent coloring does not occur on the display screen. Instead, in Embodiment 4, in consideration of the matching with the wavelength dependence of the refractive index of the optical phase plates 2 and 3, the conditions of the combination of the length of an average alkyl chain of the liquid crystal material, the rate of variation of the ordinary light refractive index no of the liquid crystal material with respect to the wavelength, and rate of variation of the extraordinary light refractive index ne of the liquid crystal material with respect to the wavelength are set so that viewing angle dependent coloring does not occur on the display screen.

More specifically, the conditions of the combination of the length of a mean alkyl chain of the liquid crystal material, the rate of variation of the ordinary light refractive index no of the liquid crystal material with respect to the wavelength, and the rate of variation of the extraordinary light refractive index ne of the liquid crystal material with respect to the wavelength are set so as to satisfy at least any one of settings (1) to (3) below.

(1) In the case where the length m of a mean alkyl chain ($C_mH_{2m+1}$—) of the liquid crystal material is m<3.40, the rate of variation among the extraordinary light refractive indices ne(450), ne(550), and ne(650) for light with wavelengths of 450 nm, 550 nm, and 650 nm, respectively, and the rate of variation among the ordinary light refractive indices no(450), no(550), and no(650) for light with wavelengths of 450 nm, 550 nm, and 650 nm, respectively, are set in the following range:

$$1.00 \leq ((no(450) - no(550))/(no(550) - no(650)))/$$
$$((ne(450) - ne(550))/(ne(550) - ne(650))) \leq -0.422m + 2.55.$$

More preferably, the rates of variation are set in the following range:

$$1.00 \leq$$
$$(no(450) - no(550))/(no(550) - no(650))/(ne(450) - ne(550))/$$
$$(ne(550) - ne(650)) \leq -0.343m + 2.26.$$

(2) In the case where the length m of the mean alkyl chain ($C_mH_{2m+1}$—) of the liquid crystal material is 3.40≦m≦3.90, the rate of variation among the extraordinary light refractive indices ne(450), ne(550), and ne(650) for light with wavelengths of 450 nm, 550 nm, and 650 nm, respectively, and the rate of variation among the ordinary light refractive indices no(450), no(550), and no(650) for light with wavelengths of 450 nm, 550 nm, and 650 nm, respectively, are set in the following range:

$$0.80 \leq ((no(450) - no(550))/(no(550) - no(650)))/$$
$$((ne(450) - ne(550))/(ne(550) - ne(650))) \leq 1.20.$$

More preferably, the rates of variation are set in the following range:

$$0.85 <$$
$$(no(450) - no(550))/(no(550) - no(650))/(ne(450) - ne(550))/$$
$$(ne(550) - ne(650)) < 1.15.$$

(3) In the case where the length m of the mean alkyl chain ($C_mH_{2m+1}$—) of the liquid crystal material is m>3.90, the rate of variation among the extraordinary light refractive indices ne(450), ne(550), and ne(650) for light with wavelengths of 450 nm, 550 nm, and 650 nm, respectively, and the rate of variation among the ordinary light refractive indices no(450), no(550), and no(650) for light with wavelengths of 450 nm, 550 nm, and 650 nm, respectively, are set in the following range:

$$-0.422m + 2.55 \leq ((no(450) - no(550))/(no(550) - no(650)))/$$
$$((ne(450) - ne(550))/(ne(550) - ne(650))) \leq 1.00.$$

More preferably, the rates of variation are set in the following range:

$$-0.343m + 2.26 \leq ((no(450) - no(550))/(no(550) - no(650)))/$$
$$((ne(450) - ne(550))/(ne(550) - ne(650))) \leq 1.00.$$

By utilizing the above ranges, in the LCD device of this embodiment, high-quality display images with a wide angle of field without coloring when the viewing angle is dropped or during gray scale display are obtained.

Hereinbelow, the LCD device of this embodiment will be described by way of specific examples.

EXAMPLE 16

In Example 16, in the LCD device shown in FIG. 10, a liquid crystal material for the liquid crystal layer 8 was obtained by blending the materials represented by structural formula (4) below:

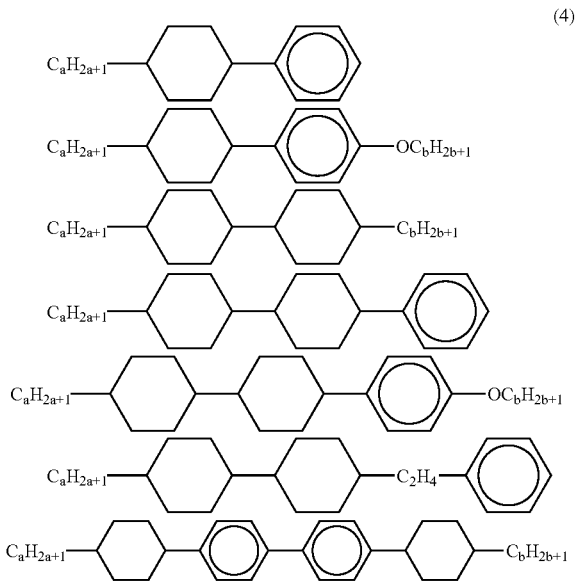

(4)

so that the length m of a mean alkyl chain ($C_mH_{2m+1}$—) per mole is m>3.90, and that the rate of variation among the extraordinary light refractive indices ne(450), ne(550), and ne(650) of the liquid crystal material for light with wavelengths of 450 nm, 550 nm, and 650 nm, respectively, and the rate of variation among the ordinary light refractive indices no(450), no(550), and no(650) for light with wave lengths of 450 nm, 550 nm, and 650 nm, respectively, are in the range of:

$$-0.422m + 2.55 \leq ((no(450) - no(550))/(no(550) - no(650)))/ \quad (E)$$
$$((ne(450) - ne(550))/(ne(550) - ne(650))) \leq 1.00.$$

For the alignment films 11 and 14, Optomer AL, manufactured by Japan Synthetic Rubber Co., Ltd., was used. The division ratio of the first liquid crystal molecule orientation domain 8a to the second liquid crystal molecule orientation domain 8b of the portion of the liquid crystal layer 8 corresponding to one pixel region was set at 17:3. The cell thickness of the liquid crystal cell 16 (the thickness of the liquid crystal layer 8) was set at 5 µm. Five samples of such LCD devices as shown in Table 16 below (samples #11d to #15d) were produced. In Table 16, as well as Tables 17 to 20 for Examples 17 to 20, to be described later, $F\{no(\lambda), ne(\lambda)\}$ represents the following:

$$F\{no(\lambda), ne(\lambda)\} = ((no(540) - no(550))/(no(550) - no(650)))/$$
$$((ne(450) - ne(550))/(ne(550) - ne(650)))$$

The optical phase plates 2 and 3 were formed in the following manner. A discotic liquid crystal material was applied to a transparent support (made of triacetyl cellulose (TAC), for example). The discotic liquid crystal material was crosslinked in a tilted orientation so that the first retardation value (nc−na)×d is 0 nm while the second retardation value (na−nb)×d is 100 nm, and that the tilt angle θ of a tilted index ellipsoid is 20° where the direction of the principal refractive index nb shown in FIG. 3 is tilted by about 20° in the direction of the arrow A from the z-axis in the xyz coordinate system and the direction of the principal refractive index nc is tilted by about 20° in the direction of the arrow B from the x-axis.

For comparison, two comparative samples of LCD devices as shown in Table 16 below (comparative samples #201d and #202d) were produced in the same manner as that in the above samples of this example, except that liquid crystal materials having a value of $F\{no(\lambda), ne(\lambda)\}$ which was outside the above range (E) were used for the liquid crystal layer 8 of the LCD device shown in FIG. 10.

Table 16 shows the results of visual inspections of color hue at viewing angles of 50°, 60°, and 70° performed for samples #11d to #15d and comparative samples #201d and #202d. In Table 16 as well as Tables 17 and 18 for Examples 17 and 18, to be described later, the mark ○ represents "no coloring", Δ represents "tolerable coloring", and X represents "intolerable coloring".

TABLE 16

| | Sample | | | | | | |
|---|---|---|---|---|---|---|---|
| | #201d | #11d | #12d | #13d | #14d | #15d | #202d |
| Mean alkyl chain length (m) | 4.60 | 5.00 | 4.20 | 4.60 | 4.50 | 5.00 | 4.75 |
| F{no(λ), ne(λ)} | 0.50 | 0.44 | 0.80 | 0.70 | 0.89 | 1.00 | 1.10 |
| Viewing angle (θ) | | | | | | | |
| 50° | X | ○ | ○ | ○ | ○ | ○ | X |

TABLE 16-continued

| | Sample | | | | | | |
|---|---|---|---|---|---|---|---|
| | #201d | #11d | #12d | #13d | #14d | #15d | #202d |
| 60° | X | X | Δ | ○ | ○ | ○ | X |
| 70° | X | X | X | ○ | ○ | ○ | X |

It is found from Table 16 that in samples #13d to #15d no coloring was observed even when the viewing angle was dropped to 70°, providing good image quality. This indicates that especially excellent characteristics are provided in the range of:

$$-0.343m + 2.26 \leq ((no(450) - no(550))/(no(550) - no(650)))/$$
$$((ne(450) - ne(550))/(ne(550) - ne(650))) \leq 1.00.$$

As for samples #11d and #12d, although coloring was observed at viewing angles of 60° and 70°, no coloring was observed at an viewing angle of 50° or less, providing good display characteristics of a level tolerable for use.

As for comparative samples #201d and #202d, however, coloring was eminently observed when the viewing angle is dropped to 50°, providing display characteristics of a level intolerable for use.

EXAMPLE 17

In Example 17, in the LCD device shown in FIG. 10, a liquid crystal material for the liquid crystal layer 8 was obtained by blending the materials shown in Example 16, so that the length m of the mean alkyl chain ($C_mH_{2m+1}$—) per mole is m<3.40, and that the rate of variation among the extraordinary light refractive indices ne(450), ne(550), and ne(650) of the liquid crystal material for light with wavelengths of 450 nm, 550 nm, and 650 nm, respectively, and the rate of variation among the ordinary light refractive indices no(450), no(550), and no(650) for light with wavelengths of 450 nm, 550 nm, and 650 nm, respectively, are set in the range of:

$$1.00 \leq ((no(450) - no(550))/(no(550) - no(650)))/ \quad (F)$$
$$((ne(450) - ne(550))/(ne(550) - ne(650))) \leq$$
$$-0.422m + 2.55.$$

For the alignment films 11 and 14, Optomer AL, manufactured by Japan Synthetic Rubber Co., Ltd., was used. The division ratio of the first liquid crystal molecule orientation domain 8a to the second liquid crystal molecule orientation domain 8b of the portion of the liquid crystal layer 8 corresponding to one pixel region was set at 17:3. The cell thickness of the liquid crystal cell 16 (the thickness of the liquid crystal layer 8) was set at 5 µm. Five samples of such LCD devices as shown in Table 17 below (samples #21d to #25d) were produced.

The optical phase plates 2 and 3 were formed in the following manner. A discotic liquid crystal material was applied to a transparent support (made of triacetyl cellulose (TAC), for example). The discotic liquid crystal material was crosslinked in a tilted orientation so that the first retardation value (nc−na)×d is 0 nm while the second retardation value (na−nb)×d is 100 nm, and that the tilt angle θ of a tilted index ellipsoid is 20° where the direction of the principal refractive index nb shown in FIG. 3 is tilted by about 20° in the direction of the arrow A from the z-axis in the xyz coordinate system and the direction of the principal refractive index nc is tilted by about 20° in the direction of the arrow B from the x-axis.

For comparison, two comparative samples of LCD devices as shown in Table 17 below (comparative samples #301d and #302d) were produced in the same manner as that in the above samples of this example, except that liquid crystal materials having a value of F{no(λ), ne(λ)} which was outside the above range (F) were used for the liquid crystal layer 8 of the LCD device shown in FIG. 10.

Table 17 shows the results of visual inspections of color hue at viewing angles of 50°, 60°, and 70° performed for samples #21d to #25d and comparative samples #301d and #302d.

TABLE 17

|  | Sample | | | | | | |
| --- | --- | --- | --- | --- | --- | --- | --- |
|  | #301d | #21d | #22d | #23d | #24d | #25d | #302d |
| Mean alkyl chain length (m) | 3.38 | 3.30 | 3.25 | 3.30 | 3.38 | 3.35 | 3.30 |
| F{no(λ), ne(λ)} | 1.25 | 1.14 | 1.16 | 1.13 | 1.05 | 1.00 | 0.90 |
| Viewing angle (θ) | | | | | | | |
| 50° | X | ○ | ○ | ○ | ○ | ○ | X |
| 60° | X | Δ | Δ | ○ | ○ | ○ | X |
| 70° | X | X | X | ○ | ○ | ○ | X |

It is found from Table 17 that in samples #23d to #25d no coloring was observed even when the viewing angle was dropped to 70°, providing good image quality. This indicates that especially excellent characteristics are provided in the range of:

$$1.00 \leq ((no(450) - no(550))/(no(550) - no(650)))/$$
$$((ne(450) - ne(550))/(ne(550) - ne(650))) \leq -0.343m + 2.26.$$

As for samples #21d and #22d, although coloring was observed at viewing angles of 60° and 70°, no coloring was observed at an viewing angle of 50° or less, providing good display characteristics of a level tolerable for use.

As for comparative samples #301d and #302d, however, coloring was eminently observed when the viewing angle is dropped to 50°, providing display characteristics of a level intolerable for use.

EXAMPLE 18

In Example 18, in the LCD device shown in FIG. 10, a liquid crystal material for the liquid crystal layer 8 was obtained by blending the materials shown in Example 16, so that the length m of the mean alkyl chain ($C_mH_{2m+1}$—) per mole is $3.40 \leq m \leq 3.90$, and that the rate of variation among the extraordinary light refractive indices ne(450), ne(550), and ne(650) of the liquid crystal material for light with wavelengths of 450 nm, 550 nm, and 650 nm, respectively, and the rate of variation among the ordinary light refractive indices no(450), no(550), and no(650) for light with wavelengths of 450 nm, 550 nm, and 650 nm, respectively, are set in the range of:

$$0.80 \leq ((no(450) - no(550))/(no(550) - no(650)))/ \qquad (G)$$
$$((ne(450) - ne(550))/(ne(550) - ne(650))) \leq 1.20.$$

For the alignment films 11 and 14, Optomer AL, manufactured by Japan Synthetic Rubber Co., Ltd., was used. The division ratio of the first liquid crystal molecule orientation domain 8a to one pixel region to the second liquid crystal molecule orientation domain 8b of the portion of the liquid crystal layer 8 corresponding was set at 17:3. The cell thickness of the liquid crystal cell 16 (the thickness of the liquid crystal layer 8) was set at 5 μm. Five samples of such LCD devices as shown in Table 18 below (samples #31d to #35d) were produced.

The optical phase plates 2 and 3 were formed in the following manner. A discotic liquid crystal material was applied to a transparent support (made of triacetyl cellulose (TAC), for example). The discotic liquid crystal material was crosslinked in a tilted orientation so that the first retardation value (nc−na)×d is 0 nm while the second retardation value (na−nb)×d is 100 nm, and that the tilt angle θ of a tilted index ellipsoid is 20° where the direction of the principal refractive index nb shown in FIG. 3 is tilted by about 20° in the direction of the arrow A from the z-axis in the xyz coordinate system and the direction of the principal refractive index nc is tilted by about 20° in the direction of the arrow B from the x-axis.

For comparison, two comparative samples of LCD devices as shown in Table 18 below (comparative samples #401d and #402d) were produced in the same manner as that in the above samples of this example except that liquid crystal materials having a value of F{no(λ), ne(λ)} which was outside the above range (G) were used for the liquid crystal layer 8 of the LCD device shown in FIG. 10.

Table 18 shows the results of visual inspections of color hue at viewing angles of 50°, 60°, and 70° performed for samples #31d to #35d and comparative samples #401d and #402d.

TABLE 18

|  | Sample | | | | | | |
| --- | --- | --- | --- | --- | --- | --- | --- |
|  | #401d | #31d | #32d | #33d | #34d | #35d | #402d |
| Mean alkyl chain length (m) | 3.90 | 3.55 | 3.80 | 3.68 | 3.60 | 3.45 | 3.40 |
| F{no(λ), ne(λ)} | 0.75 | 0.85 | 0.90 | 1.00 | 1.10 | 1.15 | 1.25 |
| Viewing angle (θ) | | | | | | | |
| 50° | X | ○ | ○ | ○ | ○ | ○ | X |
| 60° | X | Δ | ○ | ○ | ○ | Δ | X |
| 70° | X | X | ○ | ○ | ○ | X | X |

It is found from Table 18 that in samples #32d to #34d no coloring was observed even when the viewing angle was dropped to 70°, providing good image quality. This indicates that especially excellent characteristics are provided in the range of:

$$0.85 \langle ((no(450) - no(550))/(no(550) - no(650)))/$$

$$((ne(450) - ne(550))/(ne(550) - ne(650))) < 1.15.$$

As for samples #31d and #35d, although coloring was observed at viewing angles of 60° and 70°, no coloring was observed at an viewing angle of 50° or less, providing good display characteristics of a level tolerable for use.

As for comparative samples #401d and #402d, however, coloring was eminently observed when the viewing angle was dropped to 50°, providing display characteristics of a level intolerable for use.

EXAMPLE 19

In Example 19, three samples (samples #41d to #43d) of the LCD device shown in FIG. 10 were produced in the following manner. Optomer AL, manufactured by Japan Synthetic Rubber Co., Ltd., was used for the alignment films 11 and 14. Liquid crystal materials of which the values of the refractive index anisotropy Δn(550) for light with a wavelength of 550 nm were set at 0.070, 0.080, and 0.095, respectively, were used for the liquid crystal layer 8. The division ratio of liquid crystal molecule orientation domains of the portion of the liquid crystal layer 8 corresponding to one pixel region was set at 17:3. The cell thickness of the liquid crystal cell 16 of these samples was 5 μm. In each sample, the length m of the mean alkyl chain and the value of F{no(λ), ne(λ)} were set as shown in Table 19 below.

TABLE 19

|  | Sample | | | | |
| --- | --- | --- | --- | --- | --- |
|  | #501d | #41d | #42d | #43d | #502d |
| Mean alkyl chain length (m) | 4.50 | 3.30 | 3.38 | 3.68 | 4.60 |
| F{no(λ), ne(λ)} | 0.89 | 1.13 | 1.05 | 1.00 | 0.70 |

As the optical phase plates 2 and 3, those including a discotic liquid crystal material in a tilted orientation as in Example 16 were used.

For comparison, two comparative samples of LCD devices (comparative samples #501d and #502d) were produced in the same manner as that used in the above samples of this example, except that liquid crystal materials of which the values of the refractive index anisotropy Δn for light with a wavelength of 550 nm were set at 0.060 and 0.120, respectively.

The LCD devices of samples #41d to #43d and comparative samples #501d and #502d were measured for the viewing angle dependence using the measurement system as shown in FIG. 5 described above including the light-receiving element 18, the amplifier 19, and the recording device 20.

The LCD devices of samples #41d to #43d and comparative samples #501d and #502d were placed in the above measurement system, to measure the relationship between the voltage applied to the LCD devices and the output level of the light-receiving element 18 when the light-receiving element 18 was fixed at a constant angle φ.

It was assumed that the x-axis direction is toward the lower side of the screen (positive viewing direction) and the y-axis direction is toward the left side thereof. The measurement was performed by changing the position of the light-receiving element 18 among positions at an angle φ of 50° in the upward direction (negative viewing direction), the right direction, and the left direction.

Figure 17A:
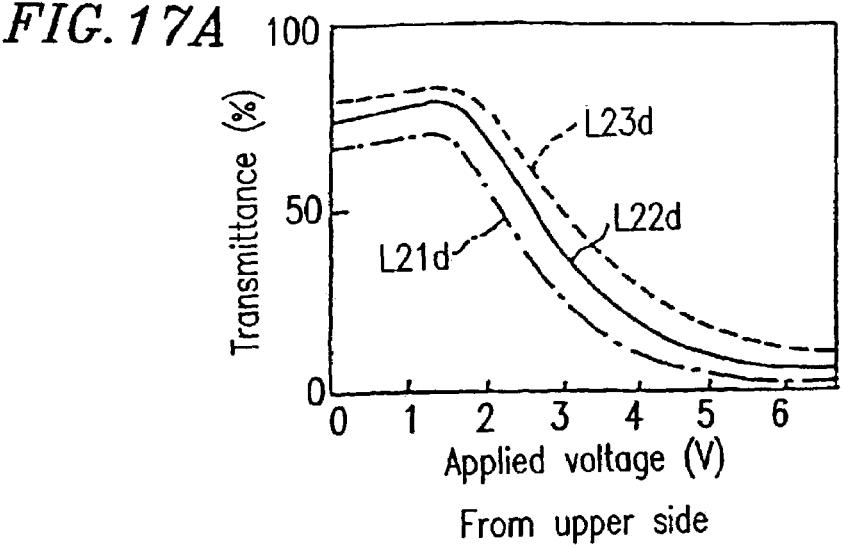
FIGS. 17A to 17C are graphs showing the transmittance vs. applied voltage characteristics of LCD devices of Example 19 according to the present invention.
Figure 17B:
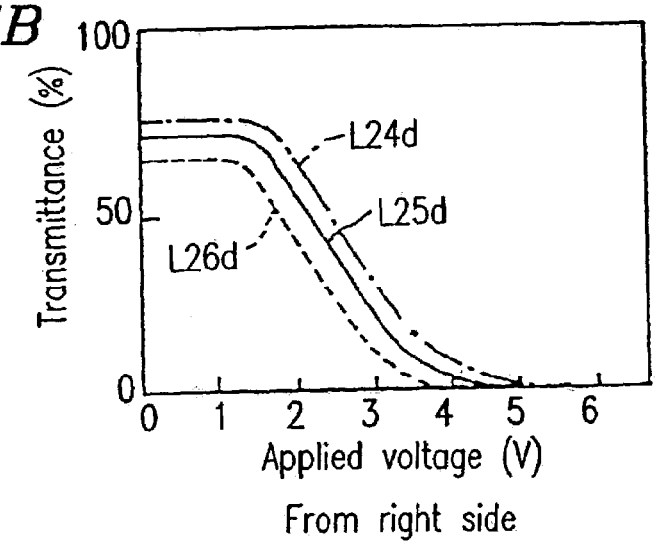
Figure 17C:
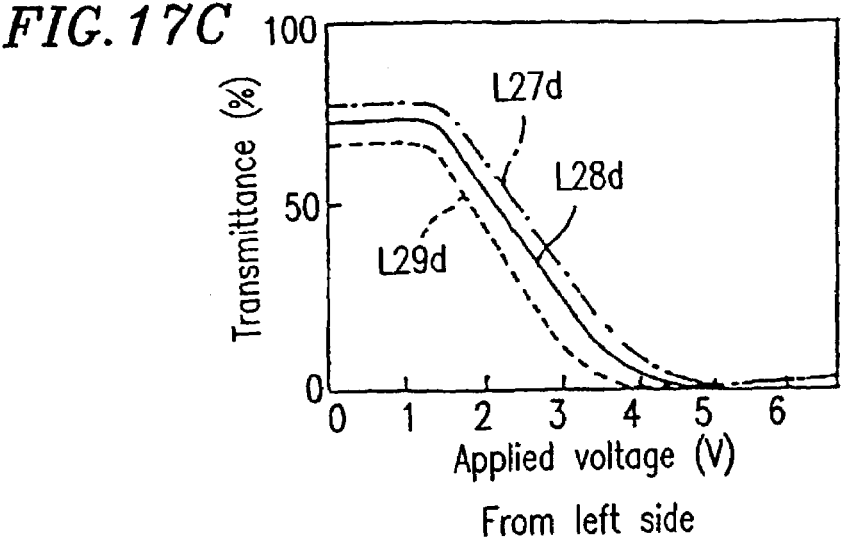
Figure 18A:
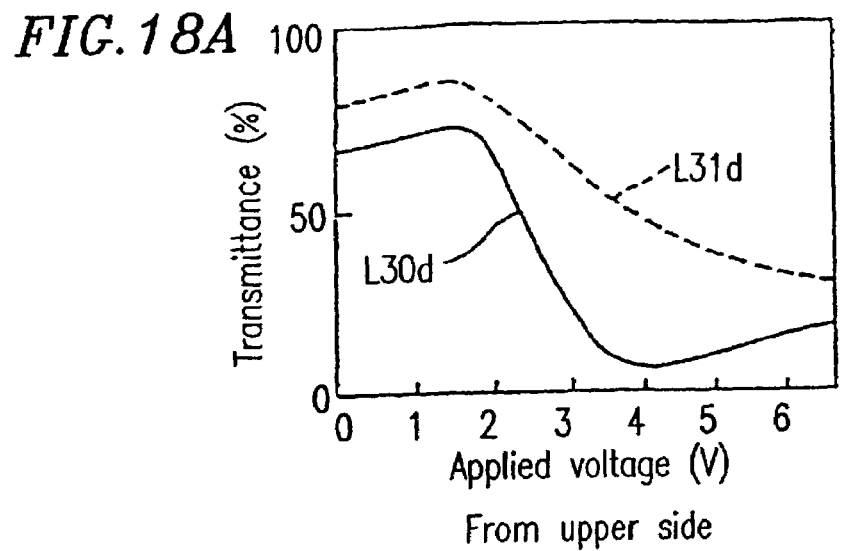
FIGS. 18A to 18C are graphs showing the transmittance vs. applied voltage characteristics of LCD devices of comparative examples.
Figure 18B:
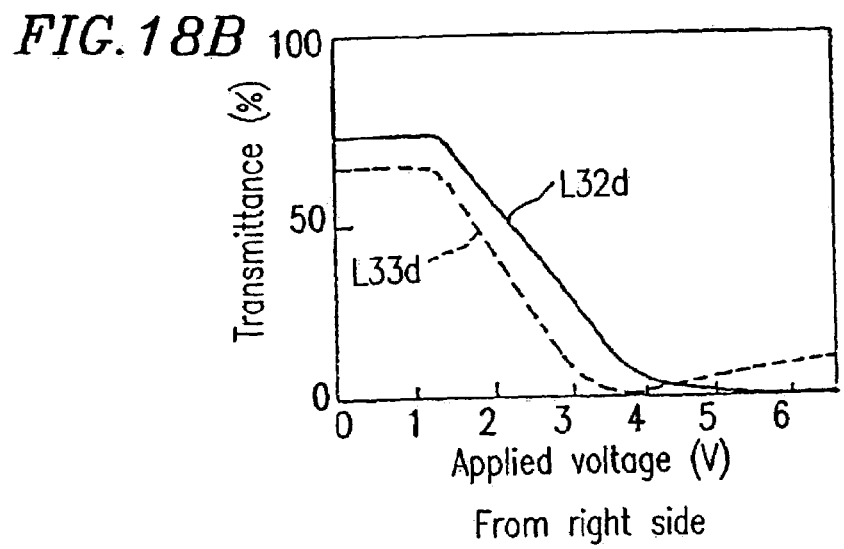
Figure 18C:
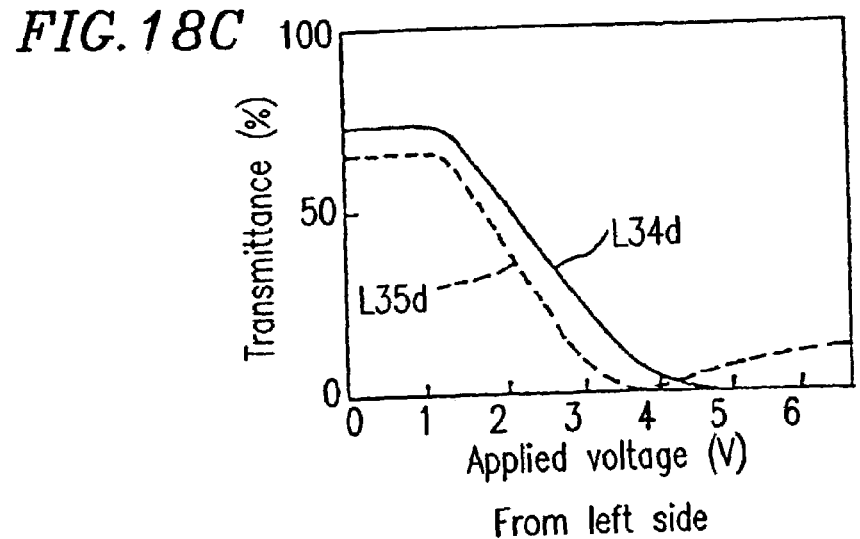

The measurement results of samples #41d to #43d are shown in FIGS. 17A to 17C, while those of comparative samples #501d and #502d are shown in FIGS. 18A to 18C. FIGS. 17A to 17C and 18A to 18C are graphs of the light transmittance of the LCD devices with respect to the voltage applied thereto (transmittance vs. applied voltage characteristics): FIGS. 17A and 18A show the results obtained when measured from the upper side; FIGS. 17B and 18B show the results obtained when measured from the right side; and FIGS. 17C and 18C show the results obtained when measured from the left side.

Referring to FIGS. 17A to 17C, curves L21d, L24d, and L27d (the one-dot dash lines) represent sample #41d which uses a liquid crystal material with Δn(550) of 0.070 for the liquid crystal layer 8, curves L22d, L25d, and L28d (the solid lines) represent sample #42d which uses a liquid crystal material with Δn(550) of 0.080 for the liquid crystal layer 8, and curves L23d, L26d, and L29d (the dashed lines) represent sample #43d which uses a liquid crystal material with Δn(550) of 0.095 for the liquid crystal layer 8.

Referring to FIGS. 18A to 18C, curves L30d, L32d, and L34d (the solid lines) represent comparative sample #501d which uses a liquid crystal material with Δn(550) of 0.060 for the liquid crystal layer 8, and curves L31d, L33d, and L35d (the dashed lines) represent sample #502d which uses a liquid crystal material with Δn(550) of 0.120 for the liquid crystal layer 8.

As for the transmittance vs. applied voltage characteristics measured from the upper side, as shown by curves L21d to L23d in FIG. 17A, it was confirmed that in samples #41d to #43d as the voltage increased the transmittance sufficiently decreased. On the contrary, in comparative sample #502d, as shown by curve L31d in FIG. 18A, as the voltage increased the transmittance did not sufficiently decrease. In comparative sample #501d, as-shown by curve L30d in FIG. 18A, as the voltage increased, the transmittance initially decreased and then increased again, causing an inversion phenomenon.

Likewise, as for the transmittance vs. applied voltage characteristics measured from the right side, as shown by curves L24d to L26d in FIG. 17B, it was confirmed that in samples #41d to #43d as the voltage increased the transmittance decreased to nearly zero. In comparative sample #501d, as shown by curve L32d in FIG. 18B, as the voltage increased the transmittance decreased to nearly zero. However, in comparative sample #502d, as shown by curve L33d in FIG. 18B, as the voltage increased, the transmittance initially decreased and then increased again, causing an inversion phenomenon.

Likewise, as for the transmittance vs. applied voltage characteristics measured from the left side, as shown by curves L27d to L29d in FIG. 17C, it was confirmed that in samples #41d to #43d as the voltage increased the transmittance decreased to nearly zero. In comparative sample #501d, as shown by curve L34d in FIG. 18C, as the voltage increased the transmittance decreased to nearly zero. However, in comparative sample #502d, as shown by curve L35d in FIG. 18C, as the voltage increased, the transmittance initially decreased and then increased again, causing an inversion phenomenon.

From the above results shown in FIGS. 17A to 17C for the samples of the LCD device of this example (samples #41d to #43d) using, for the liquid crystal layer 8, a liquid crystal material of which the values of the refractive index anisotropy Δn(550) for light with a wavelength of 550 nm were set at 0.070, 0.080, and 0.095, it is recognized that an LCD device with a wide angle of field and excellent viewing angle characteristic without an occurrence of an inversion phenomenon can be realized.

On the contrary, as shown in FIGS. 18A to 18C, as for the comparative samples of the LCD devices (comparative samples #501d and #502d) using liquid crystal materials of which the values of the refractive index anisotropy Δn(550) for 550 nm light were set at 0.060 and 0.120, an inversion phenomenon occurred and the transmittance during the application of a voltage was not sufficiently decreased, not reaching a level tolerable for use.

The dependence of the transmittance vs. applied voltage characteristics on the tilt angle θ was examined by changing the tilt angle θ of the index ellipsoid of the optical phase plate 2 or 3. As a result, it was found that the optical compensation effect of the optical phase plate for the liquid crystal layer is ensured when the tilt angle is in the range of $15° \leq \theta \leq 75°$.

If the tilt angle is less than 15° or exceeds 75°, the angle of field is not widened thereby failing to obtain a sufficient viewing angle characteristic. Especially, with such a tilt angle, the angle of field tends to be narrowed in the negative viewing direction.

The dependence of the transmittance vs. applied voltage characteristics on the second retardation value (na−nb)×d was examined by changing the second retardation value of the optical phase plates 2 and 3. As a result, it was found that the optical compensation effect of the optical phase plate for the liquid crystal layer is ensured when the second retardation value is in the range between 80 nm and 250 nm, inclusive.

If the second retardation value (na−nb)×d is less than 80 nm or exceeds 250 nm, the angle of field is not widened, thereby failing to obtain a sufficient viewing angle characteristic. Especially, with such a second retardation value, the angle of field tends to be narrowed in the right and left directions.

EXAMPLE 20

In Example 20, three samples (samples #1d to #3d) of the LCD device shown in FIG. 10 were produced in the following manner. Optomer AL, manufactured by Japan Synthetic Rubber Co., Ltd., was used for the alignment films 11 and 14. The cell thickness of the liquid crystal cell 16 of these samples was 5 μm. The division ratio of liquid crystal molecule orientation domains of each portion of the liquid crystal layer 8 corresponding to each pixel region (first liquid crystal molecule orientation domain 8a: second liquid crystal molecule orientation domain 8b) was set at 6:4, 17:3, and 19:1 for samples #1d to #3d, respectively. The means alkyl chain length m of the liquid crystal material and the value of F{no(λ), ne(λ)} were set as shown in Table 20 below.

TABLE 20

| | Sample | | | |
|---|---|---|---|---|
| | #1d | #2d | #3d | #101d |
| Mean alkyl chain length (m) | 3.30 | 3.38 | 3.68 | 4.50 |
| F{no(λ), ne(λ)} | 1.13 | 1.05 | 1.00 | 0.89 |

As the optical phase plates 2 and 3, those including a discotic liquid crystal material in a tilted orientation as in Example 16 were used.

Using the measurement system shown in FIG. 5 including the light-receiving element 18, the amplifier 19, and the recording device 20, an experiment was performed to examine how the division ratio of the first liquid crystal molecule orientation domain 8a to the second liquid crystal molecule orientation domain 8b in one pixel region affects the viewing angle characteristic.

In the measurement system, the liquid crystal cell 16 of the LCD device to be measured was placed in the measurement system, as in Example 19, so that the surface 16a of the glass substrate 9 of the liquid crystal cell 16 was in the reference plane x-y of the rectangular coordinate system xyz. The light-receiving element 18 capable of receiving light at a constant solid light-receiving angle was positioned at a predetermined distance from the origin of the coordinate system in a direction of an angle φ (viewing angle) from the z-axis which is normal to the surface 16a of the liquid crystal cell 16.

In the measurement, the surface opposite to the surface 16a of the liquid crystal cell 16 placed in the measurement system was irradiated with monochrome light with a wavelength of 550 nm. Part of the monochrome light which had passed through the liquid crystal cell 16 was incident on the light-receiving element 18. The output of the light-receiving element 18 was amplified to a predetermined level by the amplifier 19, and then recorded by the recording device 20 including a waveform memory, a recorder, and the like.

The LCD devices of samples #1d to #3d were placed in the above measurement system, to measure the relationship between the voltage applied to the LCD devices and the output level of the light-receiving element 18 when the light-receiving element 18 was fixed at a constant angle φ.

It was assumed that the x-axis direction is toward the lower side of the screen and the y-axis direction is toward the left side thereof. The measurement was performed by changing the position of the light-receiving element 18 among positions at an angle φ of 30° in the upward direction (negative viewing direction), the downward direction (positive viewing direction), the right direction, and the left direction.

Figure 19A:
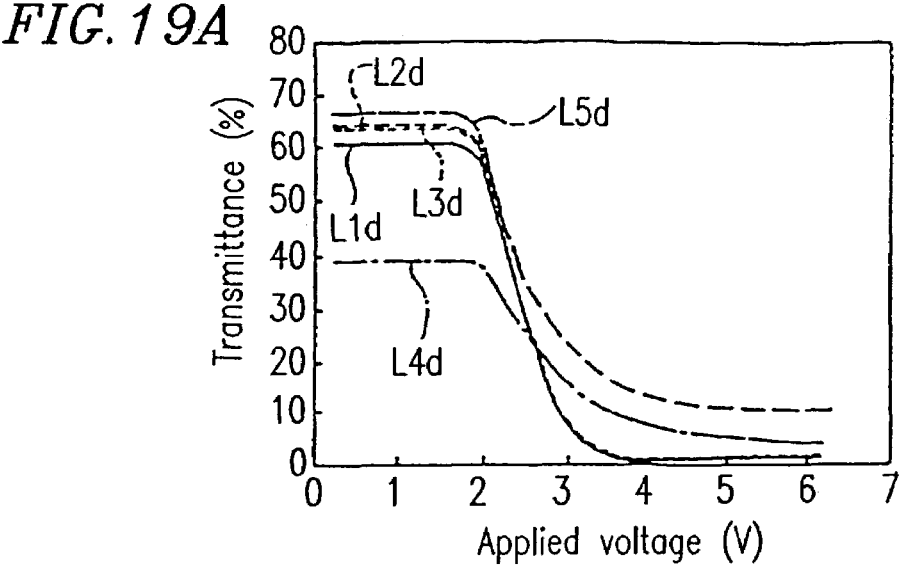
FIGS. 19A to 19C are graphs showing the transmittance vs. applied voltage characteristics of LCD devices of Example 20 according to the present invention.
Figure 19B:
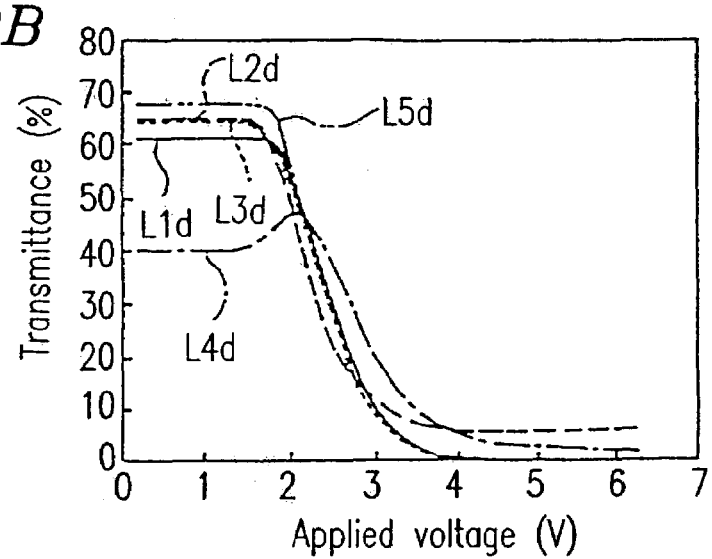
Figure 19C:
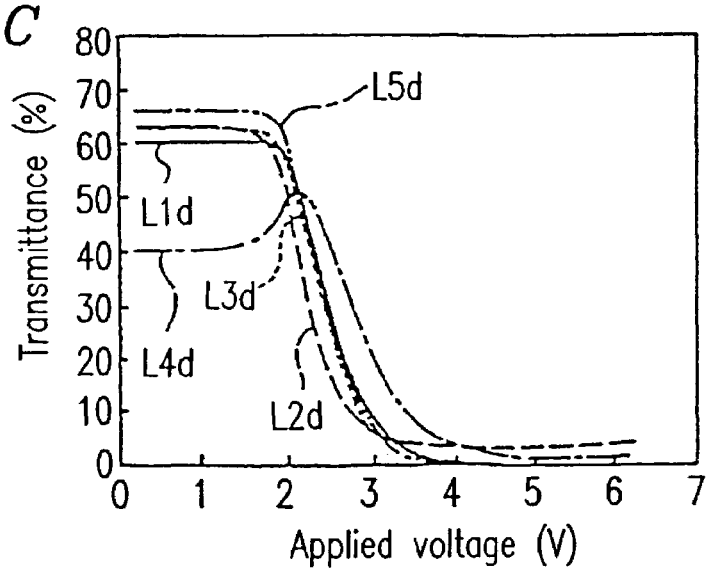

The results of the above measurements are shown in FIGS. 19A to 19C. FIGS. 19A to 19C are graphs of the light transmittance of the LCD devices with respect to the voltage applied thereto (transmittance vs. applied voltage characteristics): FIG. 19A shows the measurement results of sample #1d having the division ratio of the liquid crystal molecule orientation domains in one pixel region of 6:4; FIG. 19B shows the measurement results of sample #2d having the division ratio of 17:3; and FIG. 19d shows the measurement results of sample #3d having the division ratio of 19:1.

In FIGS. 19A to 19C, curve L1d (represented by the solid line) shows the characteristics measured in the z-axis direction, curve L2d (represented by the broken line) shows the characteristics measured from the lower side, curve L3d (represented by the dotted line) shows the characteristics measured from the right side, curve L4d (represented by the one-dot dash line) shows the characteristics measured from the upper side, and curve L5d (represented by the two-dot dash line) shows the characteristics measured from the left side.

As is observed from FIG. 19B, in sample #2d, having the division ratio of 17:3, curves L2d to L5d are close to curve L1d in the transmittance vs. applied voltage characteristics in the gray scale display region. This indicates that in the gray scale display region substantially the same viewing angle characteristic can be obtained in whichever direction, the upward, downward, right, or left direction, the viewing angle is tilted.

In the measurement from the lower side, the transmittance was kept at a low value of about 7% in the ON state, with no inversion phenomenon observed. In the measurement from the upper side, the transmittance was lower than that measured from the lower side in the ON state, indicating that the transmittance was sufficiently increased.

Substantially the same improvement in the viewing angle characteristic as that described above was recognized in sample #1d shown in FIG. 19A and sample #3d shown in FIG. 19C.

For example, as shown in FIG. 19A, in sample #1d having the division ratio of 6:4, the tendency that curve L2d (measured from the lower side) is close to curve L4d (measured from the upper side) in the gray scale display region in the ON state appears. This tendency becomes larger as the division ratio is larger. Also, as shown in FIG. 19C, in sample #3d having the division ratio of 19:1, the tendency that curve L2d (measured from the lower side) is close to curve L1d (measured in the z-axis direction) in the gray scale display region in the ON state appears. This tendency becomes larger as the division ratio is smaller. This suppresses the problem of destroying black scale of display images when viewed from the lower side (in the positive viewing direction).

As a result of further detailed examination, it has been confirmed that, when the division ratio of the liquid crystal molecule orientation domains in one pixel region is in the range between 7:3 and 9:1, a good viewing angle characteristic balanced between views from the upper and lower sides can be obtained as sample #3d having the division ratio of 7:3 described above.

For comparison, comparative sample #101d having the division ratio of the first liquid crystal molecule orientation domain 8a to the second liquid crystal molecule orientation domain 8b in the liquid crystal layer 8 of 1:1 was produced, and the viewing angle dependence thereof was measured using the measurement system shown in FIG. 5. The measurement results are shown in FIG. 20.

Figure 20:
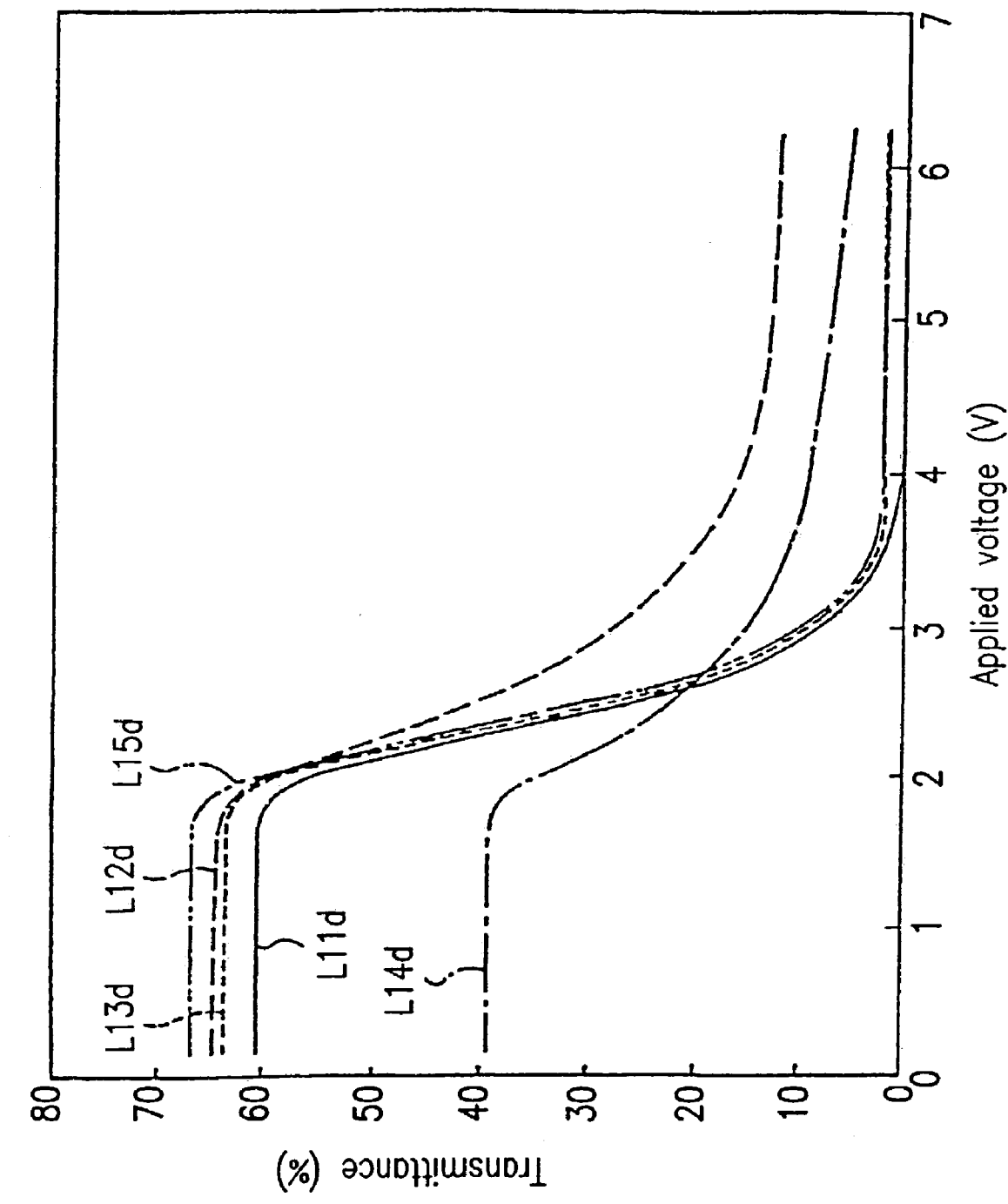
FIG. 20 is a graph showing the transmittance vs. applied voltage characteristics of LCD devices of comparative examples.
Figure 21:
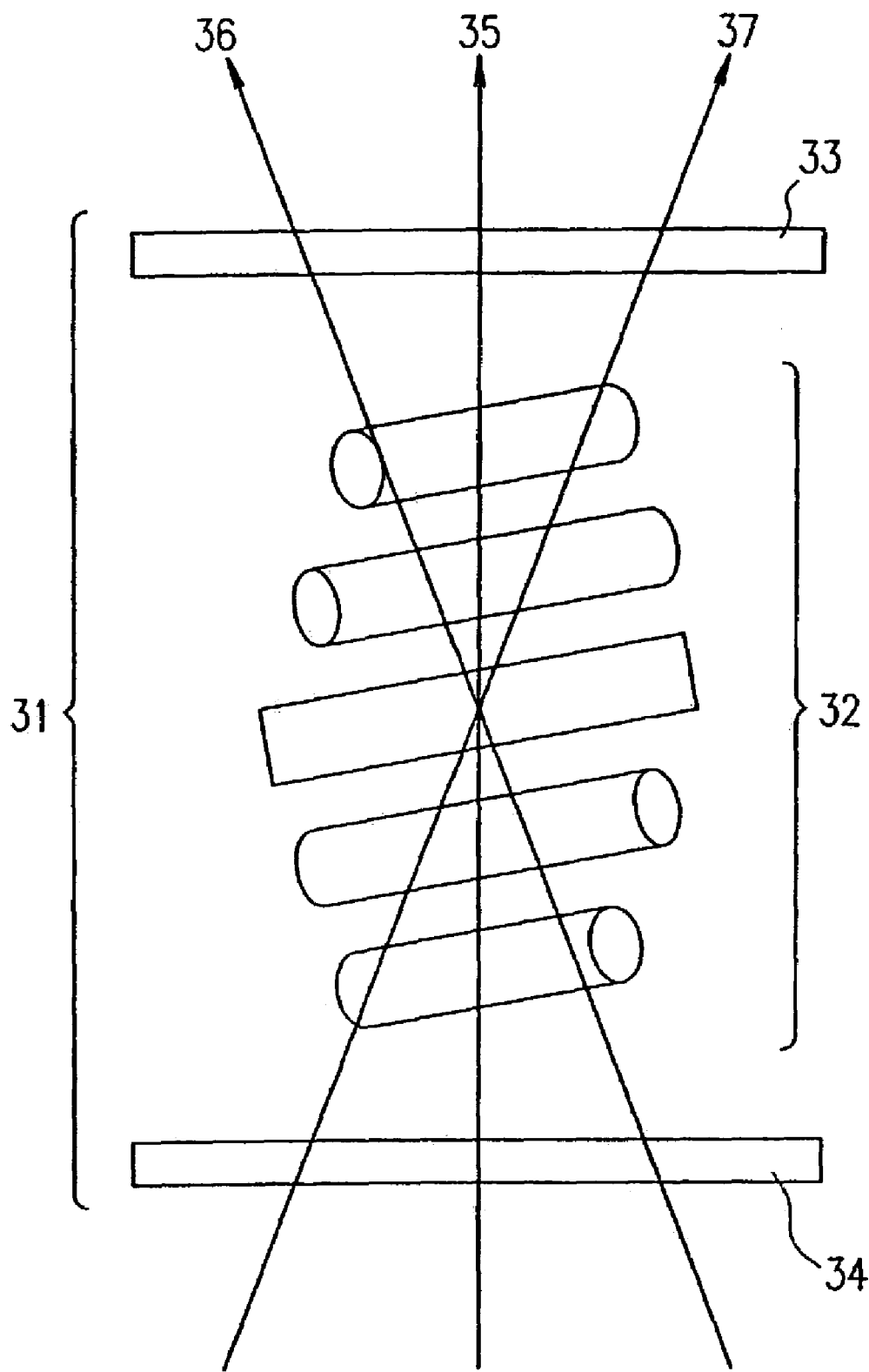
FIG. 21 is a schematic view illustrating the twisted orientation of liquid crystal molecules in a conventional TN type LCD element.

In FIG. 20, curve L11d (represented by the solid line) shows the characteristic measured in the z-axis direction, curve L12d (represented by the broken line) shows the characteristic measured from the lower side, curve L13d (represented by the dotted line) shows the characteristic measured from the right side, curve L14d (represented by the one-dot dash line) shows the characteristic measured from the upper side, and curve L15d (represented by the two-dot dash line) shows the characteristic measured from the left side.

As is observed from FIG. 20, the transmittance was sufficiently low in the ON state when measured from the right and left sides, having no problem in the viewing angle characteristic. However, when measured from the upper and lower sides, the transmittance was not sufficiently decreased in the ON state, indicating the existence of the viewing angle dependence in the upward and downward directions.

In this embodiment, two optical phase plates 2 and 3 were disposed on the surfaces of the LCD element 1. The viewing angle characteristics as described above can also be obtained by disposing the optical phase plate on either one surface of the LCD element 1. In the case of a single optical phase plate, however, although the viewing angle characteristics in the upward and downward directions are balanced and improved, the viewing angle characteristics in the right and left directions may sometimes become asymmetrical. In the case of two optical phase plates, not only the viewing angle characteristics in the upward and downward directions are improved as in the case of the single optical phase plate, but also the viewing angle characteristics in the right and left directions become symmetrical and improved. In the case of two optical phase plates, both optical phase plates may be disposed on either one surface of the LCD element 1 in a manner of one on top on the other. It is also possible to use three or more optical phase plates.

In the above description, each of the first liquid crystal molecule orientation domain 8a and the second liquid crystal molecule orientation domain 8b of one pixel region is shown to be formed as one continuous domain as shown in FIG. 11, for example. Substantially the same effect can also be obtained by orienting the molecules so that the domain appears discontinuously. For example, the molecules may be oriented so that the first liquid crystal molecule orientation domain 8a appears in two portions, the upper and lower portions of one pixel, sandwiching the second liquid crystal molecule orientation domain 8b. In such an arrangement of discontinuous domains, the division ratio of the total area of the first liquid crystal molecule orientation domain to the total area of the second liquid crystal molecule orientation domain of one pixel is preferably in the range between 6:4 and 19:1, inclusive. The optimal arrangement of the first liquid crystal molecule orientation domain and the second liquid crystal molecule orientation domain of one pixel is determined depending on the size of the pixel and generation of a disclination line at the boundary of the domains.

In order to obtain a maximum effect in widening the angle of field, a percentage closest to 100% of all the pixel regions included in one LCD device are preferably divided into a plurality of liquid crystal molecule orientation domains. In actual fabrication, the LCD device is formed so that all pixel regions included in the LCD device have a plurality of liquid crystal molecule orientation domains.

Thus, as described above, according to the present invention, a phase plate as follows is used. That is, the three principal refractive indices na, nb, and nc of the index ellipsoid of the phase plate have the relationship of na=nc>nb. The direction of the principal refractive index nb is tilted clockwise or counterclockwise from the normal of the surface of the phase plate with respect to the direction of one of the principal refractive indices na and nc which is substantially parallel to the surface of the phase plate as an axis. At the same time, the direction of the other principal refractive index nc or na is tilted clockwise or counterclockwise from the direction substantially parallel to the surface of the phase plate. By using such a phase plate, a change in the phase difference of the LCD device can be compensated. In addition, at least one of the rates of variation of the ordinary light refractive index no and the extraordinary light refractive index ne of the liquid crystal material for the liquid crystal layer with respect to the wavelength may be set in the range in which viewing angle dependent coloring does not occur. By utilizing these settings, such viewing angle dependent coloring can be further prevented. Moreover, the inversion phenomenon and the reduction in the contrast ratio in the negative viewing direction can be further reduced, compared with the case of using only the compensation function of the phase plate.

According to the present invention, a phase plate as follows is used. That is, the three principal refractive indices na, nb, and nc of the index ellipsoid of the phase plate have the relationship of na=nc>nb. The direction of the principal refractive index nb is tilted clockwise or counterclockwise from the normal of the surface of the phase plate with respect to the direction of one of the principal refractive indices na and nc which is substantially parallel to the surface of the phase plate as an axis. At the same time, the direction of the other principal refractive index nc or na is tilted clockwise or counterclockwise from the direction substantially parallel to the surface of the phase plate. By using such a phase plate, a change in the phase difference of the LCD device can be compensated. In addition, the conditions of the combination of the mean alkyl chain length of the liquid crystal material for the liquid crystal layer, the rate of variation of the ordinary light refractive index no of the liquid crystal material with respect to the wavelength, and the rate of variation of the extraordinary light refractive index ne of the liquid crystal material with respect to the wavelength may be set in the range in which viewing angle dependent coloring does not occur. By utilizing these settings, such viewing angle dependent coloring can be further prevented. Moreover, the inversion phenomenon and the reduction in the contrast ratio in the negative viewing direction can be further reduced, compared with the case of using only the compensation function of the phase plate.

According to the present invention, the LCD element in which the portion of the liquid crystal layer corresponding to one pixel region is divided into a plurality of liquid crystal molecule orientation domains having different orientation states at an unequal division ratio may be combined with a negative uniaxial optical phase element of which index ellipsoid is tilted. By this combination, the angle of field can be widened in the upward and downward directions (12 o'clock–6 o'clock directions) of the display screen, as well as in the right and left directions (3 o'clock–9 o'clock directions). In particular, for a view from the upper side (in the negative viewing direction), the transmittance during the application of a voltage can be sufficiently lowered. For a view from the lower side (in the positive viewing direction), the phenomenon of destroying black scale during the application of a voltage can be made less conspicuous.

Moreover, at least one of the rates of variation of the ordinary light refractive index no and the extraordinary light refractive index ne of the liquid crystal material with respect to the wavelength may be optimized. By this optimization, coloring on the display screen observed when the viewing angle is dropped or during gray scale display can be reduced. Alternatively, the conditions of the combination of the mean alkyl chain length of the liquid crystal material, and the rates of variation of the ordinary light refractive index no and the extraordinary light refractive index ne of the liquid crystal material with respect to the wavelength may be optimized. By this optimization, also, coloring on the display screen observed when the viewing angle is dropped or during gray scale display can be reduced. Thus, an LCD device having display characteristics of a wide angle of field, high contrast, and excellent visibility having no coloring on the display screen can be realized.

According to the present invention, it is taken into consideration that there are liquid crystal materials which are different in the range of the rate of variation of the refractive index with respect to the wavelength in which viewing angle dependent screen coloring does not occur. Based on this consideration, for each of the cases that the rate of variation among the extraordinary light refractive indices ne(450), ne(550), and ne(650) for light with wavelengths of 450 nm, 550 nm, and 650 nm, respectively, and the rate of variation among the ordinary light refractive indices no(450), no(550), and no(650) for light with wavelengths of 450 nm, 550 nm, and 650 nm, respectively, have the relationship of:

$$((no(450) - no(550))/(no(550) - no(650)))/$$
$$((ne(450) - ne(550))/(ne(550) - ne(650))) \geq 1.00,$$

and the relationship of:

$$((no(450) - no(550))/(no(550) - no(650)))/$$
$$((ne(450) - ne(550))/(ne(550) - ne(650))) < 1.00,$$

the range suitable for each case is set. By utilizing these ranges, viewing angle dependent coloring can be further prevented. Moreover, the inversion phenomenon and the reduction in the contrast ratio in the negative viewing direction can be further reduced, compared with the case of using only the compensation function of the phase plate.

When the rate of variation among the extraordinary light refractive indices ne(450), ne(550), and ne(650) for light with wavelengths of 450 nm, 550 nm, and 650 nm, respectively, and the rate of variation among the ordinary light refractive indices no(450), no(550), and no(650) for light with wavelengths of 450 nm, 550 nm, and 650 nm, respectively, have the relationship of:

$$((no(450) - no(550))/(no(550) - no(650)))/$$
$$((ne(450) - ne(550))/(ne(550) - ne(650))) \geq 1.00,$$

at least one of the rates of variation of the ordinary light refractive index no and the extraordinary light refractive index ne of the liquid crystal material with respect to the wavelength may be optimized. By this optimization, coloring on the liquid crystal display screen can be reduced to a level tolerable for use when viewed in any direction at a viewing angle of 60° which is larger than the viewing angle required for a normal LCD device, i.e., 50°. In the case of an LCD device where the portion of the liquid crystal layer corresponding to one pixel region is divided into a plurality of liquid crystal molecule orientation domains having different orientation states at an unequal division ratio, display characteristics having excellent visibility without any coloring can be realized even when the viewing angle is dropped to 50°.

Furthermore, by optimizing at least one of the rates of variation of the ordinary light refractive index no and the extraordinary light refractive index ne, an LCD device which has a wider angle of field of a viewing angle of 70° can realize display characteristics of excellent visibility having no coloring phenomenon on the liquid crystal display screen when viewed in any direction.

When the rate of variation among the extraordinary light refractive indices ne(450), ne(550), and ne(650) for light with wavelengths of 450 nm, 550 nm, and 650 nm, respectively, and the rate of variation among the ordinary light refractive indices no(450), no(550), and no(650) for light with wavelengths of 450 nm, 550 nm, and 650 nm, respectively, have the relationship of:

$$((no(450) - no(550))/(no(550) - no(650)))/$$
$$((ne(450) - ne(550))/(ne(550) - ne(650))) < 1.00,$$

at least one of the rates of variation of the ordinary light refractive index no and the extraordinary light refractive index ne of the liquid crystal material with respect to the wavelength may be optimized. By this optimization, coloring on the liquid crystal display screen can be reduced to a level tolerable for use when viewed in any direction at a viewing angle of 60° which is larger than the viewing angle required for a normal LCD device, i.e., 50°. In the case of an LCD device where the portion of the liquid crystal layer corresponding to one pixel region is divided into a plurality of liquid crystal molecule orientation domains having different orientation states at an unequal division ratio, display characteristics having excellent visibility without any coloring even when the viewing angle is dropped to 50° can be realized.

Furthermore, by optimizing at least one of the rates of variation of the ordinary light refractive index no and the extraordinary light refractive index ne, an LCD device which has a wider angle of field of a viewing angle of 70° can realize display characteristics of excellent visibility having no coloring phenomenon on the liquid crystal display screen when viewed in any direction.

The conditions of the combination of the mean alkyl chain length of the liquid crystal material, and the rates of variation of the ordinary light refractive index no and the extraordinary light refractive index ne of the liquid crystal material with respect to the wavelength may be optimized. By this optimization, coloring on the liquid crystal display screen can be reduced to a level tolerable for use when viewed in any direction at a viewing angle of 50° which is a viewing angle required for a normal LCD device. In the case of an LCD device where the portion of the liquid crystal layer corresponding to one pixel region is divided into a plurality of liquid crystal molecule orientation domains having different orientation states at an unequal division ratio, display characteristics of excellent visibility having no coloring even when the viewing angle is dropped to 50° can be realized.

Furthermore, by optimizing the conditions of the combination of the mean alkyl chain length of the liquid crystal material, and the rates of variation of the ordinary light refractive index and the extraordinary refractive index of the liquid crystal material with respect to the wavelength, an LCD device which has a wider angle of field of a viewing angle of 70° can realize display characteristics of excellent visibility having no coloring phenomenon on the liquid crystal display screen when viewed in any direction.

As a result, according to the present invention, since the contrast ratio in monochrome display is not affected by the viewing angle of an observer, the quality of display images of the LCD device can be markedly improved.

By setting of the refractive index anisotropy $\Delta n(550)$ for light with a wavelength of 550 nm in the range of:

$$0.060 < \Delta n(550) < 0.120$$

a phase difference generated in the LCD device depending on the viewing angle can be eliminated. This makes possible to further reduce, not only coloring occurring on the liquid crystal display screen depending on the viewing angle, but also a change in contrast and the inversion phenomenon in the right and left directions. In the case of an LCD device where the portion of the liquid crystal layer corresponding to one pixel region is divided into a plurality of liquid crystal molecule orientation domains having different orientation states at an unequal division ratio, the transmittance during the application of a voltage can be sufficiently decreased, and the inversion phenomenon and the reduction in the contrast ratio can be reliably prevented.

By setting of the refractive index anisotropy $\Delta n(550)$ for light with a wavelength of 550 nm in the range of:

$$0.070 \leq \Delta n(550) \leq 0.095$$

a phase difference generated in the LCD device depending on the viewing angle can be further effectively eliminated. This further ensures that viewing angle dependent coloring occurring on the liquid crystal display screen, a change in contrast, and the inversion phenomenon in-the right and left directions can be reduced. In the case of an LCD device where the portion of the liquid crystal layer corresponding to one pixel region is divided into a plurality of liquid crystal molecule orientation domains having different orientation states at an unequal division ratio, the transmittance during the application of a voltage can be further sufficiently decreased, and the inversion phenomenon and the reduction in the contrast ratio can be reliably prevented.

By setting the tilt angle of the index ellipsoid in the range between 15° and 75°, inclusive, the phase difference compensation function of the optical phase element for the liquid crystal layer is reliably obtained. Accordingly, an LCD device having display characteristics of improved visibility, a wide angle of field, and high contrast can be realized.

By setting the product of the difference between the principal refractive indices na and nb of the optical phase element and the thickness d of the optical phase element, i.e., (na−nb)×d in the range between 80 nm and 250 nm, inclusive, the phase difference compensation function of the optical phase element for the liquid crystal layer can be reliably obtained. Accordingly, an LCD device having display characteristics of improved visibility, a wide angle of field, and high contrast can be realized.

The LCD element and the optical phase element may be arranged so that the alignment direction of the alignment film is opposite to the tilt direction of the principal refractive indices nb and nc of the optical phase element in the largest liquid crystal molecule orientation domain in one pixel region. By this arrangement, the direction in which liquid crystal molecules rise when a voltage is applied and the tilt direction of the index ellipsoid of the optical phase element are opposite to each other. This ensures that optical anisotropy generated at the rising of liquid crystal molecules is compensated by the optical phase element, and thus an LCD device having display characteristics of a wide angle of field and high contrast can be realized.

The LCD element and the optical phase element may be arranged so that the alignment direction of the alignment film is the same as the tilt direction of the principal refractive indices nb and nc of the optical phase element in the smallest liquid crystal molecule orientation domain in one pixel region. By this arrangement, the smallest liquid crystal molecule orientation domain provides the viewing angle characteristic opposite to that of the largest liquid crystal molecule orientation domain. With the addition of this viewing angle characteristic component, the problem of destroying black scale in the largest liquid crystal molecule orientation domain can be made less conspicuous, and thus the angle of field in the upward and downward directions can be widened.

By setting the division ratio of the first liquid crystal molecule orientation domain to the second liquid crystal molecule orientation domain of the portion of liquid crystal layer corresponding to one pixel region in the range between 6:4 and 19:1 inclusive, the angle of field in the right and left direction can be widened, the contrast in the upward direction (negative viewing direction) can be improved, and the phenomenon of destroying black scale during application of a voltage can be suppressed. As a result, an LCD device having a wide angle of field, high contrast, and excellent visibility can be realized.

According to the present invention, an LCD device with a wide angle of field, high display quality, and excellent color reproducibility is realized. Accordingly, the present invention is very effective for a TN mode LCD device in which liquid crystal molecules in the liquid crystal layer are twisted about 90° between the pair of substrates.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising:
a liquid crystal display element including a pair of substrates, a liquid crystal layer interposed between the pair of substrates, and an alignment film formed on a surface of at least one of the pair of substrates such that the alignment film faces the liquid crystal layer;
a pair of polarizers disposed on both surfaces of the liquid crystal element to sandwich the liquid crystal element; and
at least one optical phase element disposed between at least one of the pair of polarizers and the liquid crystal element, wherein an optical refractive ellipsoid of the optical phase element is tilted in a clockwise direction or a counterclockwise direction from the normal to a surface of the optical phase element, wherein
a rate of variation of an ordinary refractive index no and a rate of variation of an extraordinary refractive index ne of a liquid crystal material of the liquid crystal layer with respect to a wavelength are both set in a range,
wherein the rate of variation among extraordinary light refractive indices ne(450), ne(550), and ne(650) for light with wavelengths of 450 nm, 550 nm, and 650 nm, respectively, and the rate of variation among ordinary light refractive indices no(450), no(550), and no(650) for light with wavelengths of 450 nm, 550 nm, and 650 nm, respectively, have the relationship of:

$$((no(450) - no(550))/(no(550) - no(650)))/$$
$$((ne(450) - ne(550))/(ne(550) - ne(650))) \geq 1.00.$$

2. A liquid crystal display device according to claim 1, wherein a value of refractive index anisotropy $\Delta n(550)$ of the liquid crystal material for light with a wavelength of 550 nm is set in a range of $0.060 < \Delta n(550) < 0.120$.

3. A liquid crystal display device according to claim 1, wherein a tilt angle of the index ellipsoid of the optical phase element is set in a range between 15° and 75° inclusive.

* * * * *